US009643505B2

(12) United States Patent
Ichikawa et al.

(10) Patent No.: US 9,643,505 B2
(45) Date of Patent: May 9, 2017

(54) POWER RECEIVING DEVICE, POWER TRANSMITTING DEVICE, POWER TRANSFER SYSTEM, AND PARKING ASSISTING DEVICE

(71) Applicants: Shinji Ichikawa, Toyota (JP); Hideaki Yamada, Kariya (JP)

(72) Inventors: Shinji Ichikawa, Toyota (JP); Hideaki Yamada, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/777,723

(22) PCT Filed: Apr. 26, 2013

(86) PCT No.: PCT/JP2013/062361
§ 371 (c)(1),
(2) Date: Sep. 16, 2015

(87) PCT Pub. No.: WO2014/174663
PCT Pub. Date: Oct. 30, 2014

(65) Prior Publication Data
US 2016/0114687 A1    Apr. 28, 2016

(51) Int. Cl.
*B60L 11/18* (2006.01)
*B60L 5/00* (2006.01)
(Continued)

(52) U.S. Cl.
CPC .......... *B60L 11/182* (2013.01); *B60L 5/005* (2013.01); *B60L 11/18* (2013.01);
(Continued)

(58) Field of Classification Search
CPC .................................... B60L 11/182
See application file for complete search history.

(56) References Cited

U.S. PATENT DOCUMENTS 5,821,728 A * 10/1998 Schwind .............. B60L 11/182
320/108
5,821,731 A    10/1998 Kuki et al.
(Continued)

FOREIGN PATENT DOCUMENTS

| AU | 2006269374 B2 | 1/2007 |
| AU | 2006269374 C1 | 1/2007 |

(Continued)

*Primary Examiner* — Thomas Tarcza
*Assistant Examiner* — Michael Berns
(74) *Attorney, Agent, or Firm* — Oliff PLC

(57) ABSTRACT

A power receiving device includes: a power receiving unit moved between a first position and a second position and receiving electric power in the second position from a power transmitting unit contactlessly; a movement mechanism moving the power receiving unit to the first position and the second position; and a sensing unit provided at a vehicular body independently of the power receiving unit and sensing the intensity of one of a magnetic field and an electric field formed by the power transmitting unit. The second position is obliquely below the first position with respect to the vertical direction, and the second position has a shorter distance to the sensing unit than the first position.

16 Claims, 34 Drawing Sheets

(51) Int. Cl.
  *H01F 38/14*   (2006.01)
  *H02J 5/00*    (2016.01)
  *H02J 7/02*    (2016.01)
  *B60M 7/00*    (2006.01)
  *H02J 7/00*    (2006.01)
  *H02J 50/90*   (2016.01)

(52) U.S. Cl.
  CPC ....... *B60L 11/1829* (2013.01); *B60L 11/1833* (2013.01); *B60L 11/1835* (2013.01); *B60L 11/1877* (2013.01); *B60M 7/003* (2013.01); *H01F 38/14* (2013.01); *H02J 5/005* (2013.01); *H02J 7/00* (2013.01); *H02J 7/025* (2013.01); *H02J 50/90* (2016.02); *B60L 2250/16* (2013.01); *Y02T 10/705* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 7,741,734 B2 | 6/2010 | Joannopoulos et al. | |
| 8,466,654 B2* | 6/2013 | Cook | B60L 11/182 320/104 |
| 8,807,308 B2* | 8/2014 | Suh | B60L 11/1803 191/10 |
| 8,922,066 B2* | 12/2014 | Kesler | B60L 11/1812 307/104 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2012/0262002 A1 | 10/2012 | Widmer et al. | |
| 2014/0095026 A1* | 4/2014 | Freitag | B60L 11/1829 701/37 |
| 2015/0137801 A1* | 5/2015 | Raedy | H02J 7/025 324/207.15 |
| 2016/0001668 A1* | 1/2016 | Ichikawa | H02J 5/005 307/9.1 |
| 2016/0001669 A1* | 1/2016 | Ichikawa | H02J 5/005 307/10.1 |
| 2016/0082848 A1* | 3/2016 | Ichikawa | B60L 11/123 701/22 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | H04-54804 A | 2/1992 |
| JP | H09-213378 A | 8/1997 |
| JP | H09-215211 A | 8/1997 |
| JP | 2009-501510 A | 1/2009 |
| JP | 2011-193617 A | 9/2011 |
| JP | 2012-080770 A | 4/2012 |
| JP | 2012-239360 A | 12/2012 |
| JP | 2013-042564 A | 2/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |

* cited by examiner

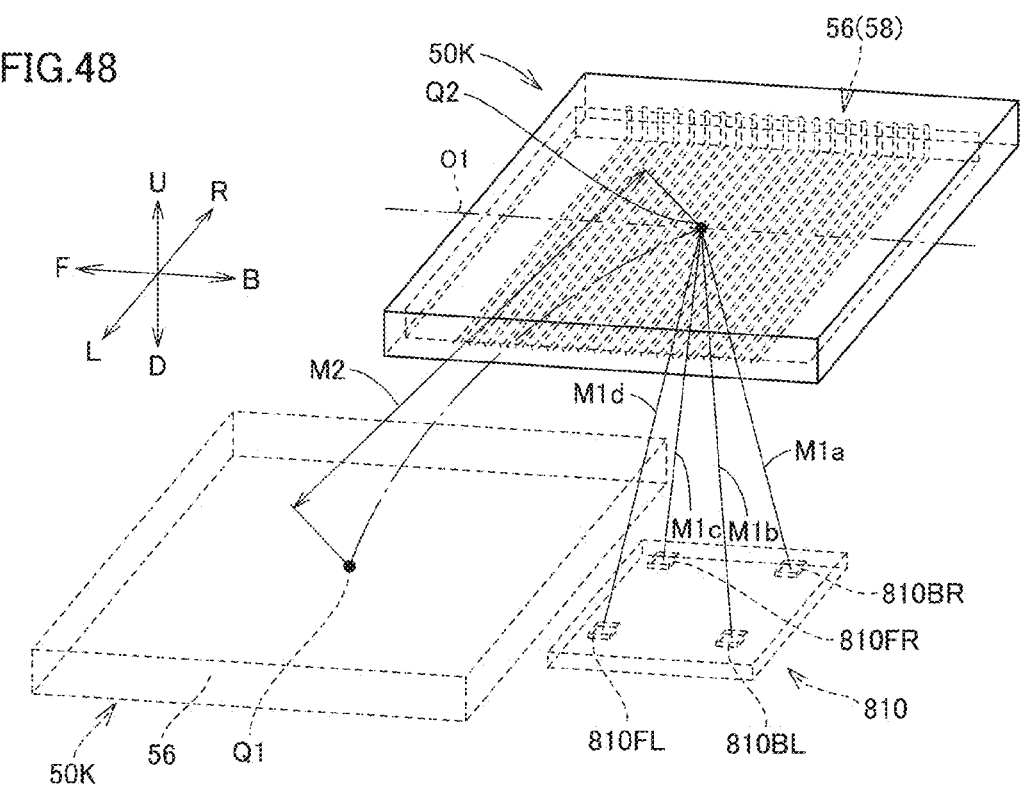

POWER RECEIVING DEVICE, POWER TRANSMITTING DEVICE, POWER TRANSFER SYSTEM, AND PARKING ASSISTING DEVICE

TECHNICAL FIELD

The present invention relates to a power receiving device, a power transmitting device, a power transfer system, and a parking assisting device.

BACKGROUND ART

A hybrid vehicle and an electric vehicle are known. These electrically powered vehicles have a battery mounted therein to use electric power to drive a driving wheel. In recent years, a technique has been developed to allow a battery to be charged contactlessly. Charging a battery contactlessly and efficiently requires a power receiving unit and a power transmitting unit to be positioned as appropriate.

Japanese Patent Laying-Open No. 2012-080770 (PTD 1) discloses a vehicle equipped with a parking assisting device. The parking assisting device includes a power receiving unit. The power receiving unit receives electric power contactlessly from a power transmitting unit external to the vehicle. The power receiving unit is also used in sensing the power receiving and transmitting units' relative positions. The information regarding the relative positions is utilized in guiding the vehicle to an appropriate parking position.

CITATION LIST

Patent Document

PTD 1: Japanese Patent Laying-Open No. 2012-080770

SUMMARY OF INVENTION

Technical Problem

A first object of the present invention is to provide a power receiving device capable of sensing the position of a power transmitting unit with precision. A second object of the present invention is to provide a power transfer system capable of sensing the position of the power transmitting unit with precision. A third object of the present invention is to provide a power transmitting device capable of sensing the position of a power receiving unit with precision. A fourth object of the present invention is to provide a parking assisting device capable of guiding a vehicle to allow the power receiving and transmitting units to mutually assume appropriate positions.

Solution to Problem

The present invention in a first aspect provides a power receiving device comprising: a power receiving unit including a power receiving coil, moved between a first position and a second position different from the first position, and receiving electric power in the second position from a power transmitting unit external to a vehicle contactlessly; a movement mechanism moving the power receiving unit to the first position and the second position; and a sensing unit provided at a vehicular body independently of the power receiving unit and sensing an intensity of one of a magnetic field and an electric field formed by the power transmitting unit, the second position being obliquely below the first position with respect to a vertical direction, the second position having a shorter distance to the sensing unit than the first position.

Preferably, the sensing unit senses an impedance of the magnetic field formed by the power transmitting unit at a location of the sensing unit. Preferably, the sensing unit senses an intensity component in the vertical direction of the magnetic field formed by the power transmitting unit at the location of the sensing unit. Preferably, the sensing unit senses an intensity component in a direction orthogonal to the vertical direction of the magnetic field formed by the power transmitting unit at the location of the sensing unit.

Preferably, a plurality of sensing units are provided at the vehicular body, the power receiving coil has a winding axis extending in a direction orthogonal to a direction in which the power transmitting unit and the power receiving unit disposed in the second position face each other, and when the power receiving unit is disposed in the second position, and in that condition an imaginary plane is drawn to include the winding axis of the power receiving coil of the power receiving unit and also be orthogonal to the vertical direction and the plurality of sensing units are projected in the vertical direction toward the imaginary plane, then the plurality of sensing units form projected images in the imaginary plane in positions having a relationship of line symmetry with respect to the winding axis.

Preferably, the sensing unit is included in a projected space virtually formed when the power receiving unit in the second position has the power receiving coil or a core having the power receiving coil wound thereon projected in the vertical direction upward.

The present invention in a second aspect provides a power receiving device comprising: a power receiving unit including a power receiving coil, moved between a first position and a second position different from the first position, and receiving electric power in the second position from a power transmitting unit external to a vehicle contactlessly; a movement mechanism moving the power receiving unit to the first position and the second position; and a sensing unit provided at a vehicular body independently of the power receiving unit and sensing an intensity of one of a magnetic field and an electric field formed by the power transmitting unit.

The present invention in a third aspect provides a power receiving device comprising: a power receiving unit including a power receiving coil, moved between a first position and a second position different from the first position, and receiving electric power in the second position from a power transmitting unit external to a vehicle contactlessly; a movement mechanism moving the power receiving unit to the first position and the second position; and a sensing unit provided at a vehicular body independently of the power receiving unit and sensing an intensity of one of a magnetic field and an electric field formed by the power transmitting unit, the second position being below the first position with respect to a vertical direction, the sensing unit being included in a space virtually formed when the power receiving unit in the first position has the power receiving coil or a core having the power receiving coil wound thereon enlarged to a similar figure of 3 times in size.

Preferably, the power transmitting unit and the power receiving unit have natural frequencies, respectively, with a difference smaller than or equal to 10% of the natural frequency of the power receiving unit. Preferably, the power receiving unit and the power transmitting unit have a coupling coefficient equal to or smaller than 0.3. Preferably, the power receiving unit receives electric power from the power transmitting unit through at least one of a magnetic field formed between the power receiving unit and the power transmitting unit and oscillating at a specific frequency and an electric field formed between the power receiving unit and the power transmitting unit and oscillating at a specific frequency.

The present invention in one aspect provides a parking assisting device comprising: the power receiving device according to the present invention; and a control unit controlling a vehicle driving unit driving the vehicle, based on an intensity of the magnetic field that the sensing unit senses, to move the vehicle.

Preferably, the sensing unit includes a first sensing unit and a second sensing unit mutually spaced in a direction transverse to a vertical direction, and when the vehicle is moving and an intensity of the magnetic field that the first sensing unit senses satisfies a first condition and an intensity of the magnetic field that the second sensing unit senses fails to satisfy a second condition, the control unit controls the vehicle driving unit to move the vehicle in a direction in which the first sensing unit is located as seen from the second sensing unit.

Preferably, the first sensing unit is disposed closer to a rear side of the vehicle than the second sensing unit is, and when the vehicle is moving backward and an intensity of the magnetic field that the first sensing unit senses satisfies the first condition and an intensity of the magnetic field that the second sensing unit senses fails to satisfy the second condition, the control unit controls the vehicle driving unit to allow the vehicle to continue to move backward.

Preferably, the first sensing unit is disposed closer to a front side of the vehicle than the second sensing unit is, and when the vehicle is moving backward and an intensity of the magnetic field that the first sensing unit senses satisfies the first condition and an intensity of the magnetic field that the second sensing unit senses fails to satisfy the second condition, the control unit controls the vehicle driving unit to move the vehicle forward.

Preferably, the sensing unit includes a first sensing unit and a second sensing unit mutually spaced in a direction transverse to a vertical direction, and when the vehicle is moving and an intensity of the magnetic field that the first sensing unit senses satisfies a first condition and an intensity of the magnetic field that the second sensing unit senses satisfies a second condition, the control unit controls the vehicle driving unit to move the vehicle so that the magnetic field as sensed by the first sensing unit and the magnetic field as sensed by the second sensing unit approach a single value in intensity.

Preferably, the first sensing unit is disposed closer to a rear side of the vehicle than the second sensing unit is, and when the vehicle is moving forward and an intensity of the magnetic field that the first sensing unit senses satisfies the first condition and an intensity of the magnetic field that the second sensing unit senses fails to satisfy the second condition, the control unit controls the vehicle driving unit to move the vehicle backward.

Preferably, the first sensing unit is disposed closer to a front side of the vehicle than the second sensing unit is, and when the vehicle is moving forward and an intensity of the magnetic field that the first sensing unit senses satisfies the first condition and an intensity of the magnetic field that the second sensing unit senses fails to satisfy the second condition, the control unit controls the vehicle driving unit to allow the vehicle to continue to move forward.

The present invention provides a power transfer system comprising: a power receiving device; and a power transmitting device having a power transmitting unit and transmitting electric power to the power receiving device contactlessly while facing the power receiving device, the power receiving device including a power receiving unit moved between a first position and a second position different from the first position, and receiving electric power in the second position from the power transmitting unit external to a vehicle contactlessly, a movement mechanism moving the power receiving unit to the first position and the second position, and a sensing unit provided at a vehicular body independently of the power receiving unit and sensing an intensity of one of a magnetic field and an electric field formed by the power transmitting unit, the magnetic field formed by the power transmitting unit having an intensity larger at a location of the sensing unit than at the first position.

The present invention provides a power transmitting device comprising: a power transmitting unit including a power transmitting coil, moved between a first position and a second position different from the first position, and transmitting electric power in the second position contactlessly to a power receiving unit provided to a vehicle; a movement mechanism moving the power transmitting unit to the first position and the second position; and a sensing unit provided independently of the power transmitting unit and sensing an intensity of one of a magnetic field and an electric field formed by the power receiving unit, the second position being obliquely above the first position with respect to a vertical direction, the second position having a shorter distance to the sensing unit than the first position.

The present invention in another aspect provides a parking assisting device that assists parking a vehicle receiving information from a communication unit and moved as controlled based on the information, comprising: the power transmitting device according to the present invention; and the communication unit that transmits to the vehicle information regarding an intensity of the magnetic field sensed by the sensing unit.

Advantageous Effect of Invention

The power transmitting unit and/or the power receiving unit can positionally be sensed with precision, and the power receiving unit and the power transmitting unit can thus be mutually, appropriately positioned.

BRIEF DESCRIPTION OF DRAWINGS

FIG. 48 is a perspective view for illustrating the positional relationship between power transmitting unit 56 disposed in first position Q1, power transmitting unit 56 disposed in second position Q2, and sensing unit 810.

DESCRIPTION OF EMBODIMENTS

Hereafter reference will be made to the drawings to describe the present invention in embodiments. Note that in the below described embodiments when numbers, amounts and the like are referred to the present invention is not necessarily limited thereto in scope unless otherwise indicated. In the below described embodiments, identical and corresponding components are identically denoted and may not be described repeatedly.

Configuration of Electrically Powered Vehicle 10 in Appearance

Figure 1:
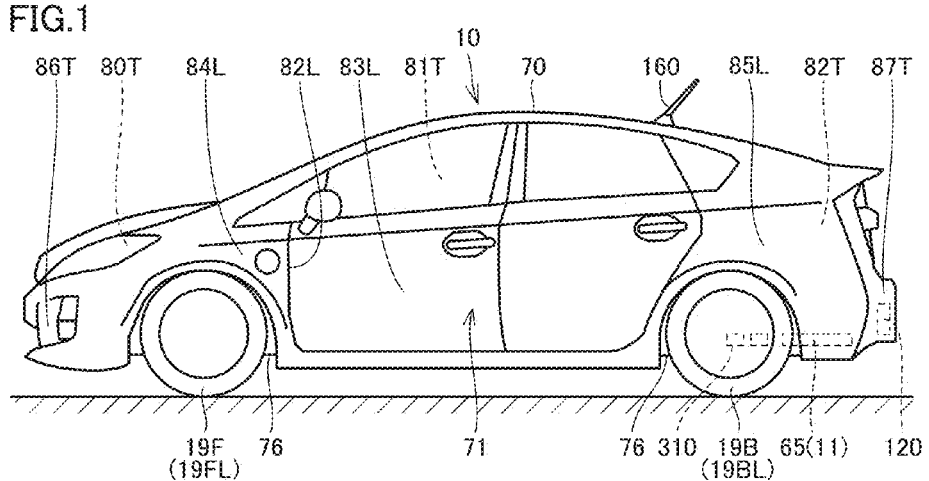
FIG. 1 is a left side view of an electrically powered vehicle 10 (or a vehicle) including a power receiving device 11 in an embodiment.
Figure 2:
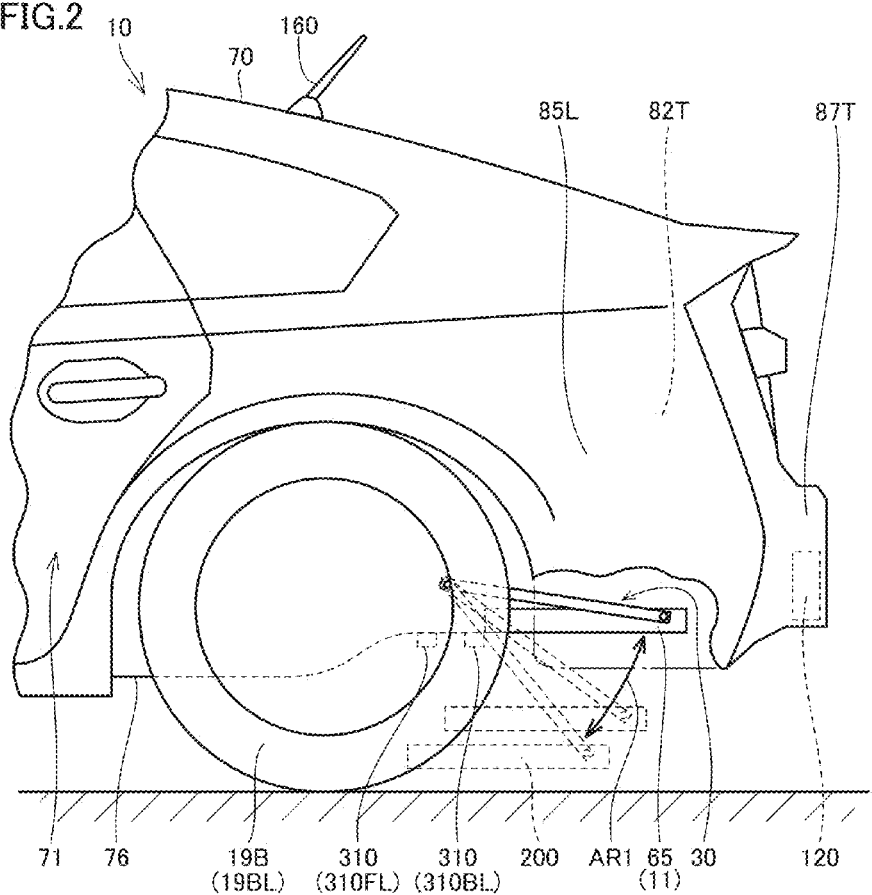
FIG. 2 is a left side view of a vicinity of power receiving device 11 of electrically powered vehicle 10 in an enlarged view.

FIG. 1 is a left side view of an electrically powered vehicle 10 (or a vehicle) including a power receiving device 11 in an embodiment. FIG. 2 is a left side view of a vicinity of power receiving device 11 of electrically powered vehicle 10 in an enlarged view. For the sake of convenience, FIG. 2 shows a rear fender 85L, which will be described later, partially exploded, and power receiving device 11 (or a casing 65) and a movement mechanism 30 drawn with a solid line.

Figure 3:
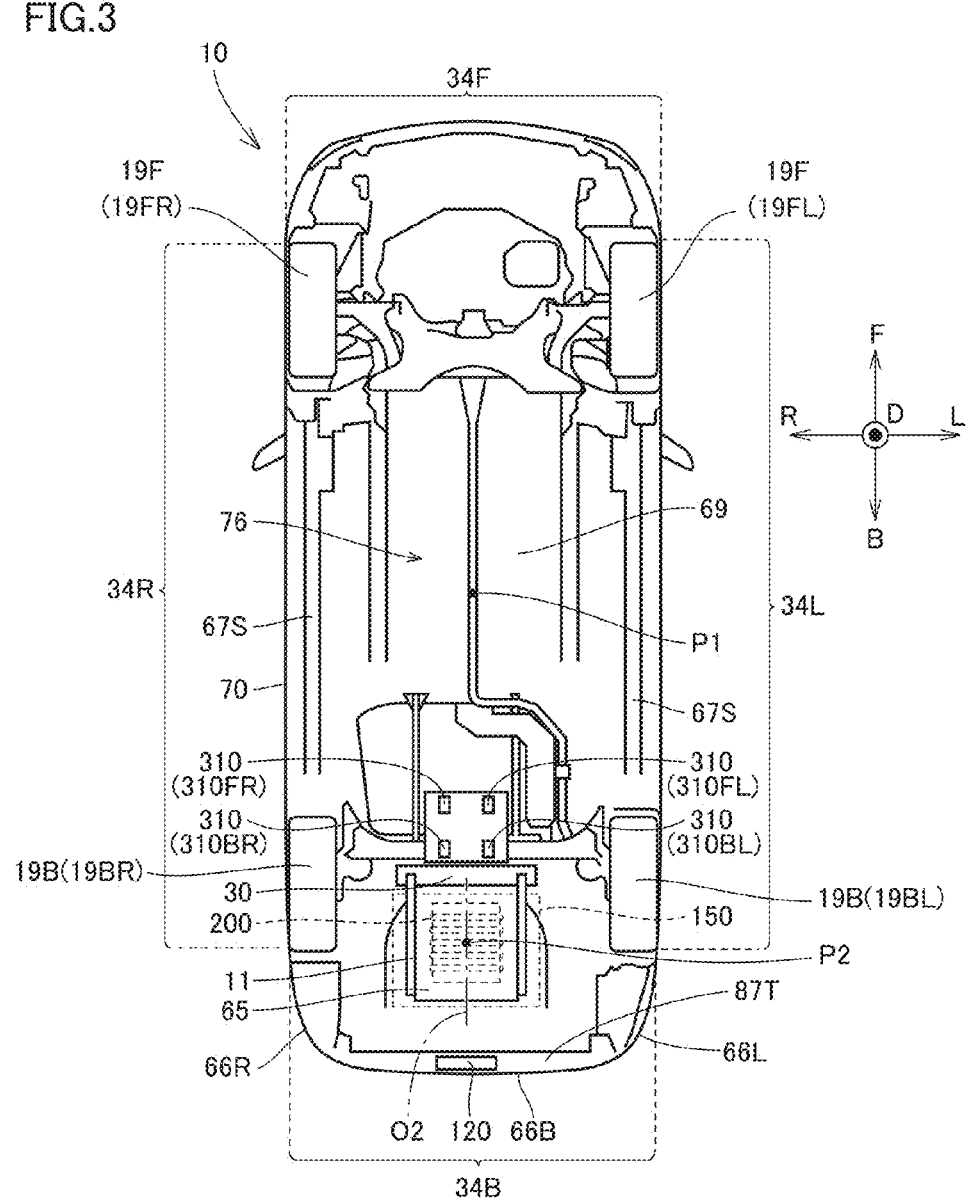
FIG. 3 is a bottom view of electrically powered vehicle 10.

With reference to FIG. 1, electrically powered vehicle 10 includes a vehicular body 70 and vehicular wheels 19F and 19B (see vehicular wheels 19FL, 19FR, 19BL, and 19BR in FIG. 3). Vehicular body 70 has a driving compartment 80T, a cabin 81T, and a luggage compartment 82T therein. Driving compartment 80T has an engine (not shown) (see an engine 176 in FIG. 7) and the like housed therein.

Electrically powered vehicle 10 is equipped with a battery (not shown) (see a battery 150 in FIG. 7), and functions as a hybrid vehicle. Electrically powered vehicle 10 may be any motor driven vehicle functioning as a fuel cell vehicle or an electric vehicle. While the present embodiment is described with a vehicle receiving electric power, an object other than the vehicle may receive electric power.

Vehicular body 70 has a left side surface 71 provided with an opening 82L for getting in and out of the vehicle, a door 83L, a front fender 84L, a front bumper 86T, rear fender 85L, and a rear bumper 87T. Opening 82L for getting in and out of the vehicle communicates with cabin 81T. Door 83L opens and closes opening 82L for getting in and out of the vehicle.

A camera 120 is provided in a vicinity of rear bumper 87T. Camera 120 is used to sense a relative positional relationship between electrically powered vehicle 10 (or power receiving device 11) and an external power feeding apparatus 61 described later (see FIG. 5), and camera 120 is fixed for example to rear bumper 87T so that it can obtain an image behind electrically powered vehicle 10 (see FIG. 3). Vehicular body 70 has an upper portion provided with a communication unit 160. Communication unit 160 is a communication interface allowing communication between electrically powered vehicle 10 and external power feeding apparatus 61 (see FIG. 5).

With reference to FIG. 1 and FIG. 2, vehicular body 70 has a bottom surface 76. Power receiving device 11 and power receiving unit 200 (see FIG. 3) included in power receiving device 11 are provided at bottom surface 76 of vehicular body 70. Casing 65 of power receiving device 11 is supported by movement mechanism 30 (see FIG. 2). Movement mechanism 30 (see FIG. 2) can be driven to allow power receiving unit 200 in casing 65 to ascend and descend as indicated in FIG. 2 by an arrow AR1, as will more specifically be described hereinafter with reference to FIG. 9 or the like.

Electrically powered vehicle 10 is provided with a sensing unit 310 frontwardly of power receiving device 11 as seen in a direction in which the vehicle moves forward (see sensing units 310FL, 310FR, 310BL, and 310BR in FIG. 3). Sensing unit 310 is provided in electrically powered vehicle 10 independently of power receiving unit 200. As will be described more specifically hereinafter with reference to FIG. 4, casing 65 has power receiving unit 200 housed therein.

Providing sensing unit 310 independently of power receiving unit 200 includes: providing sensing unit 310 outside casing 65 out of contact therewith; providing sensing unit 310 outside casing 65 in contact therewith; and providing sensing unit 310 inside casing 65 out of contact with power receiving unit 200.

The present embodiment provides sensing unit 310 at bottom surface 76 of electrically powered vehicle 10 outside casing 65 out of contact therewith. Sensing unit 310 can sense at its location the intensity of a magnetic field or an electric field that is formed by power transmitting unit 56 of external power feeding apparatus 61 (see FIG. 5), as will be described more specifically hereinafter.

FIG. 3 is a bottom view of electrically powered vehicle 10. In FIG. 3, "D" denotes a vertically downward direction D. "L" denotes a leftward direction L relative to the vehicle. "R" denotes a rightward direction R relative to the vehicle. "F" denotes a frontward direction F relative to the vehicle. "B" denotes a rearward direction B relative to the vehicle. Power receiving unit 200, movement mechanism 30, and sensing unit 310 are provided at bottom surface 76. Power receiving unit 200 being provided at bottom surface 76 includes providing power receiving device 11 at bottom surface 76 with power receiving unit 200 housed in casing 65, which will be described later.

Bottom surface 76 has a center P1. Center P1 is located at a center of electrically powered vehicle 10 as seen lengthwise and is also located at a center of vehicle 10 as seen widthwise. Electrically powered vehicle 10 is provided with front wheels 19FR, 19FL aligned with each other with the vehicle seen widthwise, and rear wheels 19BR, 19BL aligned with each other with the vehicle seen widthwise. Front wheels 19FR and 19FL may configure driving wheels, rear wheels 19BR and 19BL may configure driving wheels, or all of the front and rear wheels may configure driving wheels.

Bottom surface 76 of electrically powered vehicle 10 is a region of vehicle 10 that can be observed from a position distant from vehicle 10 in a vertically downward direction with vehicle 10 having wheels 19FR, 19FL, 19BR, 19BL in contact with the ground surface. Bottom surface 76 has a peripheral portion including a front peripheral portion 34F, a rear peripheral portion 34B, a right peripheral portion 34R, and a left peripheral portion 34L.

Front peripheral portion 34F is located frontwardly of front wheel 19FR and front wheel 19FL in vehicular frontward direction F. Right peripheral portion 34R and left peripheral portion 34L are aligned with each other with the vehicle seen widthwise. Right peripheral portion 34R and left peripheral portion 34L are located between front peripheral portion 34F and rear peripheral portion 34B. Rear peripheral portion 34B is located rearwardly of rear wheel 19BR and rear wheel 19BL in vehicular rearward direction B.

Rear peripheral portion 34B has a rear side portion 66B, a right rear side portion 66R, and a left rear side portion 66L. Rear side portion 66B extends in the widthwise direction of electrically powered vehicle 10. Right rear side portion 66R is contiguous to one end of rear side portion 66B and extends toward rear wheel 19BR. Left rear side portion 66L is contiguous to the other end of rear side portion 66B and extends toward rear wheel 19BL.

Electrically powered vehicle 10 is provided at bottom surface 76 with a floor panel 69, a side member 67S, and a cross member. Floor panel 69 is in the form of a plate and delimits electrically powered vehicle 10's interior and exterior. Side member 67S and the cross member are disposed on a lower surface of floor panel 69.

Movement mechanism 30 is provided at bottom surface 76 of electrically powered vehicle 10 and disposed between rear wheel 19BR and rear wheel 19BL. Movement mechanism 30 supports casing 65. When casing 65 (or power receiving unit 200) is disposed on bottom surface 76 of electrically powered vehicle 10, casing 65 (or power receiving unit 200) is located between rear wheel 19BR and rear wheel 19BL. Battery 150 is disposed in a vicinity of power receiving device 11.

Movement mechanism 30 can be secured to bottom surface 76 of vehicular body 70 in a variety of methods. For example, movement mechanism 30 can be suspended from side member 67S or the cross member and thus secured to bottom surface 76 of vehicular body 70. Movement mechanism 30 may be secured to floor panel 69.

Sensing unit 310 is provided frontwardly of power receiving unit 200 in vehicular frontward direction F and rearwardly of center P1 in vehicular rearward direction B. Sensing unit 310 may be positioned other than that shown in FIG. 3. Sensing unit 310 may be provided frontwardly of center P1 in vehicular frontward direction F or rearwardly of power receiving unit 200 in vehicular rearward direction B. Sensing unit 310 may be provided rightwardly of power receiving unit 200 in vehicular rightward direction R or leftwardly of power receiving unit 200 in vehicular leftward direction L.

Sensing unit 310 includes sensing units 310FL, 310FR aligned with each other with the vehicle seen widthwise, and sensing units 310BL, 310BR aligned with each other with the vehicle seen widthwise. Sensing units 310FL, 310FR, 310BL, and 310BR sense the intensity of a magnetic field or an electric field formed by external power feeding apparatus 61 (see FIG. 5). While the present embodiment provides sensing unit 310 including four sensing units 310FL, 310FR, 310BL, and 310BR, sensing unit 310 may be only a single sensing unit or a plurality of sensing units other than four sensing units.

When sensing unit 310 has a plurality of sensing units (or sensor portions), and the vehicular body 70 bottom surface 76 is seen in a plan view, as shown in FIG. 3, it is recommendable that the plurality of sensing units (or sensor portions) be positioned in line symmetry with respect to a winding axis O2 of a power receiving coil 22 of power receiving unit 200, as will more specifically be described hereinafter with reference to FIG. 4. The plurality of sensing units (or sensor portions) may be disposed outer than power receiving unit 200 to sandwich power receiving unit 200 therebetween with vehicular body 70 seen widthwise.

Sensing units 310FL, 310FR, 310BL, and 310BR sense the magnetic field intensity of a test magnetic field or the electric field intensity of a test electric field, that is formed by power transmitting unit 56 and present at their locations, as will more specifically be described hereinafter. Sensing unit 310 can be implemented by various types of magnetic field sensors (or magnetometric sensors) and electric field sensors. For example, some or all of sensing units 310FL, 310FR, 310BL and 310BR may each be implemented as a magneto-impedance element (also referred to as an MI sensor), a Hall device, or a magneto-resistive element (or magneto-resistive (MR) sensor).

When the magneto-impedance element is used as the sensing unit, the sensing unit utilizes a magnetic impedance effect to sense the impedance of a magnetic field formed by power transmitting unit 56. The sensing unit for example has four terminals, and when a power supply is used to drive a magnetic substance of significantly magnetically permeable alloy such as amorphous fiber (or amorphous alloy wire) in pulses, the impedance significantly varies with the test magnetic field. When the magneto-impedance element is used as the sensing unit, the sensing unit can sense a minimum flux density for example of 1 nT and thus sense with high precision the intensity of the test magnetic field formed by power transmitting unit 56.

When the Hall device is used as the sensing unit, the sensing unit utilizes a Hall effect to sense the intensity of a magnetic field formed by power transmitting unit 56. The sensing unit for example has four terminals, and when an object having a current passing therethrough is exposed to a test magnetic field, the Lorentz force changes a current path, and voltage appears at two terminals that do not have a bias current passing therethrough. When the Hall device is used as the sensing unit, the sensing unit can sense a minimum flux density for example of several mTs.

When the magnetoresistive element is used as the sensing unit, the sensing unit utilizes an electrical resistance varying with the test magnetic field (or a magnetoresistive effect) to sense the intensity of a magnetic field formed by power transmitting unit 56. The sensing unit for example has two terminals, and when an object (a multilayer thin film) having a current passing therethrough is exposed to a test magnetic field, the Lorentz force increases a current path, resulting in a varied resistance value. When the magnetoresistive element is used as the sensing unit, the sensing unit can sense a minimum flux density for example of 1.5 mT.

Figure 4:
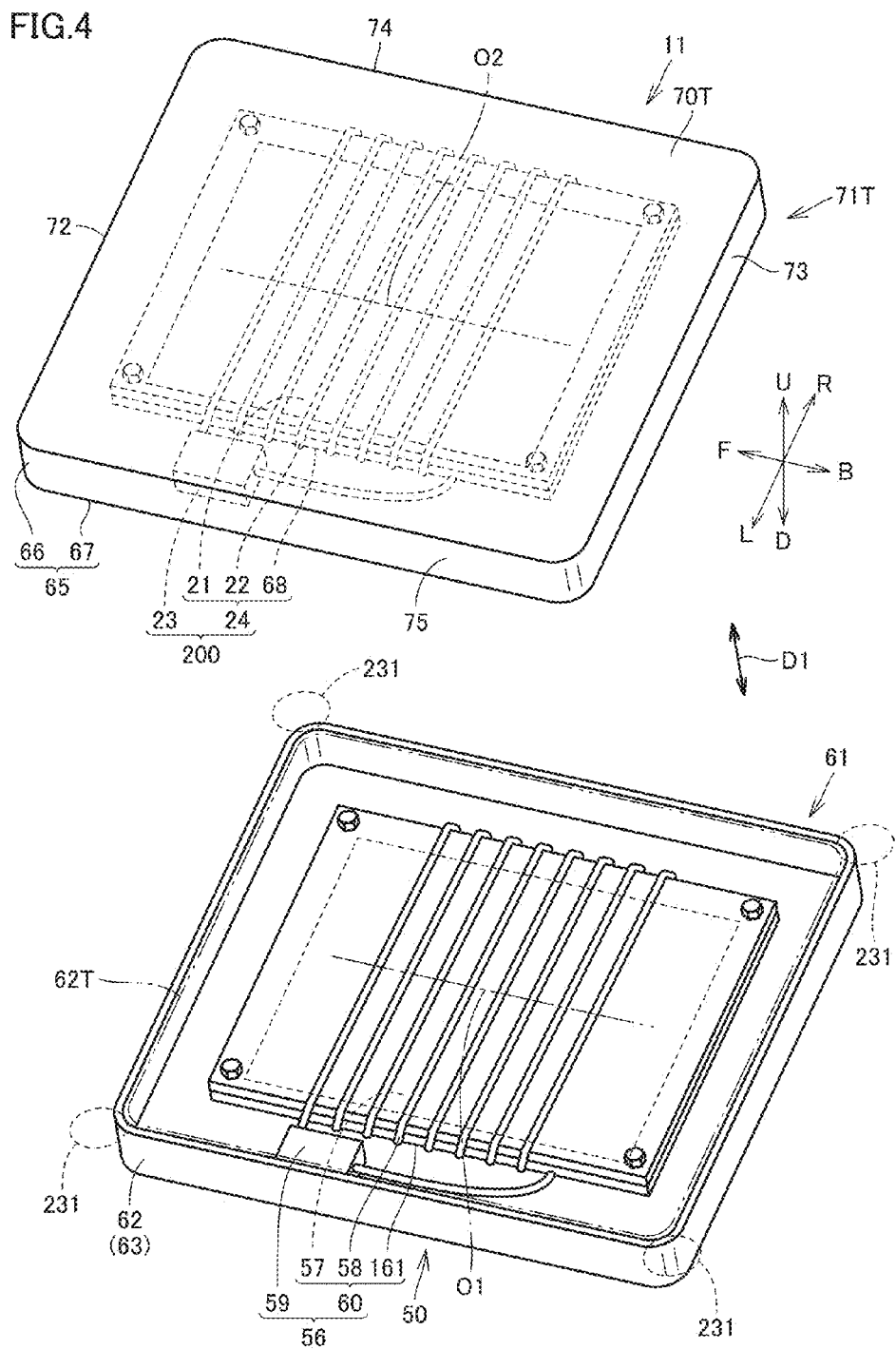
FIG. 4 is an exploded perspective view of power receiving device 11 and an external power feeding apparatus 61 (or a power transmitting device 50).
Figure 5:
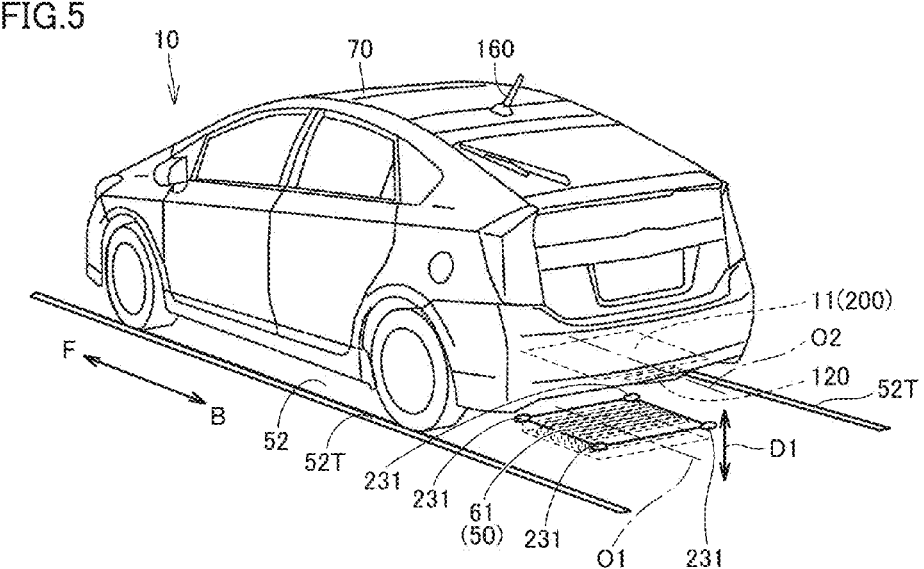
FIG. 5 is a perspective view of electrically powered vehicle 10 including power receiving device 11 and external power feeding apparatus 61 including power transmitting device 50.

FIG. 4 is a perspective view of power receiving device 11 and external power feeding apparatus 61 (or power transmitting device 50). FIG. 5 is a perspective view of electrically powered vehicle 10 including power receiving device 11 and external power feeding apparatus 61 including power transmitting device 50. FIG. 5 shows electrically powered vehicle 10 stopped in a parking space 52 with power receiving unit 200 generally opposite to external power feeding apparatus 61 (or power transmitting unit 56). FIG. 5 shows power receiving unit 200 disposed at vehicular body 70 in an accommodation position (i.e., movement mechanism 30 not operating to cause power receiving unit 200 to descend).

External Power Feeding Apparatus 61

With reference to FIG. 4 and FIG. 5, external power feeding apparatus 61 includes power transmitting device 50 and a plurality of light emitting units 231 (see FIG. 5). Power transmitting device 50 has power transmitting unit 56 (see FIG. 4) and is provided in parking space 52 (see FIG. 5). As shown in FIG. 5, parking space 52 is provided with a line 52T indicating a parking position or area to allow electrically powered vehicle 10 to be stopped at a prescribed position. Four light emitting units 231 are provided to indicate the location of power transmitting device 50, and they are located on power transmitting device 50 at four corners, respectively. Light emitting unit 231 includes a light emitting diode or the like for example.

With reference to FIG. 4, power transmitting unit 56 is housed in a casing 62. Casing 62 includes a shield 63 formed to open upward (in a vertically upward direction U), and a lid 62T provided to close the opening of shield 63. Shield 63 is formed of a metallic material such as copper. Lid 62T is formed of resin or the like. FIG. 4 shows lid 62T with a two dotted, chained line to clearly show power transmitting unit 56.

Power transmitting unit 56 includes a solenoid-type coil unit 60 and a capacitor 59 connected to coil unit 60. Coil unit 60 includes a ferrite core 57, a power transmitting coil 58 (or a primary coil), and a fixed member 161. Fixed member 161 is formed of resin. Ferrite core 57 is housed in fixed member 161. Power transmitting coil 58 is wound about a winding axis O1 and thus surrounds a peripheral surface of fixed member 161.

Power transmitting coil 58 is formed such that, as seen from its one end toward its other end, it surrounds winding axis O1 and is also displaced therealong. For the sake of convenience, FIG. 4 shows power transmitting coil 58 with its coil wire shown to be spaced wider than in reality. As will more specifically be described hereinafter, power transmitting coil 58 is connected to a high frequency power supply device 64 (see FIG. 6).

In the present embodiment, power transmitting coil 58 has winding axis O1 extending linearly. Winding axis O1 extends in a direction transverse to a direction D1 in which power transmitting coil 58 faces the power receiving unit 200 power receiving coil 22 (in the present embodiment, a direction orthogonal thereto). In the present embodiment, direction D1 is perpendicular to a surface of parking space 52 (or the ground surface) (see FIG. 5), and winding axis O1 extends in a direction parallel to the surface of parking space 52 (or the ground surface).

Winding axis O1 of power transmitting coil 58 can be presented for example by dividing power transmitting coil 58 by a unit length lengthwise from one end thereof to the other end thereof and drawing a line to pass through or near a center of curvature of power transmitting coil 58 for each divided segment of the unit length. Winding axis O1 that is an imaginary line is derived from the center of curvature of power transmitting coil 58 for each divided segment of the unit length by a variety of approximation methods including linear approximation, log approximation, polynomial approximation, and the like.

In the present embodiment, power transmitting coil 58 has winding axis O1 extending in a direction parallel to line 52T provided in parking space 52 (see FIG. 5). Line 52T is provided to extend in the fore-aft direction of electrically powered vehicle 10 when electrically powered vehicle 10 is guided into parking space 52. Power transmitting unit 56 (or power transmitting device 50) is disposed to have winding axis O1 extending in the fore-aft direction of electrically powered vehicle 10 stopped in parking space 52 (see FIG. 5).

Power Receiving Device 11

Power receiving device 11 has power receiving unit 200 housed in casing 65. Casing 65 includes a shield 66 formed to open downward (in a vertically downward direction D), and a lid 67 disposed to close the opening of shield 66. Shield 66 is formed of a metallic material such as copper. Lid 67 is formed of resin or the like.

Shield 66 includes a top 70T and a surrounding peripheral wall 71T. Top 70T faces floor panel 69 (see FIG. 3). Peripheral wall 71T hangs down in vertically downward direction D from a peripheral portion of top 70T. Peripheral wall 71T has end walls 72 and 73 and side walls 74 and 75. End wall 72 and end wall 73 are aligned as seen in a direction in which the power receiving coil 22 winding axis O2 extends. Side wall 74 and side wall 75 are disposed between end wall 72 and end wall 73.

Power receiving unit 200 includes a solenoid-type coil unit 24 and a capacitor 23 connected to coil unit 24. Coil unit 24 includes a ferrite core 21, power receiving coil 22 (or a secondary coil), and a fixed member 68. Fixed member 68 is formed of resin. Ferrite core 21 is housed in fixed member 68. Power receiving coil 22 is wound about winding axis O2 and thus surrounds a peripheral surface of fixed member 68.

Power receiving coil 22 is formed such that, as seen from its one end toward its other end, it surrounds winding axis O2 and is also displaced therealong. For the sake of convenience, FIG. 4 shows power receiving coil 22 with its coil wire shown to be spaced wider than in reality. As will more specifically be described hereinafter, power receiving coil 22 is connected to rectifier 13 (see FIG. 6). While FIG. 4 shows power receiving unit 200 and power transmitting unit 56 equally in size, power receiving unit 200 and power transmitting unit 56 may be different in size.

In the present embodiment, power receiving coil 22 has winding axis O2 extending linearly. Winding axis O2 extends in a direction transverse to direction D1 (in the present embodiment, a direction orthogonal thereto). Winding axis O2 can be presented for example by dividing power receiving coil 22 by a unit length lengthwise from one end thereof to the other end thereof and drawing a line to pass through or near a center of curvature of power receiving coil 22 for each divided segment of the unit length. Winding axis O2 that is an imaginary line is derived from the center of curvature of power receiving coil 22 for each divided segment of the unit length by a variety of approximation methods including linear approximation, log approximation, polynomial approximation, and the like.

Again with reference to FIG. 3, the present embodiment provides power receiving unit 200 (or power receiving device 11) having winding axis O2 extending in the fore-aft direction of vehicular body 70 (also see FIG. 5). When winding axis O2 is extended linearly, its extension traverses front peripheral portion 34F and rear peripheral portion 34B. The power receiving unit 200 power receiving coil 22 has a center P2.

Center P2 is an imaginary point located on winding axis O2 of power receiving coil 22 and is located at a center of power receiving coil 22 as seen along winding axis O2. In other words, center P2 is located exactly in the middle between a portion of the coil wire of power receiving coil 22 that is located at an extremity thereof in a direction along winding axis O2 (hereinafter referred to as a first direction) and a portion of the coil wire of power receiving coil 22 that is located at an extremity thereof in a direction along winding axis O2 that is opposite to the first direction (hereinafter referred to as a second direction).

Power receiving unit 200 (or power receiving device 11) is disposed rearwardly of center P1 in vehicular rearward direction B (or to be closer to rear peripheral portion 34B than center P1 is). Power receiving coil 22 has center P2 positioned to be closer to rear peripheral portion 34B than any other one of front peripheral portion 34F, right peripheral portion 34R, and left peripheral portion 34L.

The power transfer system (see power transfer system 1000 in FIGS. 6 and 7) of the present embodiment is contemplated such that when electrically powered vehicle 10 is parked in parking space 52 with reference to line 52T (see FIG. 5) or the like, power receiving coil 22 has winding axis O2 parallel to winding axis O1 of power transmitting coil 58. The power transfer system is contemplated such that when it transfers electric power between power receiving unit 200 and power transmitting unit 56, movement mechanism 30 (see FIG. 2) causes power receiving device 11 (or power receiving unit 200) to descend to vertically face power transmitting device 50 (or power transmitting unit 56).

Power Transfer System 1000

Figure 6:
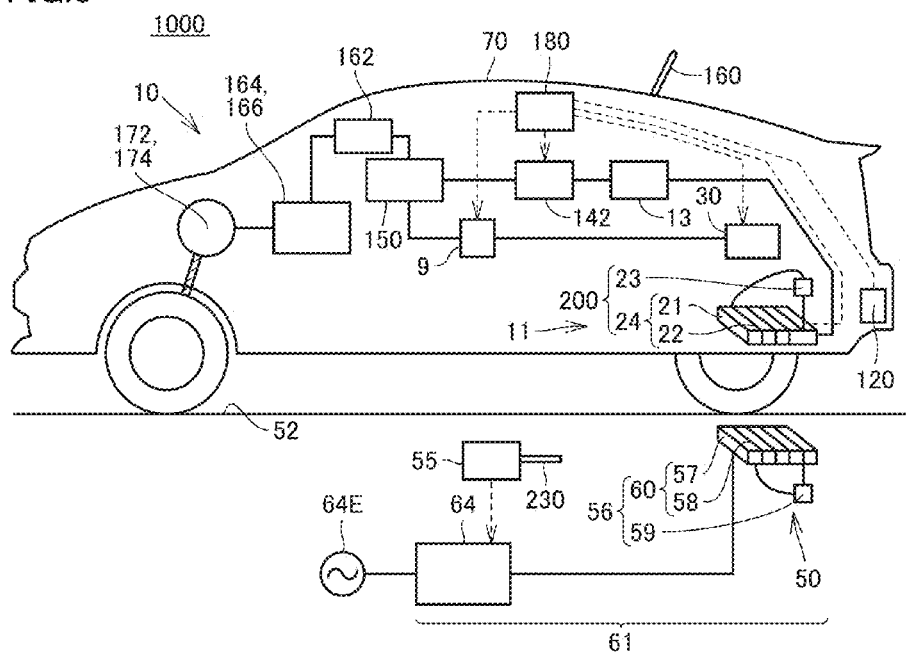
FIG. 6 schematically shows a power transfer system 1000 in an embodiment.
Figure 7:
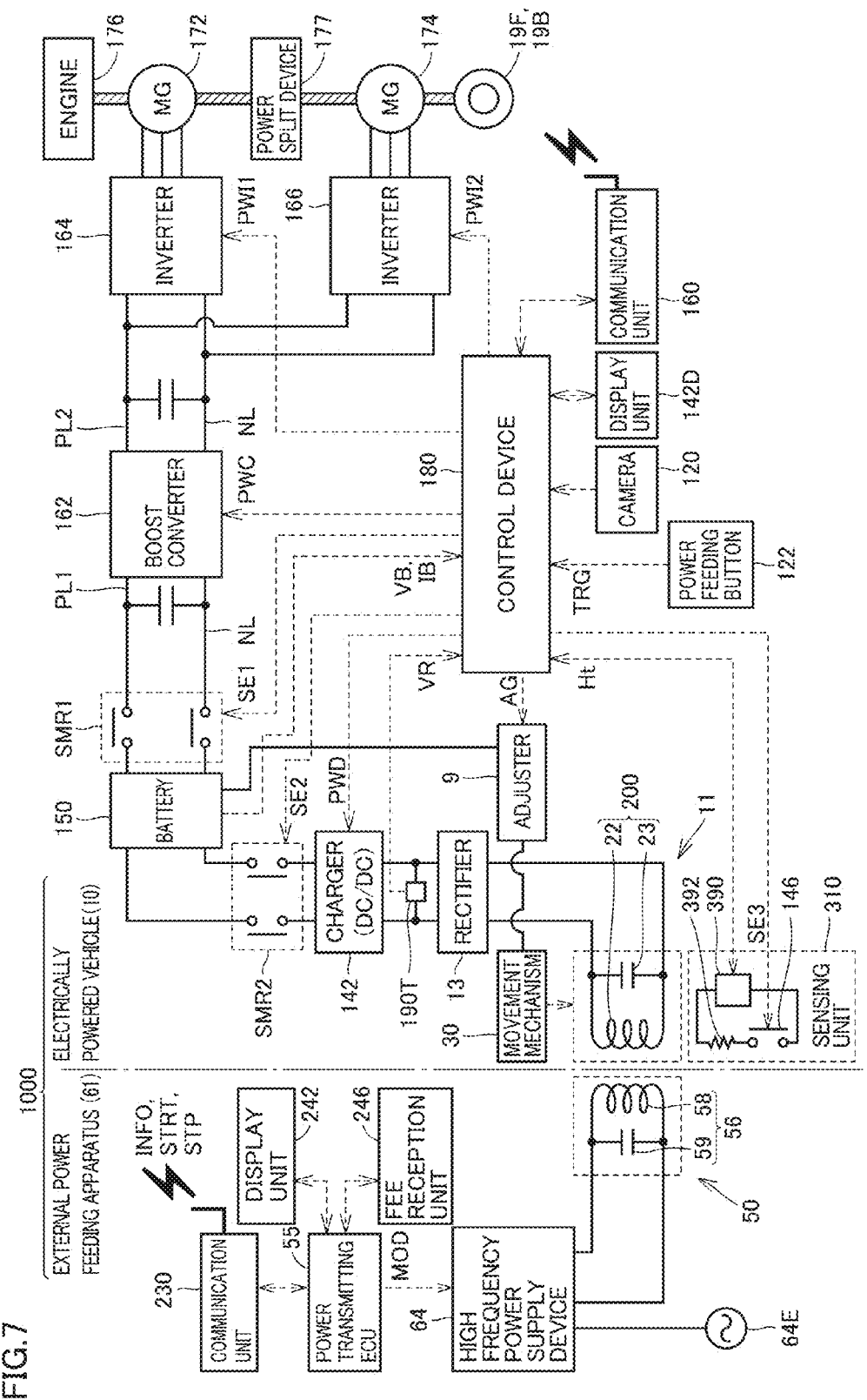
FIG. 7 specifically shows a circuit configuration of power transfer system 1000 in an embodiment.

FIG. 6 schematically shows power transfer system 1000 in an embodiment. FIG. 7 specifically shows a circuit configuration of power transfer system 1000. With reference to FIG. 6 and FIG. 7, power transfer system 1000 includes external power feeding apparatus 61 and electrically powered vehicle 10.

External Power Feeding Apparatus 61

External power feeding apparatus 61 includes the above described power transmitting device 50 (and power transmitting unit 56 and the like), and in addition thereto a communication unit 230, a power transmitting ECU 55, high frequency power supply device 64, a display unit 242 (see FIG. 7), and a fee reception unit 246 (see FIG. 7).

Power transmitting unit 56 has power transmitting coil 58 and capacitor 59. For the sake of convenience, FIG. 7 does not show coil unit 60 (or ferrite core 57). Power transmitting coil 58 is electrically connected to capacitor 59 and high frequency power supply device 64. High frequency power supply device 64 is connected to an ac power supply 64E. Ac power supply 64E may be a commercial power supply or an independent power supply device.

In the FIG. 7 example, power transmitting coil 58 and capacitor 59 are connected in parallel. Power transmitting coil 58 and capacitor 59 may be connected in series. Power transmitting coil 58 has a stray capacitance. The inductance of power transmitting coil 58, and the stray capacitance of power transmitting coil 58 and the capacitance of capacitor 59 form an electrical circuit (or LC resonant circuit). Capacitor 59 is not essential in configuration and may be used as required.

Power transmitting coil 58 transmits electric power to power receiving coil 22 of power receiving unit 200 contactlessly by electromagnetic induction. Power transmitting coil 58 has its number of turns and inter-coil distance set as appropriate, based on its distance to power receiving coil 22, the frequencies of power transmitting coil 58 and power receiving coil 22, and the like, so that a coupling coefficient (κ) representing a degree of coupling of power transmitting coil 58 and power receiving coil 22 has an appropriate value.

Power transmitting ECU 55 includes a CPU, a storage device and an input/output buffer, and power transmitting ECU 55 receives a signal from each sensor and outputs a control signal to each device, and also controls each device in external power feeding apparatus 61. Note that such control may not be processed by software, and may be processed by dedicated hardware (or electronic circuitry).

Power transmitting ECU 55 drivably controls high frequency power supply device 64. High frequency power supply device 64 is controlled by a control signal MOD (see FIG. 7) issued from power transmitting ECU 55, and receives electric power from ac power supply 64E and converts it to electric power of high frequency. High frequency power supply device 64 supplies the high frequency electric power to power transmitting coil 58.

Communication unit 230 is a communication interface for performing wireless communications between external power feeding apparatus 61 and electrically powered vehicle 10 (or communication unit 160). Communication unit 230 receives from communication unit 160 battery information INFO and signals STRT and STP indicating that forming a test magnetic field (or a test electric field) should be started/stopped and that substantial power transfer should be started/stopped, and communication unit 230 outputs these pieces of information to power transmitting ECU 55.

Before the battery is charged, the user inserts cash, a prepaid card, a credit card or the like into fee reception unit 246. Display unit 242 displays to the user a unit cost of electric power charged and the like. Display unit 242 also has a function as an input unit such as a touchscreen panel, and can receive an input indicating whether the user accepts the unit cost of electric power charged. When the unit cost of electric power charged is accepted by the user, power transmitting ECU 55 causes high frequency power supply device 64 to start substantially charging the battery. After charging the battery is completed, fee reception unit 246 settles the fee.

In power transfer system 1000 of the present embodiment, before external power feeding apparatus 61 starts to substantially feed electrically powered vehicle 10 with electric power, electrically powered vehicle 10 is guided toward external power feeding apparatus 61 to align power receiving device 11 with power transmitting device 50.

This is done as follows: Initially, in a first stage, camera 120 obtains an image which is in turn referred to sense a positional relationship between power receiving device 11 and power transmitting device 50, and, based on the sensed positional relationship, electrically powered vehicle 10 is controlled to travel to be guided to power transmitting device 50. Camera 120 obtains an image of the plurality of light emitting units 231 (see FIG. 5) and the plurality of light emitting units 231 are thus recognized positionally and in orientation via the image. From the resultant image recognition, power transmitting device 50 and electrically powered vehicle 10 are recognized positionally and in orientation, and, based on the result of that recognition, electrically powered vehicle 10 is guided to power transmitting device 50.

Power receiving device 11 and power transmitting device 50 face each other in an area smaller than that of bottom surface 76 of vehicular body 70 (see FIG. 3). Electrically powered vehicle 10 is moved to overlie power transmitting device 50. When camera 120 can no longer obtain (or no longer obtains) an image of power transmitting device 50 (or light emitting unit 231), the alignment control is switched from the first stage to a second stage.

In the second stage, power transmitting ECU 55 causes high frequency power supply device 64 to transmit a test signal by a weak electric power. Power transmitting device 50 receives the weak electric power and forms a test magnetic field (or a test electric field). The weak electric power may include electric power smaller than electric power charged to the battery after authentication, or electric power transmitted in the alignment intermittently. The weak electric power thus allows power transmitting device 50 to form a test magnetic field (or a test electric field) surrounding power transmitting device 50.

In the second stage, to form the test magnetic field, power transmitting device 50 sends as the test signal electric power of a magnitude, which is set to be smaller than that which power transmitting device 50 supplies to power receiving device 11 to charge the battery after power receiving device 11 has been aligned with power transmitting device 50. Power transmitting device 50 forms the test magnetic field in the second stage in order to allow a distance between power transmitting device 50 and sensing unit 310 be sensed to measure where power transmitting device 50 and electrically powered vehicle 10 (or power receiving device 11) are located relative to each other, and doing so does not require large electric power applied in substantial power feeding.

The test magnetic field has a magnetic field intensity, which is sensed by sensing unit 310 provided at bottom surface 76 of electrically powered vehicle 10. Sensing unit 310 senses the magnetic field intensity and therefrom a distance between power transmitting device 50 and power receiving device 11 is sensed. Information regarding the distance is used to further guide electrically powered vehicle 10 to power transmitting device 50 to align power receiving device 11 with power transmitting device 50. (How this is done will more specifically be described in a flowchart with reference to FIG. 19 to FIG. 24.)

Electrically Powered Vehicle 10

With reference mainly to FIG. 7, electrically powered vehicle 10 includes power receiving device 11, sensing unit 310, movement mechanism 30, an adjuster 9, rectifier 13, a received voltage measurement unit (or voltage sensor 190T), battery 150, a charger (or DC/DC converter 142) charging battery 150, system main relays SMR1, SMR2, a boost converter 162, inverters 164, 166, motor generators 172, 174, engine 176, a power split device 177, vehicular wheels 19F, 19B, a control device 180, a power feeding button 122, camera 120, a display unit 142D, and communication unit 160.

Power receiving device 11 receives electric power from power transmitting device 50 while electrically powered vehicle 10 is stopped in parking space 52 (see FIG. 6) at a prescribed position and power receiving device 11 faces power transmitting device 50. Power receiving device 11 has power receiving unit 200 supported by movement mechanism 30. Movement mechanism 30 can be driven to cause power receiving unit 200 to ascend and descend, as will more specifically be described hereinafter with reference to FIG. 9 and the like. Adjuster 9 adjusts the amount of electric power supplied from battery 150 to movement mechanism 30 (or motor 82 (see FIG. 9) described later). Control device 180 transmits a control signal AG to adjuster 9 to control movement mechanism 30 via adjuster 9 drivably.

Sensing unit 310 has a measurement unit 390, a sensor portion 392, and a relay 146. Measurement unit 390 uses sensor portion 392 to measure the magnetic field intensity of the test magnetic field (or the electric field intensity of the test electric field). Information regarding magnetic field intensity Ht is sent from measurement unit 390 to control device 180. Control signal AG transmitted to adjuster 9 is adjusted based on the information regarding magnetic field intensity Ht.

The power receiving device 11 power receiving unit 200 has power receiving coil 22 and capacitor 23. For the sake of convenience, FIG. 7 does not show coil unit 24 (or ferrite core 21). Power receiving coil 22 is connected to capacitor 23 and rectifier 13. In the FIG. 7 example, power receiving coil 22 and capacitor 23 are connected in parallel. Power receiving coil 22 and capacitor 23 may be connected in series. Power receiving coil 22 has a stray capacitance. The inductance of power receiving coil 22, and the stray capacitance of power receiving coil 22 and the capacitance of capacitor 23 form an electrical circuit (or LC resonant circuit). Capacitor 23 is not essential in configuration and may be used as required.

Rectifier 13 is connected to power receiving device 11, and rectifier 13 receives an alternating current from power receiving device 11, converts the received alternating current into a direct current and supplies the direct current to DC/DC converter 142. Battery 150 is connected to DC/DC converter 142. DC/DC converter 142 receives the direct current from rectifier 13, adjusts the received direct current in voltage, and thus supplies it to battery 150.

Rectifier 13 includes a diode bridge and a smoothing capacitor (both unshown) for example. Rectifier 13 can alternatively be a so-called switching regulator using a switching control to provide rectification. Rectifier 13 may be included in power receiving unit 200, and accordingly, it is preferable that rectifier 13 be a static rectifier such as a diode bridge for example to prevent a switching device from erroneously operating as an electromagnetic field is generated.

Electrically powered vehicle 10 has engine 176 and motor generator 174 mounted therein as a source of motive power. Engine 176 and motor generators 172, 174 are coupled with power split device 177. Electrically powered vehicle 10 travels as driven by a driving force generated from at least one of engine 176 and motor generator 174. Engine 176 generates motive power which is in turn split for two paths by power split device 177. One of the two paths is a path for transmission to vehicular wheels 19F and 19B, and the other of the two paths is a path for transmission to motor generator 172.

Motor generator 172 is an ac rotating electric machine and for example includes a 3 phase ac synchronous motor having a rotor with a permanent magnet embedded therein. Motor generator 172 generates electric power using kinetic energy of engine 176 split by power split device 177. For example, when battery 150 has a state of charge (SOC) reduced to be smaller than a predetermined value, engine 176 starts and motor generator 172 generates electric power to charge battery 150.

Motor generator 174 is also an ac rotating electric machine and, as well as motor generator 172, for example includes a 3 phase ac synchronous motor having a rotor with a permanent magnet embedded therein. Motor generator 174 generates driving force using at least one of the electric power stored in battery 150 and the electric power generated by motor generator 172. Motor generator 174 provides driving force which is in turn transmitted to vehicular wheels 19F, 19B.

When electrically powered vehicle 10 is braked, or goes downhill and is accordingly decelerated, the mechanical energy stored in electrically powered vehicle 10 as kinetic energy or potential energy is used via vehicular wheels 19F and 19B to rotate motor generator 174 drivably to thus operate motor generator 174 as a power generator. Motor generator 174 operates as a regenerative brake, and converts running energy into electric power and generates a braking force. The electric power generated by motor generator 174 is stored to battery 150.

Power split device 177 can be implemented as a planetary gear including a sun gear, a pinion gear, a carrier, and a ring gear. The pinion gear engages with the sun gear and the ring gear. The carrier supports the pinion gear rotatably about its own axis, and is also coupled to the crankshaft of engine 176. The sun gear is coupled to a rotation shaft of motor generator 172. The ring gear is coupled to a rotation shaft of motor generator 174 and vehicular wheels 19F, 19B.

Battery 150 is a chargeably and dischargeably configured electric power storage component. Battery 150 for example includes a rechargeable battery such as a lithium ion battery, a nickel metal hydride battery or a lead acid battery, or a power storage element such as an electric double layer capacitor, or the like. In battery 150 are stored electric power supplied from DC/DC converter 142 and regenerated electric power generated by motor generators 172, 174. Battery 150 supplies the stored electric power to boost converter 162.

Battery 150 can be a capacitor of large capacitance. Battery 150 may be any power buffer that can temporarily store electric power supplied from external power feeding apparatus 61, regenerated electric power received from motor generators 172, 174 and the like and supply the stored electric power to boost converter 162.

Battery 150 is provided with a voltage sensor for sensing a voltage VB of battery 150 and a current sensor for sensing a current IB input to and output from battery 150, although none of them is shown. These sensed values are output to control device 180. From voltage VB and current IB, control device 180 calculates a state of charge (SOC) of battery 150.

System main relay SMR1 is disposed between battery 150 and boost converter 162. When a signal SE1 issued from control device 180 is activated, system main relay SMR1 electrically connects battery 150 to boost converter 162. When signal SE1 is deactivated, system main relay SMR1 shuts down an electrical path between battery 150 and boost converter 162. Boost converter 162 includes a dc chopper circuit, for example. Boost converter 162 is controlled in response to a signal PWC issued from control device 180, and boosts voltage applied between a power line PL1 and a power line NL and outputs it between a power line PL2 and power line NL.

Inverters 164, 166 include a 3 phase bridge circuit, for example. Inverters 164, 166 are associated with motor generators 172, 174, respectively. Inverter 164 operates in response to a signal PWI1 issued from control device 180 to drive motor generator 172. Inverter 166 operates in response to a signal PWI2 issued from control device 180 to drive motor generator 174.

Rectifier 13 rectifies ac power extracted by power receiving coil 22. DC/DC converter 142 operates in response to a signal PWD issued from control device 180 to convert the electric power rectified by rectifier 13 into a voltage level of battery 150 and output it to battery 150. DC/DC converter 142 is not essential in configuration and may be used as required. When DC/DC converter 142 is not used, a matching device may be provided between the external power feeding apparatus 61 power transmitting device 50 and high frequency power supply device 64. This matching device can match impedance and can substitute for DC/DC converter 142.

System main relay SMR2 is disposed between DC/DC converter 142 and battery 150. When a control signal SE2 issued from control device 180 is activated, system main relay SMR2 electrically connects battery 150 to DC/DC converter 142. When control signal SE2 is deactivated, system main relay SMR2 shuts down an electrical path between battery 150 and DC/DC converter 142.

Control device 180 receives signals from an accelerator pedal position sensor, a vehicular speed sensor and other various sensors, and in response thereto generates signals PWC, PWI1, and PWI2 for driving boost converter 162 and motor generators 172, 174, respectively. Control device 180 outputs the generated signals PWC, PWI1, and PWI2 to boost converter 162 and inverters 164, 166, respectively. When electrically powered vehicle 10 travels, control device 180 activates signal SE1 to turn on system main relay SMR1 and deactivates signal SE2 to turn off system main relay SMR2.

Before external power feeding apparatus 61 feeds electric power to electrically powered vehicle 10, control device 180 receives via power feeding button 122 a start charging signal TRG input by a user operation or the like. When a prescribed condition has been established, control device 180 outputs signal STRT via communication unit 160 to external power feeding apparatus 61 to instruct it to start forming a test magnetic field (or a test electric field).

After control device 180 communicates with external power feeding apparatus 61, display unit 142D of electrically powered vehicle 10 for example displays a decision or the like of whether power transmitting unit 56 of external power feeding apparatus 61 conforms to power receiving unit 200 of electrically powered vehicle 10. If so, and the user also inputs his/her confirmation, then communication unit 160 and communication unit 230 further communicate with each other wirelessly to communicate information therebetween for aligning power receiving device 11 with power transmitting device 50.

Control device 180 receives from camera 120 an image obtained via camera 120. Control device 180 receives via communication unit 160 information of electric power (voltage and current) that is sent from external power feeding apparatus 61. Control device 180 uses data received from camera 120 to control electrically powered vehicle 10 in a method described hereinafter to guide the vehicle to power transmitting device 50 for parking the vehicle.

Control device 180 senses the test magnetic field's magnetic field intensity (or the test electric field's electric field intensity) via sensing unit 310, and to do so, control device 180 issues control signal SE2 to system main relay SMR2 (see FIG. 7) to turn off system main relay SMR2, and issues a control signal SE3 to relay 146 (see FIG. 7) of sensing unit 310 to turn on relay 146.

By temporarily turning on relay 146 to connect sensor portion 392 to measurement unit 390, control device 180 can obtain information regarding the magnetic field intensity of the test magnetic field (or the electric field intensity of the test electric field) sensed by sensor portion 392. To obtain this information, a request is transmitted from electrically powered vehicle 10 via communication units 160, 230 to external power feeding apparatus 61 to form the test magnetic field (or transmit weak electric power).

Control device 180 receives from sensing unit 310 information regarding magnetic field intensity Ht (or an electric field intensity) sensed by sensor portion 392. Control device 180 uses data received from measurement unit 390 to control electrically powered vehicle 10 in a method described hereinafter to guide the vehicle to power transmitting device 50 of external power feeding apparatus 61 to thus park the vehicle.

Once the vehicle thus controlled has been parked at power transmitting device 50, control device 180 transmits a feed power command to external power feeding apparatus 61 via communication unit 160 and also activates control signal SE2 to turn on system main relay SMR2. Control device 180 generates signal PWD for driving DC/DC converter 142 and outputs the generated signal PWD to DC/DC converter 142. Control device 180 outputs control signal AG to control adjuster 9. Adjuster 9 operates in response to control signal AG to drive movement mechanism 30 to cause the power receiving device 11 power receiving unit 200 to descend, as will more specifically be described hereinafter. Power receiving unit 200 and power transmitting unit 56 face each other and in that condition substantial power transfer is performed therebetween.

Voltage sensor 190T is provided between paired power lines connecting rectifier 13 and battery 150. When electrically powered vehicle 10 is contactlessly fed with electric power and thus charged, voltage sensor 190T senses a voltage input to DC/DC converter 142 and presents it as a sensed value (i.e., voltage VR). Voltage sensor 190T senses voltage VR between rectifier 13 and DC/DC converter 142 and outputs the sensed value to control device 180.

Voltage sensor 190T senses a dc voltage appearing at a secondary side of rectifier 13, i.e., the voltage of the electric power received from power transmitting device 50, and outputs the sensed value (of voltage VR) to control device 180. Control device 180 determines power receiving efficiency from voltage VR and transmits information regarding power receiving efficiency to external power feeding apparatus 61 via communication unit 160. When battery 150 is fully charged or the user performs an operation or the like, control device 180 outputs signal STP via communication unit 160 to external power feeding apparatus 61 to stop it from transferring electric power.

Control Device 180

Figure 8:
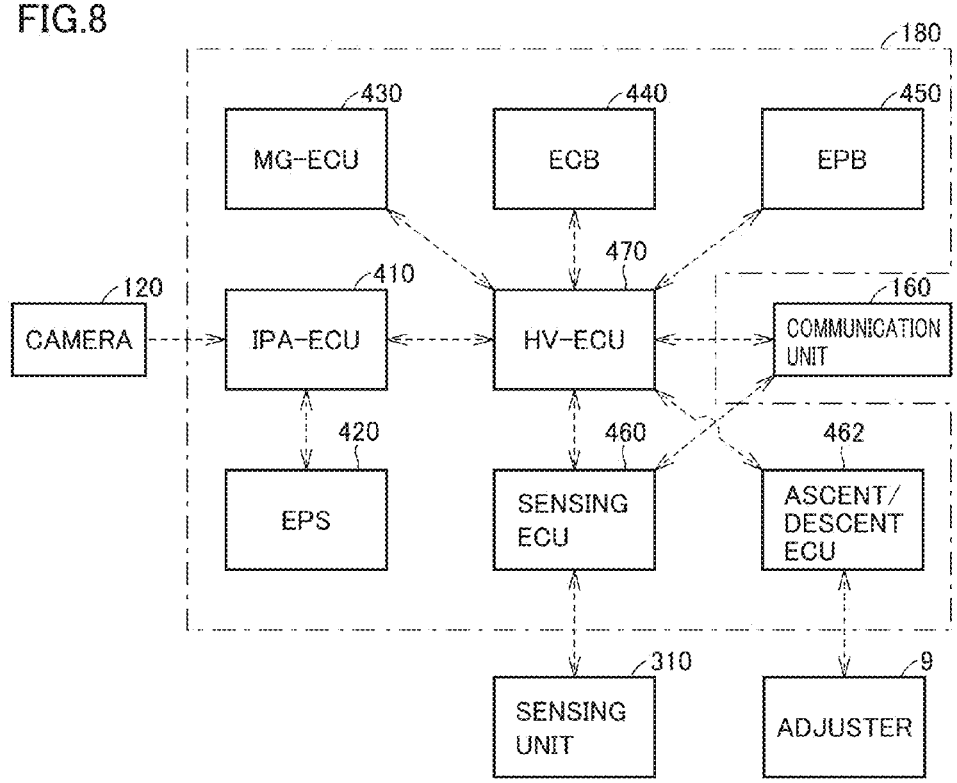
FIG. 8 is a functional block diagram of a control device 180 indicated in FIG. 7.

FIG. 8 is a functional block diagram of control device 180 indicated in FIG. 7. Control device 180 includes an intelligent parking assist (IPA) electronic control unit (ECU) 410, an electric power steering (EPS) 420, a motor generator (MG) ECU 430, an electronically controlled brake (ECB) 440, an electric parking brake (EPB) 450, a sensing ECU 460, an ascent/descent ECU 462, and a hybrid vehicle (HV) ECU 470.

When the vehicle's mode of operation is a charging mode, IPA ECU 410 refers to image information received from camera 120 to accordingly control and thus guide the vehicle to the external power feeding apparatus 61 power transmitting device 50 (i.e., perform a first guidance control). IPA ECU 410 recognizes power transmitting device 50 from the image information received from camera 120. IPA ECU 410 recognizes a positional relationship with power transmitting device 50 (i.e., an approximate distance thereto and its orientation) from an image of the plurality of light emitting units 231 as presented by camera 120. Based on the resultant recognition, IPA ECU 410 outputs a command to EPS 420 to appropriately orient and thus guide the vehicle to power transmitting device 50.

When the vehicle approaches and thus overlies power transmitting device 50 and camera 120 no longer obtains any image of power transmitting device 50, IPA ECU 410 informs HV ECU 470 that a guidance control based on image information received from camera 120 (i.e., the first guidance control) ends. When the first guidance control is performed, EPS 420 operates in response to a command issued from IPA ECU 410 to perform automatic steering control.

MG ECU 430 serves as a vehicle driving unit, and operates in response to a command issued from HV ECU 470 to control motor generators 172, 174 and boost converter 162. MG ECU 430 generates signals for driving motor generators 172, 174 and boost converter 162, and outputs the signals to inverters 164, 166 and boost converter 162, respectively.

ECB 440 operates in response to a command issued from HV ECU 470 to control electrically powered vehicle 10 to brake it. ECB 440 operates in response to a command issued HV ECU 470 to control a hydraulic brake and also control the hydraulic brake and a regenerative brake that is applied by motor generator 174 cooperatively. EPB 450 operates in response to a command issued HV ECU 470 to control an electrically powered parking brake.

Sensing ECU 460 receives information of electric power that is output from external power feeding apparatus 61 via communication units 160, 230. Sensing ECU 460 receives information regarding magnetic field intensity Ht of the test magnetic field from sensing unit 310 (or measurement unit 390). Sensing ECU 460 for example compares the voltage of the electric power transmitted from external power feeding apparatus 61 with a voltage calculated from the information regarding magnetic field intensity Ht to calculate a distance between power transmitting device 50 and electrically powered vehicle 10. Sensing ECU 460 refers to the sensed distance to accordingly control and thus guide electrically powered vehicle 10 (i.e., perform a second guidance control).

HV ECU 470, which serves as a control unit, follows a result of the first or second guidance control to control MG ECU 430 that drives electrically powered vehicle 10 to move the vehicle. Power receiving device 11 including sensing unit 310, MG ECU 430 serving as the vehicle driving unit, and HV ECU 470 serving as the control unit can function as a parking assisting device.

When IPA ECU 410 no longer senses power transmitting device 50 and thereafter MG ECU 430 is further controlled to further move the vehicle beyond a prescribed distance, and sensing unit 310 still does not sense that magnetic field intensity Ht satisfies a prescribed condition for allowing electric power to be received, then, HV ECU 470 performs a process for stopping electrically powered vehicle 10 from moving. This process may be a process performed to automatically brake the vehicle or a process performed to instruct the driver to depress the brake pedal.

When IPA ECU 410 no longer senses where power transmitting device 50 is located and thereafter MG ECU 430 is further controlled to further move the vehicle beyond the prescribed distance, and sensing unit 310 still does not sense that magnetic field intensity Ht satisfies the prescribed condition for allowing electric power to be received, then, HV ECU 470 stops sensing unit 310 from sensing the magnetic field intensity and interrupts guiding the vehicle via sensing ECU 460.

When IPA ECU 410 no longer senses where power transmitting device 50 is located and thereafter the vehicle is moved by the prescribed distance, and therewhile sensing unit 310 senses that magnetic field intensity Ht satisfies the prescribed condition for allowing electric power to be received, then, HV ECU 470 ends the guidance provided via sensing ECU 460, and starts a preparation for allowing power transmitting device 50 to charge battery 150 mounted in the vehicle. Ascent/descent ECU 462 controls adjuster 9 to use movement mechanism 30 to cause power receiving device 11 (or power receiving unit 200) to descend.

Preferably, after HV ECU 470 automatically stops electrically powered vehicle 10 and interrupts the guidance performed via sensing ECU 460, the driver changes the parking position and subsequently in response to the driver's instruction (e.g., an operation for setting to the parking range) HV ECU 470 may start transmitting or receiving electric power via power receiving device 11, and if power receiving device 11 receives from power transmitting device 50 electric power satisfying the prescribed condition for allowing electric power to be received, HV ECU 470 may start charging battery 150 mounted in the vehicle from power transmitting device 50, whereas if power receiving device 11 does not receive from power transmitting device 50 electric power satisfying the prescribed condition for allowing electric power to be received, HV ECU 470 may warn the driver accordingly.

Movement Mechanism 30

Figure 9:
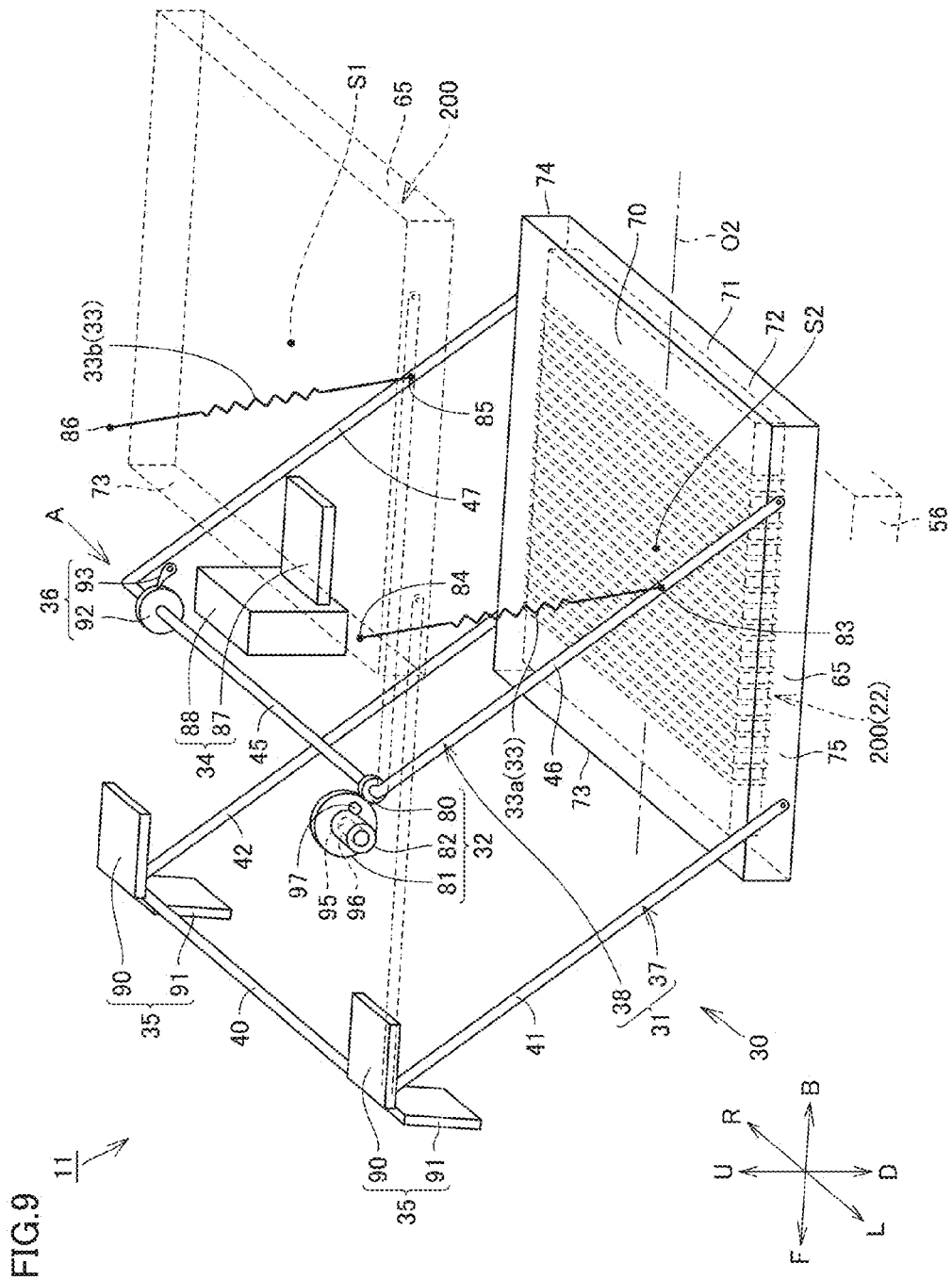
FIG. 9 is a perspective view of a power receiving unit 200 and a movement mechanism 30.

FIG. 9 is a perspective view of power receiving unit 200 and movement mechanism 30. Power receiving device 11 includes movement mechanism 30. Movement mechanism 30 can move power receiving unit 200 toward and away from power transmitting unit 56. Movement mechanism 30 can move power receiving unit 200 to a first position S1 and second positions S2, S2A and S2B described hereinafter. In the present embodiment, second position S2 (see FIG. 9), second position S2A (see FIGS. 12 and 13), and second position S2B (see FIG. 14) are all assumed vertically obliquely below first position S1.

FIG. 9 at an upper right portion represents power receiving unit 200 by a dotted line, which indicates a position that power receiving unit 200 assumes when it is accommodated to the electrically powered vehicle 10 vehicular body 70 and thus disposed in first position S1. When power receiving unit 200 is disposed in first position S1, a reference point in power receiving unit 200 includes a spatial position (or an imaginary point), or first position S1 (in other words, the reference point in power receiving unit 200 overlaps first position S1). The reference point in the power receiving unit 200 is for example center P2 of power receiving coil 22 (see FIG. 3). As has been set forth above, center P2 is an imaginary point located on winding axis O2 of power receiving coil 22 and is located at a center of power receiving coil 22 as seen along winding axis O2.

FIG. 9 at a lower center portion represents power receiving unit 200 by a solid line, which indicates a position that power receiving unit 200 assumes when it is moved downward from the electrically powered vehicle 10 vehicular body 70 and thus disposed in second position S2. When power receiving unit 200 is disposed in second position S2, the reference point in power receiving unit 200 includes a spatial position (or an imaginary point), or second position S2 (in other words, the reference point in power receiving unit 200 overlaps second position S2).

First position S1 and second position S2 assumed by power receiving unit 200 are mutually different positions and can each be any spatial position. In the present embodiment, second position S2 is remoter from the vehicular body 70 bottom surface 76 (see FIGS. 2 and 3) than first position S1 is. In the vertical direction, first position S1 has a shorter distance to the vehicular body 70 bottom surface 76 than second position S2 does. When power receiving unit 200 in first position S1 is compared with that in second position S2, the latter is closer to power transmitting unit 56 than the former is.

Movement mechanism 30 includes a link mechanism 31 (support members 37 and 38), a drive unit 32, a biasing member 33 (resilient members 33a and 33b), a holding device 34, a stopper 35, and a switching unit 36. Biasing member 33 includes resilient members 33a and 33b. Link mechanism 31 includes support members 37 and 38. Support members 37 and 38 are mutually spaced in a direction parallel to winding axis O2, and together with casing 65 configure a so called parallel link mechanism.

Support member 37 includes a rotary shaft 40 and legs 41 and 42. Rotary shaft 40 is rotatably supported by floor panel 69 (see FIG. 3) and the like. Leg 41 is connected to one end of rotary shaft 40. Leg 41 has a lower end rotatably connected to casing 65 at side wall 75. Leg 42 is connected to the other end of rotary shaft 40. Leg 42 has a lower end rotatably connected to casing 65 at side wall 74.

Support member 38 includes a rotary shaft 45 and legs 46 and 47. Rotary shaft 45 is rotatably supported by floor panel 69 (see FIG. 3) and the like. Leg 46 is connected to one end of rotary shaft 45. Leg 46 has a lower end rotatably connected to casing 65 at side wall 75. Leg 47 is connected to the other end of rotary shaft 45. Leg 47 has a lower end rotatably connected to casing 65 at side wall 74.

Drive unit 32 includes a gear 80, a gear 81, and a motor 82. Gear 80 is provided at an end of rotary shaft 45. Gear 81 meshes with gear 80. Motor 82 rotates gear 81. Motor 82 has a rotor 95, a stator 96 surrounding rotor 95, and an encoder 97 that senses an angle of rotation of rotor 95. Rotor 95 is connected to gear 81.

When motor 82 receives electric power, rotor 95 rotates. Gear 81 rotates and gear 80 meshing with gear 81 also rotates. As gear 80 is fixed to rotary shaft 45, gear 80 rotates with rotary shaft 45. As rotary shaft 45 rotates, power receiving unit 200 and casing 65 ascend/descend. Motor 82 provides driving force which is in turn transmitted to power receiving unit 200 and casing 65. Depending on a direction in which motor 82 rotates, power receiving unit 200 and casing 65 ascend or descend.

Resilient member 33a is connected to leg 46 and floor panel 69 (see FIG. 3). Resilient member 33a has an end 83 rotatably connected to leg 46 at a side of leg 46 closer to the lower end thereof than the center thereof. Resilient member 33a has an end 84 rotatably connected to floor panel 69 and end 84 is located opposite to support member 37 with regard to a connection part between leg 46 and rotary shaft 45.

Resilient member 33b is connected to leg 47 and floor panel 69 (see FIG. 3). Resilient member 33b has an end 85 rotatably connected to leg 47 at a side of leg 47 closer to the lower end thereof than the center thereof. Resilient member 33b has an end 86 rotatably connected to floor panel 69 and end 86 is located opposite to support member 37 with regard to a connection part between leg 47 and rotary shaft 45.

As represented in FIG. 9 at the upper right portion by the dotted line, when power receiving unit 200 is disposed in first position S1 (i.e., when power receiving unit 200 is disposed to include first position S1), resilient members 33a and 33b have a natural length and thus present a so-called natural state (or an unloaded state).

As represented in FIG. 9 at the lower center portion by the solid line, when power receiving unit 200 is disposed in second position S2 (i.e., when power receiving unit 200 is disposed to include second position S2), resilient members 33a and 33b have a length longer than the natural length and thus present an extended state. Resilient members 33a and 33b are tensioned. This tension exerts force to bias casing 65 having power receiving unit 200 housed therein to move power receiving unit 200 in a direction to return to first position S1.

Holding device 34 includes a body 88 and a support member 87. Body 88 is secured to floor panel 69 (see FIG. 3) or the like. Support member 87 is held to body 88 and adjusted in by how much amount it projects from body 88. As has been set forth above, in FIG. 9 a dotted line is used to represent power receiving unit 200 and casing 65 positioned to include first position S1 and hence in a state before power receiving unit 200 descends toward power transmitting unit 56, i.e., in an accommodated state.

Support member 87 supports the accommodated casing 65 at the bottom surface (or the lid) and thus secures casing 65 having power receiving unit 200 housed therein to a prescribed area provided at vehicular body 70 to accommodate casing 65 therein. To do so, casing 65 may have end wall 73 provided with a hole to receive support member 87 therein. Support member 87 is driven as controlled by ascent/descent ECU 462 shown in FIG. 8.

A pair of stoppers 35 includes stopper pieces 90 and 91 to restrain legs 41 and 42 in angle of rotation to define a range allowing casing 65 having power receiving unit 200 housed therein to move. Stopper piece 90 serves to abut against legs 41, 42 to prevent casing 65 having power receiving unit 200 housed therein from coming into contact with the electrically powered vehicle 10 floor panel 69 and the like. Stopper piece 91 serves to abut against legs 41, 42 to prevent casing 65 having power receiving unit 200 housed therein from coming into contact with a member placed on the ground surface or the like.

Switching unit 36 includes a gear 92 fixed to rotary shaft 45, and a stopper 93 engaging with gear 92. Stopper 93 is driven as controlled by ascent/descent ECU 462 shown in FIG. 8. This engages stopper 93 with gear 92 or disengages stopper 93 from gear 92. When stopper 93 engages with gear 92, rotary shaft 45 is restrained from rotating in a direction allowing power receiving unit 200 to descend, i.e., in a restraint state. The restraint state permits power receiving unit 200 to move away from power transmitting unit 56 and also prevents power receiving unit 200 from approaching power transmitting unit 56.

When stopper 93 is disengaged from gear 92, rotary shaft 45 is permitted to rotate in a direction allowing power receiving unit 200 to ascend and a direction allowing power receiving unit 200 to descend (i.e., a permissive state). The permissive state permits power receiving unit 200 to move away from power transmitting unit 56 and also permits power receiving unit 200 to approach power transmitting unit 56.

Figure 10:
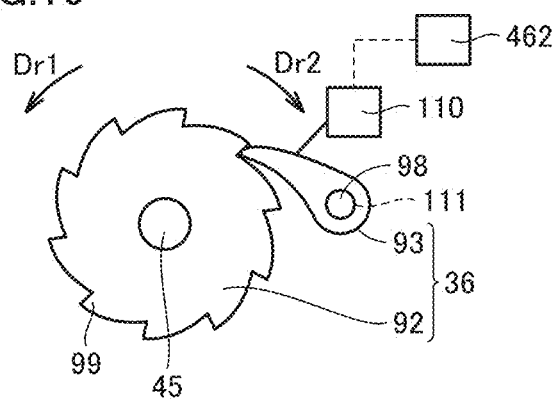
FIG. 10 is a schematic side view of a switching unit 36, as seen in a direction indicated by an arrow A indicated in FIG. 9.

FIG. 10 is a schematic side view of switching unit 36, as seen in a direction indicated in FIG. 9 by an arrow A. Switching unit 36 includes gear 92 fixed to rotary shaft 45, stopper 93 selectively engaging with a plurality of teeth of gear 92, and a drive unit 110. Stopper 93 is rotatably provided on an axial shaft 98. Axial shaft 98 is provided with a torsion spring 111. Stopper 93 is biased by a force applied by torsion spring 111. Stopper 93 has a tip pressed against a circumferential surface of gear 92.

Drive unit 110 together with axial shaft 98 rotates stopper 93. Drive unit 110 rotates stopper 93 to allow stopper 93 to have its tip moved away from the circumferential surface of gear 92 against the force applied by torsion spring 111 to bias the stopper. Drive unit 110 is controlled by control device 180 (or ascent/descent ECU 462) to switch a state allowing stopper 93 to have its tip engaged with a tooth 99 to a state allowing stopper 93 to have its tip separated from gear 92 to disengage stopper 93 from gear 92, and vice versa.

A direction of rotation Dr1 is a direction in which rotary shaft 45 and gear 92 rotate when casing 65 having power receiving unit 200 housed therein ascends, and a direction of rotation Dr2 is a direction in which rotary shaft 45 and gear 92 rotate when casing 65 having power receiving unit 200 housed therein descends. When stopper 93 engages with gear 92, gear 92 is restrained from rotating in direction of rotation Dr2. With stopper 93 engaged with gear 92, gear 92 can still rotate in direction of rotation Dr1.

As has been described above with reference to FIG. 7, adjuster 9 adjusts an amount of electric power supplied from battery 150 to motor 82 of movement mechanism 30 (see FIG. 9). Control device 180 transmits control signal AG (see FIG. 7) to adjuster 9 to control movement mechanism 30 via adjuster 9 drivably.

Hereinafter will be described an operation performed when the power receiving device 11 power receiving unit 200 receives electric power from power transmitting unit 56. When power receiving unit 200 receives electric power from power transmitting unit 56, electrically powered vehicle 10 is assisted via camera 120 and sensing unit 310 to be parked and thus stopped at a prescribed position.

Figure 11:
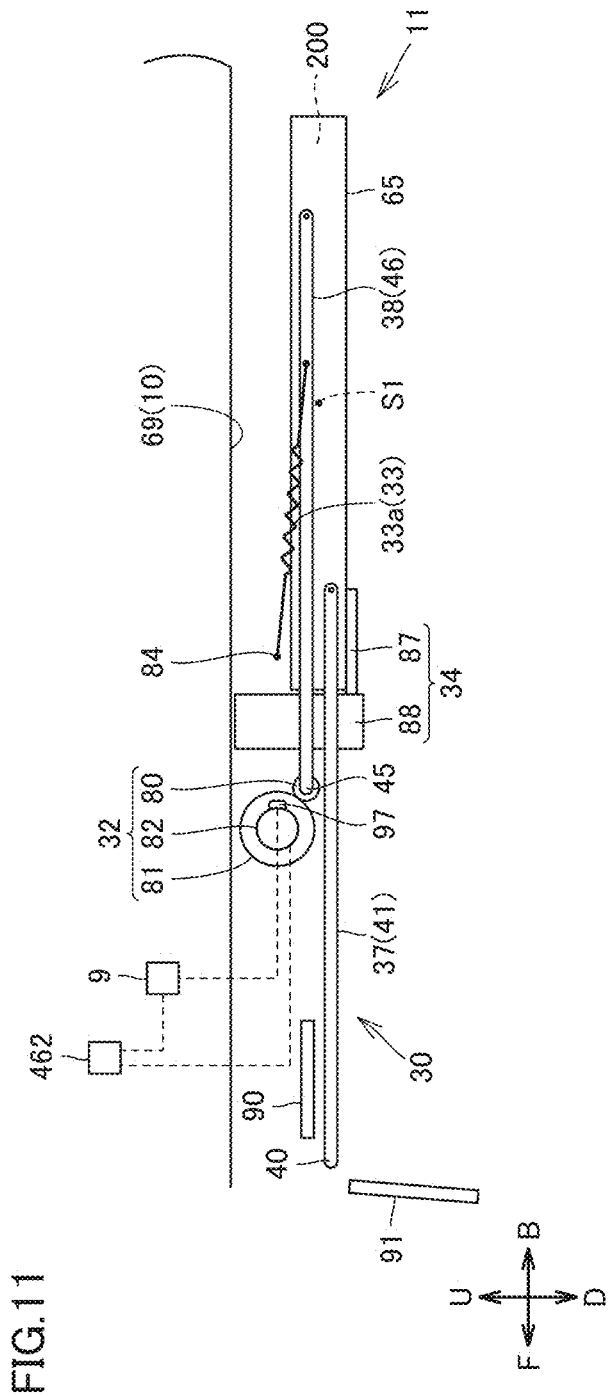
FIG. 11 is a side view of power receiving unit 200, a casing 65, and movement mechanism 30 as seen when electrically powered vehicle 10 stops at a prescribed position.

FIG. 11 is a side view of power receiving unit 200, casing 65, and movement mechanism 30 as seen when electrically powered vehicle 10 stops at the prescribed position. Casing 65 is supported by holding device 34, adjacent to floor panel 69. Casing 65 is secured to the accommodation position and power receiving unit 200 is located to include first position S1. In this state, biasing member 33 has a natural length, and biasing member 33 does not apply tension to casing 65 having power receiving unit 200 housed therein.

When power receiving unit 200 receives electric power contactlessly, ascent/descent ECU 462 drives holding device 34 to retract support member 87 from a lower surface of casing 65. Ascent/descent ECU 462 turns on adjuster 9 to allow battery 150 to supply motor 82 with electric power.

Figure 12:
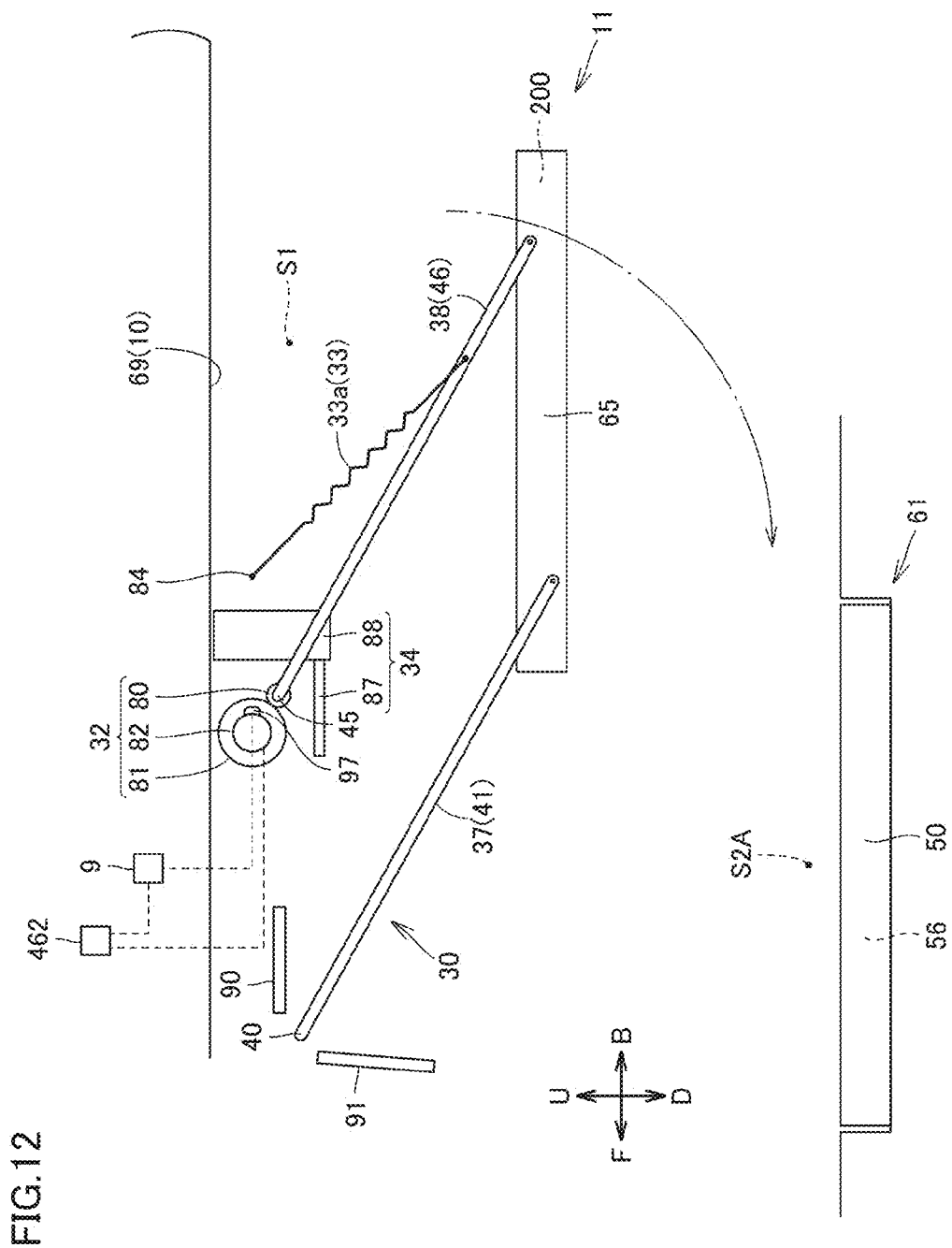
FIG. 12 is a side view of power receiving unit 200 moved downward by movement mechanism 30.

With reference to FIG. 12, when motor 82 receives electric power, motor 82 provides motive force, and support member 38 thus has leg 46 rotated about rotary shaft 45. Power receiving unit 200 and casing 65 move in vertically downward direction D and also obliquely descend in vehicular frontward direction F. Support member 37 moves to follow support member 38, power receiving unit 200 and casing 65 and rotates about rotary shaft 40.

As power receiving unit 200 and casing 65 move, biasing member 33 extends, and biasing member 33 applies tension to casing 65. Casing 65 is biased by biasing member 33 to move power receiving unit 200 in a direction to return to first position S1. Motor 82 resists the tension and causes casing 65 to descend. Encoder 97 transmits an angle of rotation of rotor 95 of motor 82 to ascent/descent ECU 462.

Figure 13:
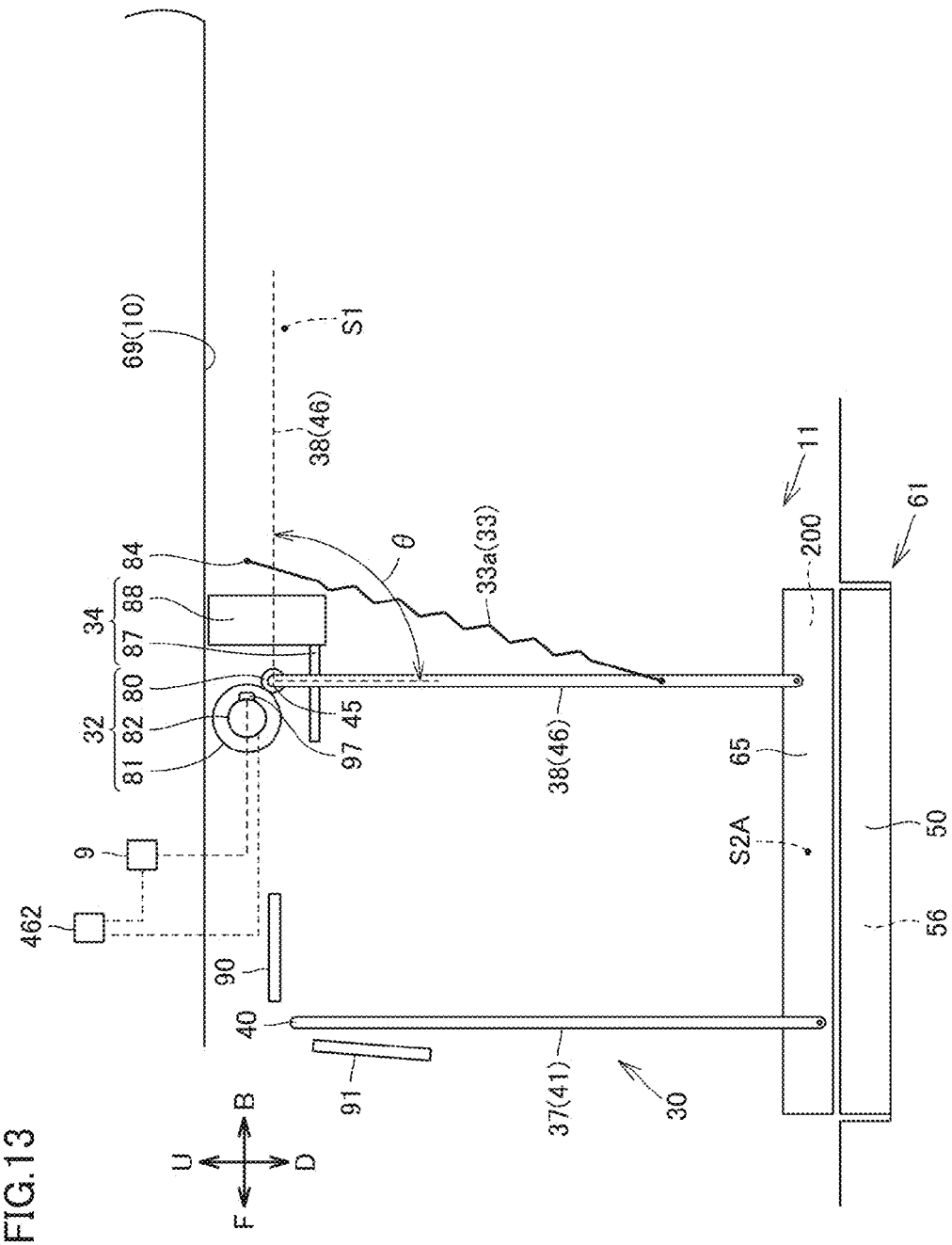
FIG. 13 is a side view of power receiving unit 200 receiving electric power from a power transmitting unit 56 contactlessly.

FIG. 13 is a side view showing a state presented when power receiving unit 200 receives electric power from power transmitting unit 56 contactlessly. Ascent/descent ECU 462 receives information from encoder 97 and thereby understands where casing 65 and power receiving unit 200 are located. When ascent/descent ECU 462 determines that rotor 95 has attained an angle of rotation having a value allowing power receiving unit 200 and power transmitting unit 56 to face each other, (i.e., that power receiving unit 200 is positioned to include second position S2A), then, ascent/descent ECU 462 drives drive unit 110 (see FIG. 10) to engage stopper 93 with gear 92.

This stops gear 92 and rotary shaft 45 from rotating and hence stops power receiving unit 200 and casing 65 from descending. Note that biasing member 33 provides tension smaller than the driving force provided from motor 82. Power receiving unit 200 and casing 65 are restrained from ascending, since motor 82 is stopped, and power receiving unit 200 and casing 65 are stopped from moving. While motor 82 drives power receiving unit 200 and casing 65 in a direction to allow them to descend, stopper 93 engages with gear 92. Power receiving unit 200 and casing 65 are stopped from moving, and, as the driving force of motor 82 is larger than the tension of biasing member 33, power receiving unit 200 and casing 65 are held stopped. Power receiving unit 200, in second position S2A, can receive electric power from the power transmitting device 50 power transmitting unit 56 contactlessly.

In FIG. 13, a dashed line indicates support member 38 (or leg 46) in a position that support member 38 assumes when power receiving unit 200 is accommodated to vehicular body 70 (i.e., when power receiving unit 200 is positioned to include first position S1). When power receiving unit 200 is disposed in second position S2A, and the position that support member 38 assumes when power receiving unit 200 is accommodated to vehicular body 70 serves as a reference, then, support member 38 has been rotated about rotary shaft 45 from this referential position by an angle of rotation θ. In the present embodiment, power receiving unit 200 is aligned with power transmitting unit 56 with angle of rotation θ falling within a range larger than or equal to 45 degrees and smaller than or equal to 100 degrees.

When angle of rotation θ in this range is changed in a given amount, power receiving unit 200 displaces in a larger amount in vehicular rearward and frontward directions B and F (i.e., horizontally) than in vertically upward and downward directions U and D. If power receiving unit 200 is misaligned with power transmitting unit 56 in vehicular rearward or frontward direction B or F, power receiving unit 200 can be re-aligned with power transmitting unit 56 horizontally while power receiving unit 200 can be prevented from vertically, positionally varying significantly.

Preferably, it is recommendable that power receiving unit 200 be aligned with power transmitting unit 56 with angle of rotation θ falling within a range larger than or equal to 45 degrees and smaller than or equal to 90 degrees. Angle of rotation θ smaller than or equal to 90 degrees allows power receiving unit 200 to be aligned with power transmitting unit 56 with power receiving unit 200 moved within a reduced range to prevent power receiving unit 200 from colliding against a foreign matter placed on the ground surface.

Note that in the FIG. 13 example, power receiving unit 200 faces power transmitting unit 56 in a position assumed when angle of rotation θ is substantially 90 degrees. When angle of rotation θ in a vicinity of 90 degrees varies in a given amount, power receiving unit 200 and casing 65 displace in a larger amount in vehicular rearward and frontward directions B and F (i.e., horizontally) than in vertically upward and downward directions U and D. If power receiving unit 200 is misaligned with power transmitting unit 56 in vehicular rearward or frontward direction B or F, power receiving unit 200 can be re-aligned with power transmitting unit 56 horizontally while power receiving unit 200 can be prevented from vertically, positionally varying significantly.

Figure 14:
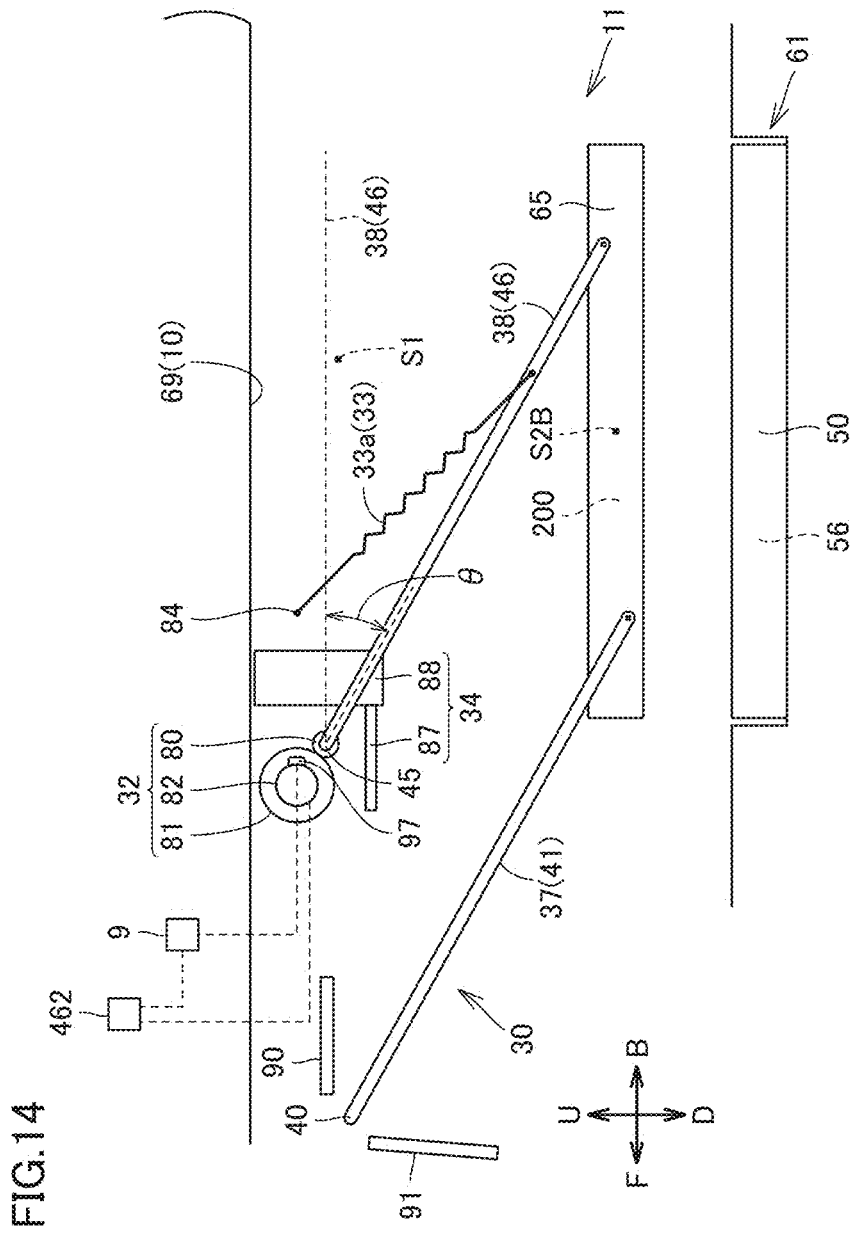
FIG. 14 is a side view showing an exemplary variation of an angle of rotation θ made when power receiving unit 200 is aligned with power transmitting unit 56.

FIG. 14 is a side view showing an exemplary variation of angle of rotation θ in aligning power receiving unit 200 with power transmitting unit 56. In the FIG. 14 example, power receiving unit 200 is disposed in second position S2B, and power receiving unit 200 is aligned relative to power transmitting unit 56 with angle of rotation θ falling within a range larger than or equal to 0 degree and smaller than 45 degrees. Power receiving unit 200, in second position S2B, can receive electric power from the power transmitting device 50 power transmitting unit 56 contactlessly. Angle of rotation θ varying within the range larger than or equal to 0 degree and smaller than 45 degrees allows power receiving unit 200 to be aligned with power transmitting unit 56 vertically while restraining power receiving unit 200 from having a horizontal movement allowing a larger movement in the vertical direction than that in vehicular rearward and frontward directions B and F.

When power receiving unit 200 and power transmitting unit 56 are aligned, power receiving unit 200 and power transmitting unit 56 face each other such that they are spaced as prescribed. In that condition, power transmitting unit 56 transfers electric power to power receiving unit 200 contactlessly. By what principle power receiving unit 200 and power transmitting unit 56 transfer electric power therebetween will be described later. Once power receiving unit 200 and power transmitting unit 56 have completed transferring electric power therebetween, ascent/descent ECU 462 drives drive unit 110 to disengage stopper 93 from gear 92. Ascent/descent ECU 462 controls adjuster 9 to drive it to cause casing 65 having power receiving unit 200 housed therein to ascend.

In doing so, adjuster 9 stops a current supplied to motor 82. Motor 82 no longer generates force to drive casing 65, and biasing member 33 applies tension to cause casing 65 having power receiving unit 200 housed therein to ascend. If stopper 93 is engaged with gear 92, gear 92 is permitted to rotate in direction of rotation Dr1 (see FIG. 10).

When ascent/descent ECU 462 determines from an angle of rotation of rotor 95 as detected by encoder 97 that casing 65 and power receiving unit 200 have returned to the accommodation position (or first position S1), ascent/descent ECU 462 controls adjuster 9 to stop driving motor 82.

Ascent/descent ECU 462 drives holding device 34 to allow support member 87 to secure casing 65. Power receiving unit 200 is held in first position S1.

As power receiving unit 200 and casing 65 return to the accommodation position (or the initial position), resilient members 33a and 33b return to their natural length. If power receiving unit 200 and casing 65 should ascend further from the initial position, resilient members 33a and 33b are extended to be longer in length than when power receiving unit 200 and casing 65 assume the initial position, and accordingly, resilient members 33a and 33b apply tension to power receiving unit 200 and casing 65 to return power receiving unit 200 and casing 65 to the initial position. Power receiving unit 200 and casing 65 are satisfactorily returned to the prescribed accommodation position. Note that in causing power receiving unit 200 and casing 65 to ascend, not only does biasing member 33 apply tension, but motor 82 may also be driven to cause power receiving unit 200 and casing 65 to ascend.

While power receiving unit 200 and casing 65 are descending, motor 82 may not be driven satisfactorily. In that case, biasing member 33 applies tension to cause power receiving unit 200 and casing 65 to ascend. This can prevent power receiving unit 200 and casing 65 from being held downward.

While casing 65 and power receiving unit 200 move from the FIG. 11 accommodation position (or first position S1) to the FIGS. 13 and 14 power receiving positions (or second positions S2A, S2B), a curbstone or a similar foreign matter may prevent power receiving unit 200 and casing 65 from further moving. Note that the power receiving position is a position that power receiving unit 200 assumes when it receives electric power from power transmitting unit 56. At the time if ascent/descent ECU 462 senses, with adjuster 9 turned on, that rotor 95 has an angle of rotation unchanged for a prescribed period of time, ascent/descent ECU 462 controls adjuster 9 to cause power receiving unit 200 and casing 65 to ascend.

Specifically, adjuster 9 supplies motor 82 with electric power to rotate rotor 95 in a direction to cause power receiving unit 200 and casing 65 to ascend. This can prevent drive unit 32 from applying a driving force of a prescribed value or larger to power receiving unit 200 to press casing 65 against the foreign matter and damage casing 65. Note that the driving force of the prescribed value that drive unit 32 applies to power receiving unit 200 is set, as appropriate, depending on the strength of casing 65 and that of power receiving unit 200.

In the above example, resilient members 33a and 33b are in a natural state when power receiving unit 200 and casing 65 are in the accommodated state. Alternatively, resilient members 33a and 33b may be in a state extended from the natural state when power receiving unit 200 and casing 65 are in the accommodated state. This also allows resilient members 33a and 33b to be minimized in length when power receiving unit 200 and casing 65 are in the initial state.

Then, when power receiving unit 200 and casing 65 move downward, resilient members 33a and 33b apply an increasing tension to power receiving unit 200 and casing 65. With this tension, power receiving unit 200 and casing 65 can be pulled back to the accommodated state after receiving electric power is completed. Applying tension to power receiving unit 200 and casing 65 even when they are in the accommodated state prevents power receiving unit 200 and casing 65 from easily displacing from the accommodation position (or first position S1).

Positional Relationship of Sensing Unit 310, First Position S1, and Second Position S2

Figure 15:
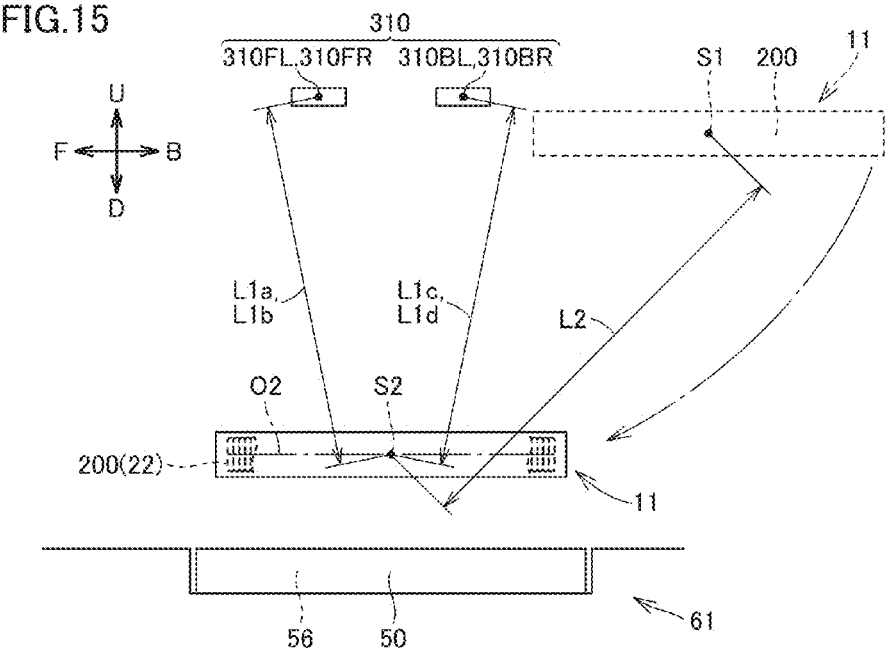
FIG. 15 is a side view for illustrating a positional relationship between power receiving unit 200 disposed in a first position S1, power receiving unit 200 disposed in a second position S2, and a sensing unit 310.
Figure 16:
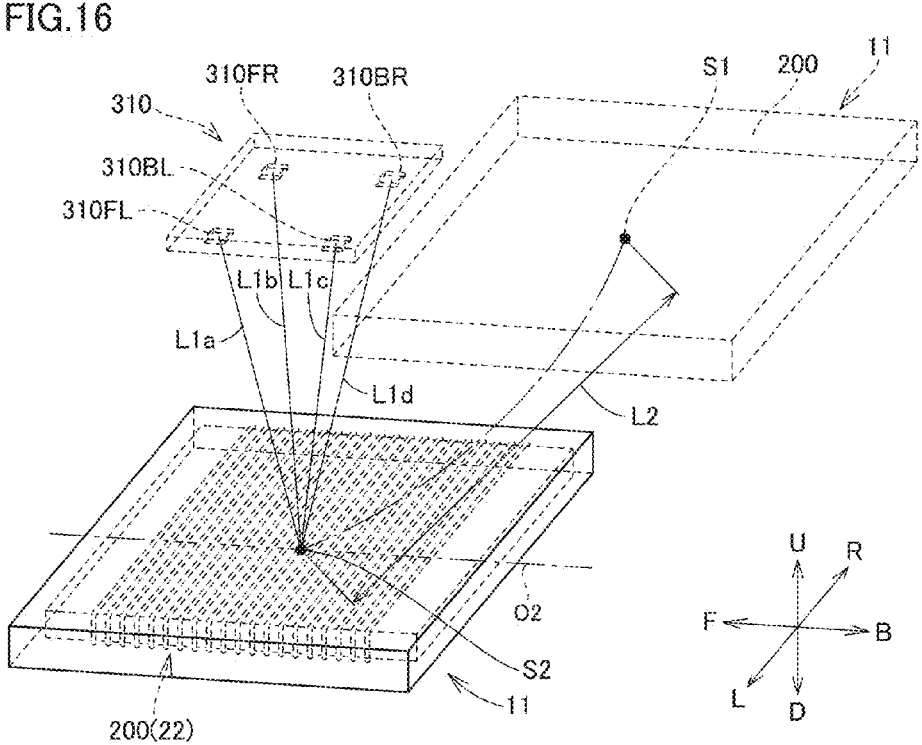
FIG. 16 is a perspective view for illustrating the positional relationship between power receiving unit 200 disposed in first position S1, power receiving unit 200 disposed in second position S2, and sensing unit 310.

FIG. 15 is a side view for illustrating a positional relationship between power receiving unit 200 disposed in first position S1, power receiving unit 200 disposed in second position S2, and sensing unit 310. FIG. 16 is a perspective view for illustrating the positional relationship between power receiving unit 200 disposed in first position S1, power receiving unit 200 disposed in second position S2, and sensing unit 310.

With reference to FIG. 15 and FIG. 16, as has been discussed above, in the present embodiment, sensing unit 310 is provided frontwardly of power receiving unit 200 in vehicular frontward direction F. Sensing unit 310 has sensing units 310FL, 310FR, 310BL, 310BR with distances L1$a$, L1$b$, L1$c$, L1$d$, respectively, to second position S2. Distances L1$a$, L1$b$, L1$c$, L1$d$ are linear distances between sensing units 310FL, 310FR, 310BL, 310BR at their respective sensor portions, respectively, and second position S2.

When the sensing unit is implemented with a magneto-impedance element, the sensing unit can have as the sensor portion a center of an amorphous wire as seen longitudinally (or along its winding axis). When the sensing unit is implemented with a Hall device, the sensing unit can have as the sensor portion a center of a p- or n-type semiconductor sample configuring the Hall device. When the sensing unit is implemented with a magnetoresistive element, the sensing unit can have as the sensor portion a center of a multilayer thin film.

First position S1 has a distance L2 to second position S2. Distance L2 is a linear distance between first position S1 and second position S2. In the present embodiment, distances L1$a$, L1$b$, L1$c$, L1$d$ all have a value smaller than distance L2. Distances L1$a$, L1$b$, L1$c$, L1$d$ may have any one thereof with a value smaller than distance L2. Preferably, this positional relationship is established for all of second position S2 (see FIG. 9), second position S2A (see FIGS. 12 and 13), and second position S2B (see FIG. 14).

Figure 17:
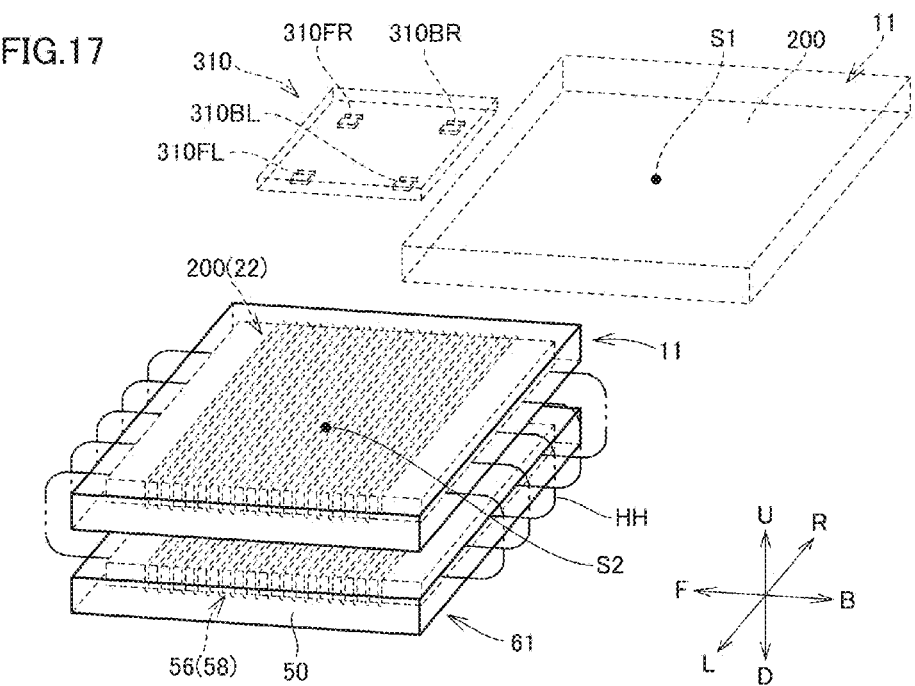
FIG. 17 is a perspective view schematically showing power transmitting unit 56 forming a test magnetic field.

FIG. 17 is a perspective view schematically showing power transmitting unit 56 forming a test magnetic field. For the sake of convenience for illustration, power receiving unit 200 disposed in second position S2 is represented by a solid line. In the figure, a two dotted, chained line represents a magnetic flux HH passing through the ferrite core of power receiving unit 200 along the winding axis of power transmitting coil 58 as well as along the winding axis of power receiving coil 22. Although not shown in the figure, power transmitting unit 56 forms the test magnetic field (or a test electric field) to also reach where sensing unit 310 is disposed.

As has been discussed above, in the present embodiment, distances L1$a$, L1$b$, L1$c$, L1$d$ all have a value smaller than distance L2. If power receiving unit 200 sensing the magnetic field intensity of the test magnetic field (or the electric field intensity of the test electric field) in first position S1 for the sake of illustration is compared with sensing unit 310 of the present embodiment, the latter is more subjected to a stronger magnetic field intensity of the test magnetic field than the former is. The test magnetic field's intensity tends to be higher at the location of sensing unit 310 than at first position S1, and accordingly, sensing unit 310 of the present embodiment tends to provide a more precise sensed result than power receiving unit 200 disposed in first position S1.

In particular, in the present embodiment, second position S2 is vertically, obliquely below first position S1. Between before power receiving unit 200 ascends/descends and after it does so, power receiving unit 200 positionally displaces in vehicular frontward and rearward directions F and B. If power receiving unit 200 disposed in first position S1 senses the magnetic field intensity of the test magnetic field (or the electric field intensity of the test electric field), and the sensed result is used to align vehicular body 70 with respect to power transmitting device 50, a misalignment may easily arise as power receiving unit 200 moves from first position S1 to second position S2.

In the present embodiment, when sensing unit 310 is compared with first position S1, the former is closer to second position S2 serving as a power receiving position that power receiving unit 200 assumes in receiving electric power than the latter is. Sensing unit 310 senses the intensity of the test magnetic field (or test electric field) formed by power transmitting device 50. Aligning sensing unit 310 with power transmitting device 50 while considering a distance by which power receiving unit 200 is moved between before it ascends/descends and after it does so, allows electrically powered vehicle 10 to be positioned as appropriate relative to power transmitting device 50. Thus the present embodiment provides power receiving device 11 and power transfer system 1000 allowing battery 150 mounted in vehicular body 70 to be contactlessly charged efficiently.

In the present embodiment, distances L1$a$, L1$b$, L1$c$, L1$d$ all have a value smaller than distance L2. Distances L1$a$, L1$b$, L1$c$, L1$d$ may all have a value larger than distance L2. The sensing unit that is provided independently of power receiving unit 200 also allows electrically powered vehicle 10 to be positioned as appropriate relative to power transmitting device 50 with an extent of precision.

Figure 18:
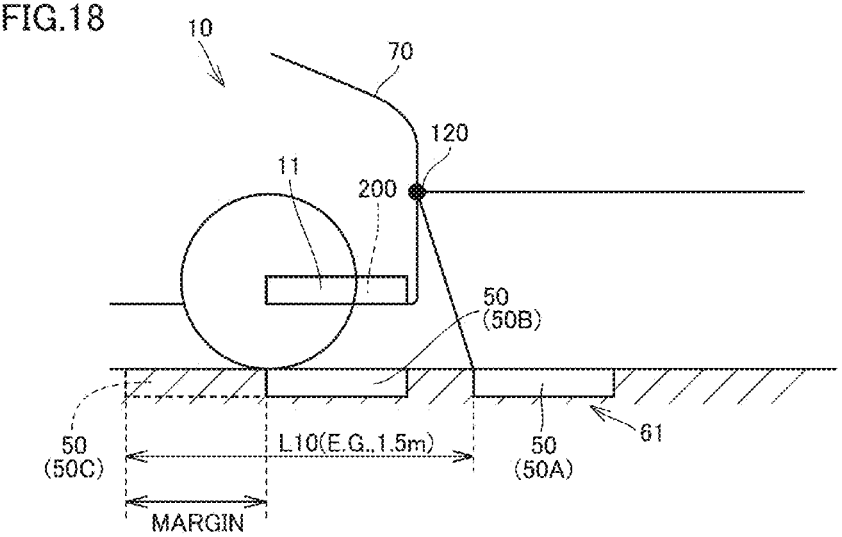
FIG. 18 is a diagram for illustrating how a vehicle is guided via a camera 120 (i.e., a first guidance control) while the vehicle is being parked.

FIG. 18 is a diagram for illustrating how the vehicle is guided via camera 120 to be parked (i.e., the first guidance control). When power transmitting device 50 is located in a position 50A, as observed from vehicular body 70, power transmitting device 50 is present within the field of view of camera 120, and camera 120 can be used to assist parking the vehicle.

Movement mechanism 30 (not shown) in some configuration (in other words, depending on where second position S2 is set) entails moving electrically powered vehicle 10 so that power transmitting device 50 is located in a position 50B as observed from vehicular body 70. A vicinity of position 50B tends to be a blind spot for camera 120 depending on where camera 120 is disposed, and it may be difficult to utilize the image provided via camera 120 to assist parking the vehicle.

As has been discussed above, in the present embodiment, not only is camera 120 used to guide a vehicle to park it (i.e., the first guidance control), but a test magnetic field (or test electric field) formed by power transmitting device 50 and sensing unit 310 that senses it are also used to assist parking the vehicle (i.e., the second guidance control). This allows a parking position to be also indicated with precision while vehicular body 70 overlies power transmitting device 50, as indicated by position 50B.

When electrically powered vehicle 10 is moved so that power transmitting device 50 exceeds an expected range, as indicated by a position 50C, and sensing unit 310 still cannot sense the test magnetic field satisfactorily, then electrically powered vehicle 10 is controlled to be stopped. For example, once power transmitting device 50 has partially entered the blind spot of camera 120 and if electrically powered vehicle 10 is thereafter moved by a distance L10 (for example of 1.5 m), and still there cannot be found a position at which sensing unit 310 can sense the test magnetic field satisfactorily, then, the driver is warned to stop electrically powered vehicle 10 or the vehicle is automatically stopped. Distance L10 is determined based on a margin of precision of alignment by power receiving device 11.

Flowchart of Parking Assistance

Figure 19:
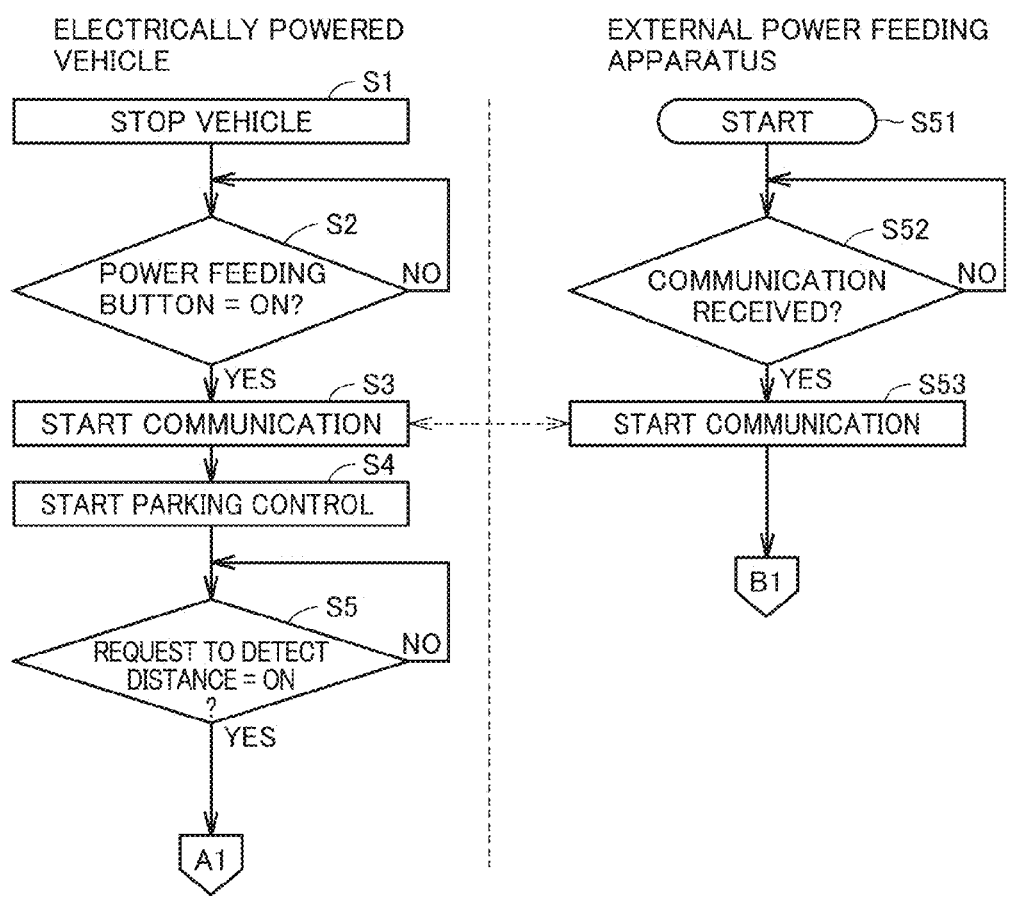
FIG. 19 is a flowchart in the first half thereof for illustrating how electrically powered vehicle 10 is controlled when the vehicle is positionally adjusted to be contactlessly fed with electric power.
Figure 20:
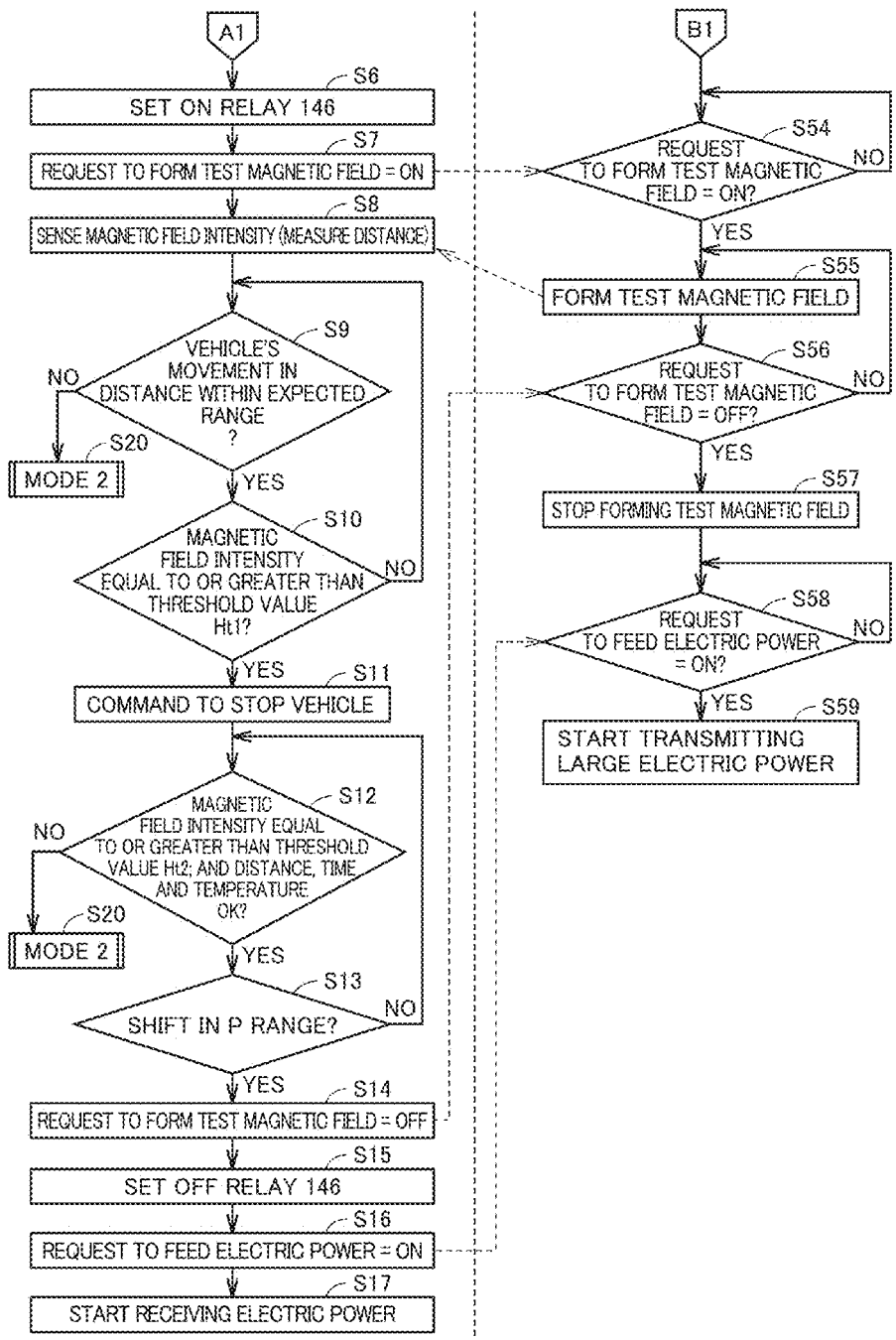
FIG. 20 is a flowchart in the second half thereof for illustrating how electrically powered vehicle 10 is controlled when the vehicle is positionally adjusted to be contactlessly fed with electric power.

FIG. 19 is a flowchart (in a first half) for illustrating how electrically powered vehicle 10 is controlled in contactless power feeding when the vehicle is positionally adjusted. FIG. 20 is the flowchart (in a second half) for illustrating how electrically powered vehicle 10 is controlled in contactless power feeding when the vehicle is positionally adjusted. In each of FIG. 19 and FIG. 20, a left half represents a control performed on the electrically powered vehicle's side, and a right half represents a control performed on external power feeding apparatus 61's side.

With reference to FIG. 19, initially, on the vehicle's side, step S1 is performed to perform a process for stopping the vehicle, and subsequently in step S2 whether power feeding button 122 is set to the ON state is detected. If not, control device 180 awaits until the power feeding button is set to the ON state. If in step S2 control device 180 detects that power feeding button 122 is set to the ON state, the control proceeds to step S3. In step S3, control device 180 starts to communicate with external power feeding apparatus 61 via communication units 160, 230.

On external power feeding apparatus 61's side, a process starts in step S51, and the control awaits in step S52 until it receives communication from the vehicle, and when it is requested to start communication, it proceeds to step S53 to do so.

On the vehicle's side, step S3 or the communication starting process is followed by step S4 to start controlling the vehicle to park it. In thus controlling the vehicle, a first stage employs an intelligent parking assist (IPA) system using a camera. When the vehicle approaches the power feeding position to some extent, a request to detect distance is set to the ON state in control device 180 (YES in step S5).

With reference to FIG. 20, on external power feeding apparatus 61's side, the control proceeds from step S53 to step S54 and waits for a request to be set to the ON state for forming a test magnetic field. On the vehicle's side, control device 180 proceeds from step S5 to step S6 to set relay 146 to the ON state. Control device 180 in step S7 signals the power feeding apparatus's side that the request to form a test magnetic field has been set to the ON state.

External power feeding apparatus 61 in step S54 detects that the request to form a test magnetic field has been set to the ON state, and the control proceeds to step S55 to form the test magnetic field. The test magnetic field may be formed using electric power similar to that transmitted after charging the battery is started. Preferably, however, it is formed with a signal set that is weaker than a signal transmitted when substantial power transmission is performed (i.e., with weak electric power). When, with the test magnetic field used, sensing unit 310 senses a magnetic field intensity reaching a value, that the vehicle has reached a distance allowing the vehicle to be fed with electric power is detected.

The primary side's given voltage (or a voltage output from external power feeding apparatus 61) forms a test magnetic field, and sensing unit 310, exposed thereto, senses a magnetic field intensity, which varies with a distance L between power transmitting device 50 and sensing unit 310. What relationship the primary side's voltage and the magnetic field intensity that sensing unit 310 senses have may previously be measured or the like to create a map or the like used to detect a distance between power transmitting device 50 and sensing unit 310 from the value of the magnetic field intensity sensed by sensing unit 310.

The primary side's current (or a current output from external power feeding apparatus 61) also varies with distance L between power transmitting device 50 and sensing unit 310 (or power receiving device 11), and this relationship may be used to sense a distance between power transmitting device 50 and sensing unit 310 (or power receiving device 11) based on the magnetic field intensity of the test magnetic field presented from external power feeding apparatus 61.

Sensing ECU 460 senses the distance between power transmitting device 50 and sensing unit 310, and outputs information of the distance to HV ECU 470. Sensing ECU 460 receives a start charging command from HV ECU 470, and in response thereto activates signal SE2 output to system main relay SMR2 to turn on system main relay SMR2. Sensing ECU 460 generates a signal for driving DC/DC converter 142 and outputs it to DC/DC converter 142.

When the vehicle's mode of operation is a running mode, HV ECU 470 outputs a control command to MG ECU 430 and ECB 440, depending on how the accelerator pedal/the brake pedal is operated, how the vehicle is travelling, and the like. When a parking brake switch is operated or the like and the driver thus issues an instruction to operate the parking brake, HV ECU 470 outputs an operation command to EPB 450.

In contrast, when the vehicle's mode of operation is the charging mode, HV ECU 470 establishes communication with external power feeding apparatus 61 via communication unit 130, and outputs a start command via communication unit 160 to external power feeding apparatus 61 to start external power feeding apparatus 61. Once external power feeding apparatus 61 has been started, HV ECU 470 outputs a command to external power feeding apparatus 61 via communication unit 160 to turn on light emitting unit 231 provided on power transmitting device 50 of external power feeding apparatus 61. Once light emitting unit 231 has been turned on, HV ECU 470 outputs to external power feeding apparatus 61 via communication unit 160 a guidance-control-in-process signal indicating that a guidance control is currently performed to guide electrically powered vehicle 10 to power transmitting device 50, and HV ECU 470 also outputs a command to IPA ECU 410 to instruct it to perform a guidance control based on image information received from camera 120 (i.e., the first guidance control).

When HV ECU 470 receives notification from IPA ECU 410 indicating that the first guidance control has ended, HV ECU 470 performs a guidance control based on information of a distance between power transmitting device 50 and sensing unit 310 (i.e., the second guidance control). Specifically, HV ECU 470 receives from sensing ECU 460 the information of the distance between power transmitting device 50 of power feeding apparatus 61 and sensing unit 310 (or power receiving device 11) of the vehicle, and outputs a command based on the information of the distance to MG ECU 430 and ECB 440 controlling the vehicle to drive/brake it to minimize a distance between power transmitting device 50 and power receiving device 11 having descended to second position S2.

In the FIG. 20 step S9 and step S10 a decision of whether parking ends is made. In step S9, whether the vehicle's movement in distance falls within an expected range is determined. The vehicle's movement in distance is calculated from vehicular speed multiplied by elapsed time. If in step S9 the vehicle's movement in distance exceeds the expected range, the control proceeds to step S20 (or a mode of operation 2). As has been described with reference to FIG.

18, the expected range can be set for example to 1.5 m as measured once power transmitting device 50 has entered the blind spot of camera 120. The vehicular speed sensor is not precise for low speed, and accordingly, it is preferable to also consider the vehicular speed sensor's possible erroneous detection in selecting a threshold value applied in determining the expected range.

If in step S9 the vehicle's movement in distance does not exceed the expected range, the control proceeds to step S10, and whether sensing unit 310 detects a test magnetic field having a magnetic field intensity equal to or greater than a threshold value Ht1 is determined.

Figure 21:
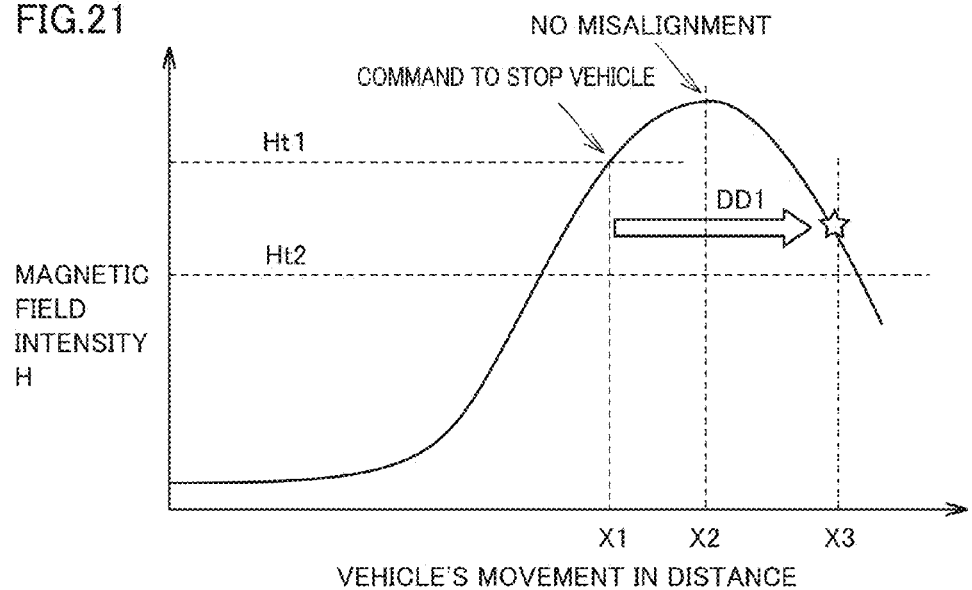
FIG. 21 represents a relationship between the vehicle's movement in distance and a magnetic field intensity of a test magnetic field sensed by sensing unit 310.

FIG. 21 represents a relationship between the vehicle's movement in distance and a magnetic field intensity of a test magnetic field sensed by sensing unit 310. While the vehicle is approaching a position corresponding to no misalignment, magnetic field intensity H increases. Once the vehicle has passed the position corresponding to no misalignment, magnetic field intensity H starts to fall. Threshold value Ht1 is a threshold value applied to determine whether an instruction should be output to the vehicle to stop it, and threshold value Ht1 is determined from a previously measured relationship between distance and voltage. FIG. 21 also indicates a threshold value Ht2, which is a threshold value determined based on a tolerable leaking electromagnetic field intensity tolerated when a maximum output is applied to transmit/receive electric power, and threshold value Ht2 is a value smaller than threshold value Ht1.

Again, with reference to FIG. 20, if in step S10 the magnetic field intensity is not equal to or greater than threshold value Ht1, the control returns to step S9. Control device 180 repeats determining whether the power receiving coil descending to second position S2 assumes a position relative to the power transmitting coil's position allowing the power receiving coil to receive electric power, while control device 180 determines by how much distance and in what direction the vehicle should be moved to dispose the power receiving coil in a position relative to the power transmitting coil allowing the power receiving coil to receive electric power.

Figure 22:
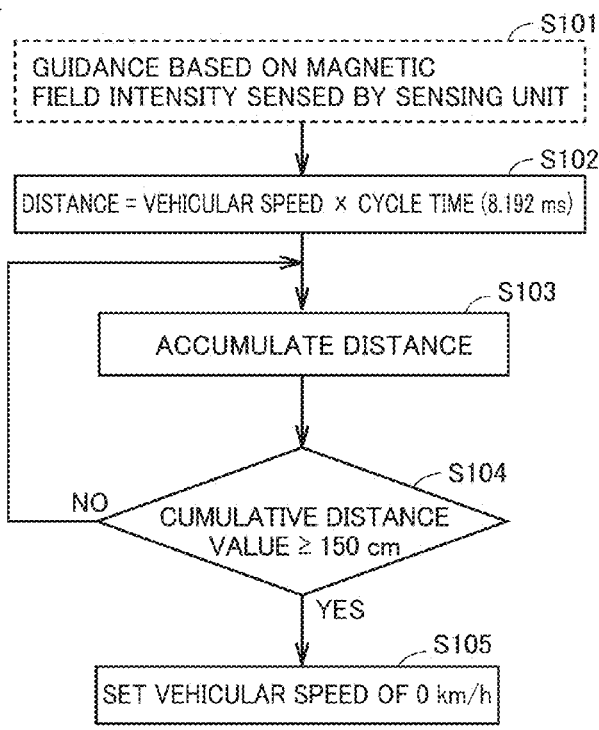
FIG. 22 is a flowchart for illustrating how the vehicle's movement in distance is detected in the FIG. 20 step S9.

Reference will now be made to FIG. 22 to specifically describe the step S9 calculation of the vehicle's movement in distance. FIG. 22 is a flowchart for illustrating how the FIG. 20 step S9 is performed to detect the vehicle's movement in distance. In step S101, once a guidance is started based on a magnetic field intensity that sensing unit 310 has sensed, then, apart from the positional detection by sensing unit 310, a setting is done, as indicated in step S102, to multiply vehicular speed by a cycle time (for example of 8.192 ms) to calculate an increment in distance. The vehicular speed is sensed by the vehicular speed sensor.

In step S103 the increment is accumulated and in step S104 whether the obtained cumulative distance value is equal to or greater than a threshold value (for example of 150 cm) is determined. If in step S104 the cumulative value has not reached the threshold value, the control returns to step S103 to continue to accumulate an increment in distance. Note that assistance for parking is continued. If in step S104 the cumulative distance value is equal to or greater than 150 cm, then, as has been described with reference to FIG. 18, a vehicular speed of 0 (km/h) is set to prevent the vehicle from being excessively moved.

Figure 23:
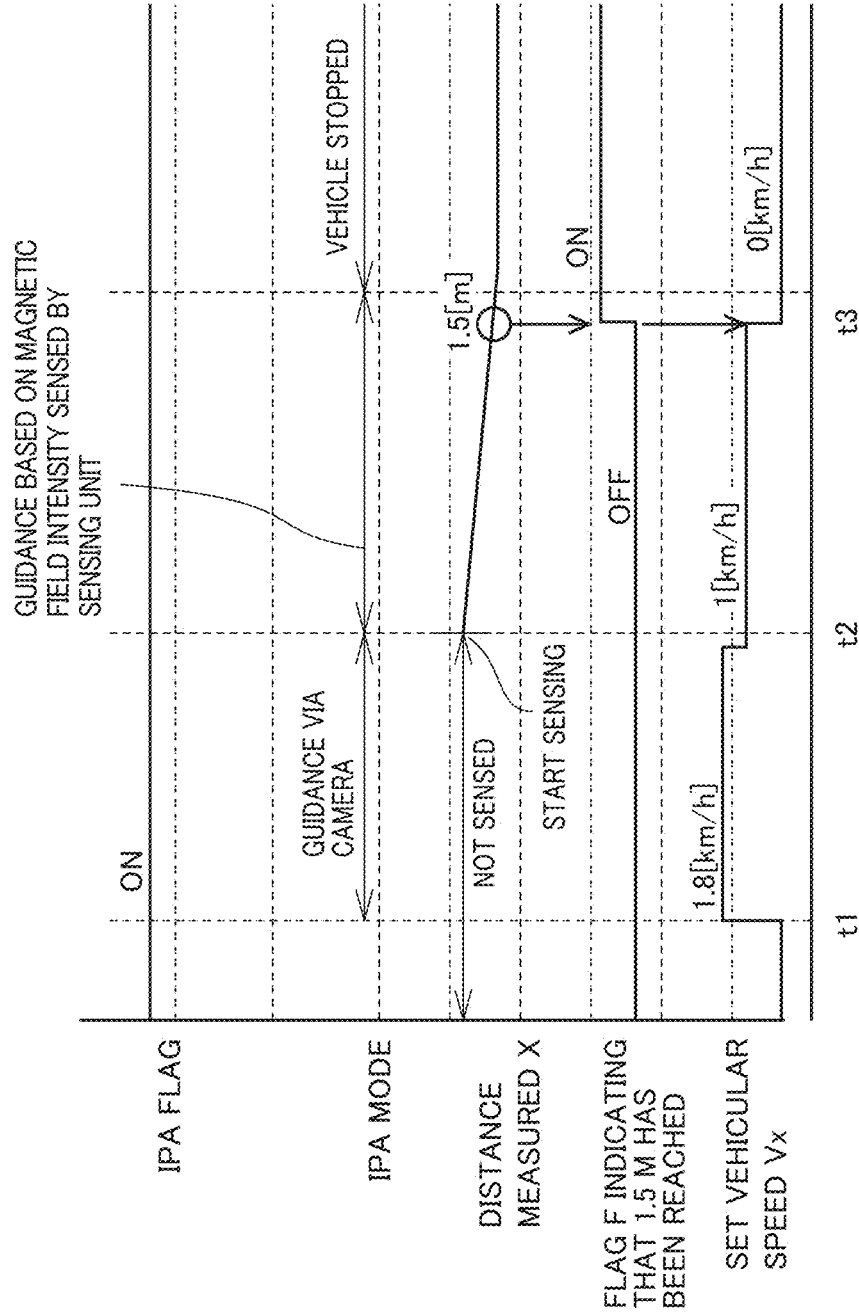
FIG. 23 is an operation waveform diagram representing one example of an operation following the FIG. 22 flowchart to set a vehicular speed of zero.

FIG. 23 is an operation waveform diagram representing one example of an operation following the FIG. 22 flowchart to set a vehicular speed of zero. At time t1, an IPA flag is set ON and a vehicular speed of 1.8 km/h is set. The IPA flag is set to the ON state when the driver selects an intelligent parking assist mode. For time t1-t2 is applied an IPA mode (a parking assist mode) that is a guidance mode using camera 120. At time t2, power transmitting device 50 has entered the blind spot of camera 120, and the IPA mode is changed to a guidance mode using sensing unit 310. When the FIG. 22 steps S103, S104 present a distance equal to the threshold value of 1.5 m, then, at time t3, a Flag F is changed from OFF to ON, and accordingly, a vehicular speed of 0 km/h is set to thus stop the vehicle.

Again, with reference to FIG. 20, if in step S10 sensing unit 310 senses a magnetic field intensity equal to or greater than threshold value Ht1, control device 180 proceeds to step S11 to output a command to stop the vehicle. The command to stop the vehicle may be a command urging the driver to depress the brake pedal to stop the vehicle or may be a process automatically applying brakes. As indicated in FIG. 21 by an arrow DD1, there is a possibility that while the command to stop the vehicle has been issued, the vehicle may still move, and accordingly, after the vehicle has been stopped when in step S12 sensing unit 310 senses a magnetic field intensity equal to or greater than threshold value Ht2, the vehicle's movement in distance is within the expected range, the elapsed time is not overtime, and the temperature is an appropriate temperature for charging the battery, then, the control proceeds step S13. If in step S12 any of the conditions is unestablished, the control proceeds to step S20 (i.e., the mode of operation 2).

In step S13, whether the shift range has been shifted to a P range. If not, then until the shift range is shifted to the P range, step S12 is performed and the vehicle's positional misalignment is continuously monitored. If the shift range is shifted to the P range, the control proceeds to step S14. Herein, a parking position is determined and it is determined that the vehicle has been parked, and vehicular control device 180 sets to the OFF state the request issued to form the test magnetic field. That is, the fact that the shift range has been changed to the P range serves as a trigger to stop transmitting weak electric power (or a test signal) to form the test magnetic field.

On external power feeding apparatus 61's side, the control is informed through communication of a setting to set the test magnetic field to the OFF state, and in step S56 the control detects that the request to send the test signal is changed to the OFF state and in step S57 the control stops sending the test signal. On external power feeding apparatus 61's side, subsequently in step S58 the control detects whether a request to feed electric power is changed to the ON state.

On the vehicle's side, in step S14 the control sets the request to send the test signal to the OFF state and then proceeds to step S15. In step S15, relay 146 is controlled from the ON state to the OFF state. HV ECU 470 thereafter outputs a feed power command via communication unit 160 to external power feeding apparatus 61 to instruct it to feed electric power therefrom and also outputs a start charging command to sensing ECU 460.

In step S16, HV ECU 470 communicates towards external power feeding apparatus 61 that a request to feed electric power is set to the ON state. On the external power feeding apparatus 61's side, in step S58 the control detects that the request to feed electric power is set to the ON state and in step S59 the control starts feeding large electric power. Accordingly on the vehicle's side in step S17 the vehicle starts receiving electric power.

Figure 24:
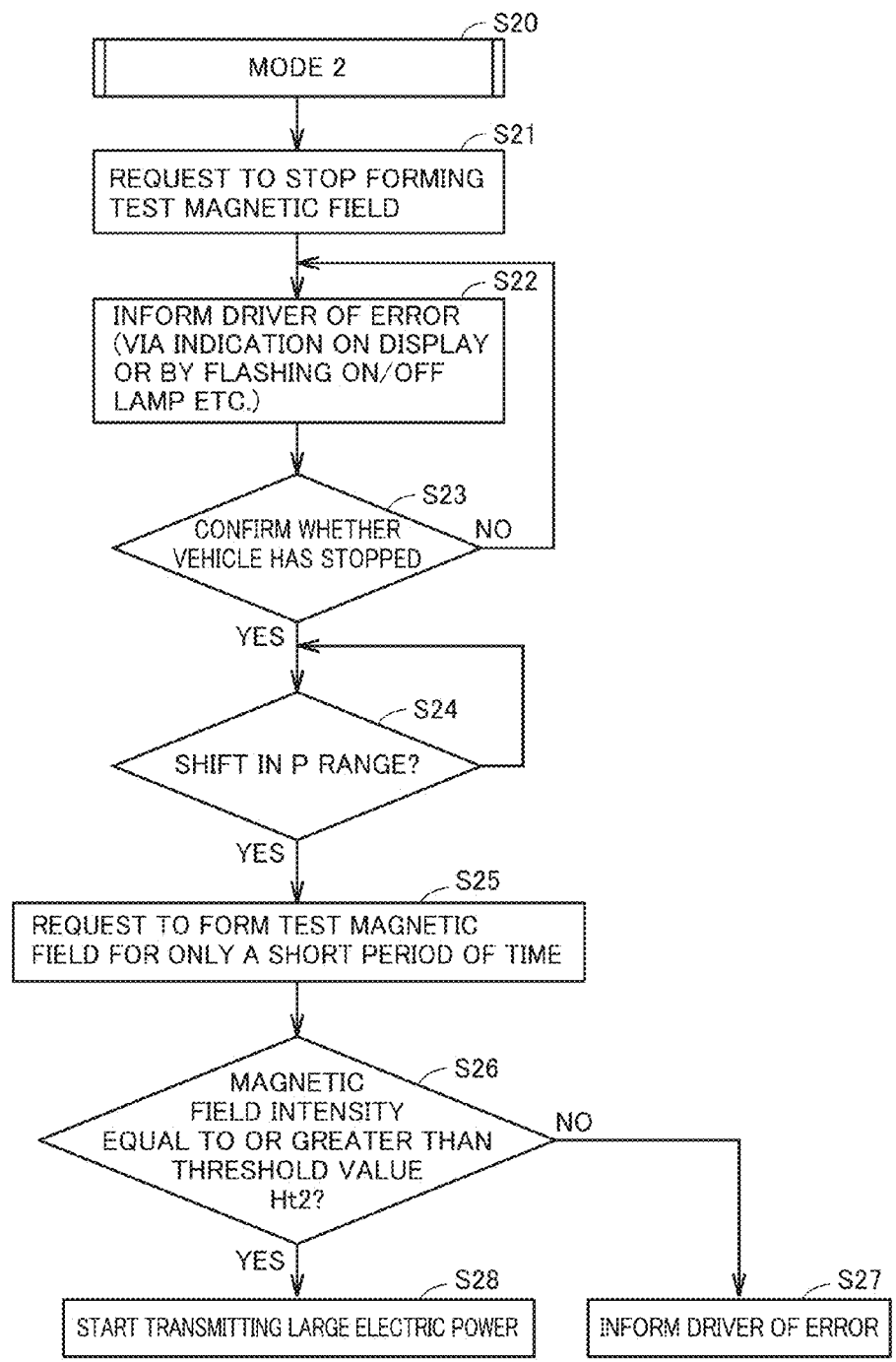
FIG. 24 is a flowchart for illustrating a process in a mode of operation 2 performed in the FIG. 20 step S20.

FIG. 24 is a flowchart for illustrating a process in the mode of operation 2 performed in the FIG. 20 step S20. In the mode of operation 2, no test magnetic field is formed to thereby detect distance via sensing unit 310; rather, the driver re-parks the vehicle, for example.

With reference to FIG. 24, in step S20 a process is started in the mode of operation 2, and in step S21 a request is issued to stop forming the test magnetic field. In step S22, the driver is informed of an error via an indication on the display or by a lamp flashed on/off or the like indicating that the vehicle has passed the expected range and despite that cannot receive electric power. In response thereto, the driver manually adjusts the parking position.

In step S23, whether the vehicle has been stopped is confirmed. If it cannot be confirmed, then in step S22, informing the driver of the error is continued. In step S23 when that the vehicle has been stopped is confirmed, the control proceeds to step S24 and whether the current shift position is in the P range is determined.

The process is stopped until it has been confirmed in step S24 that the current shift position is set in the P range. If it has been confirmed in step S24 that the current shift position is set in the P range, then it is believed that the vehicle makes no movement, and the control proceeds to step S25 to issue a request to form a test magnetic field (or send weak electric power) for a short period of time (of approximately one second). In step S26, whether sensing unit 310 senses a magnetic field intensity equal to or greater than threshold value Ht2 is determined.

In step S26, whether the driver's manual alignment results in allowing the vehicle to receive electric power is determined. Threshold value Ht2 is set to a value smaller than threshold value Ht1, as has been previously described with reference to FIG. 21. If in step S26 a magnetic field intensity equal to or greater than threshold value Ht2 is sensed, the control proceeds to step S28 to start transmitting large electric power. If in step S26 a magnetic field intensity equal to or greater than threshold value Ht2 is not sensed, the control proceeds to step S27 to inform the driver of an error indicating that the battery cannot be charged.

As has been described above, in the present embodiment, not only is camera 120 used to guide a vehicle to park it (i.e., the first guidance control), but a test magnetic field (or test electric field) formed by power transmitting device 50 and sensing unit 310 that senses it are also used to assist parking the vehicle (i.e., the second guidance control). Electrically powered vehicle 10 can be positioned as appropriate relative to power transmitting device 50. When electrically powered vehicle 10 is moved beyond the expected range, and sensing unit 310 still cannot sense a satisfactory magnetic field intensity, then electrically powered vehicle 10 is controlled to be stopped.

Thus the present embodiment provides power receiving device 11 and power transfer system 1000 allowing battery 150 mounted in vehicular body 70 to be contactlessly charged efficiently. Even if automatically parking the vehicle is unsuccessful, the driver manually determines where the vehicle is parked, and whether the vehicle can receive electric power is confirmed before the vehicle receives electric power, and accordingly, more opportunities to charge the battery can be obtained without increasing a cumbersome operation(s).

While the present embodiment has been described with camera 120 used to guide a vehicle to park it (i.e., the first guidance control), a test magnetic field (or test electric field) formed by power transmitting device 50 and sensing unit 310 that senses it may alone be used to assist parking the vehicle (i.e., the second guidance control) to align electrically powered vehicle 10 with power transmitting device 50.

Figure 25:
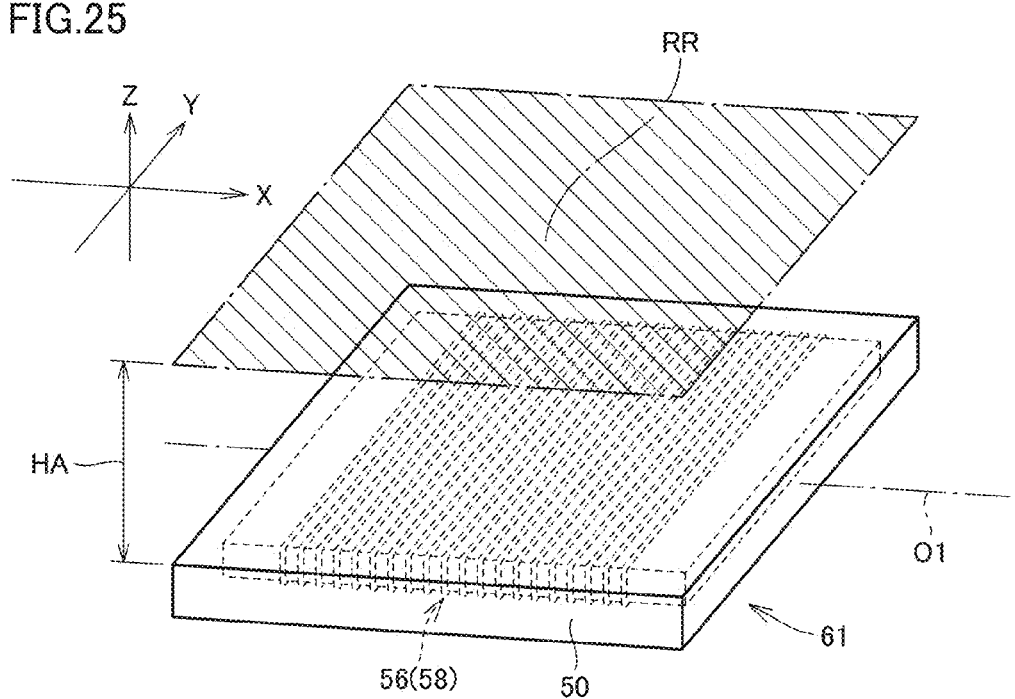
FIG. 25 is a schematic perspective view of power transmitting device 50 of external power feeding apparatus 61.

FIG. 25 is a schematic perspective view of power transmitting device 50 of external power feeding apparatus 61. FIG. 25 shows power transmitting coil 58 formed of a coil wire having linearly disposed portions extending in a y direction. A z direction is orthogonal to winding axis O1 of power transmitting coil 58 and is also orthogonal to the y direction. An x direction is orthogonal to the y and z directions. The x direction is parallel to winding axis O1.

Figure 26:
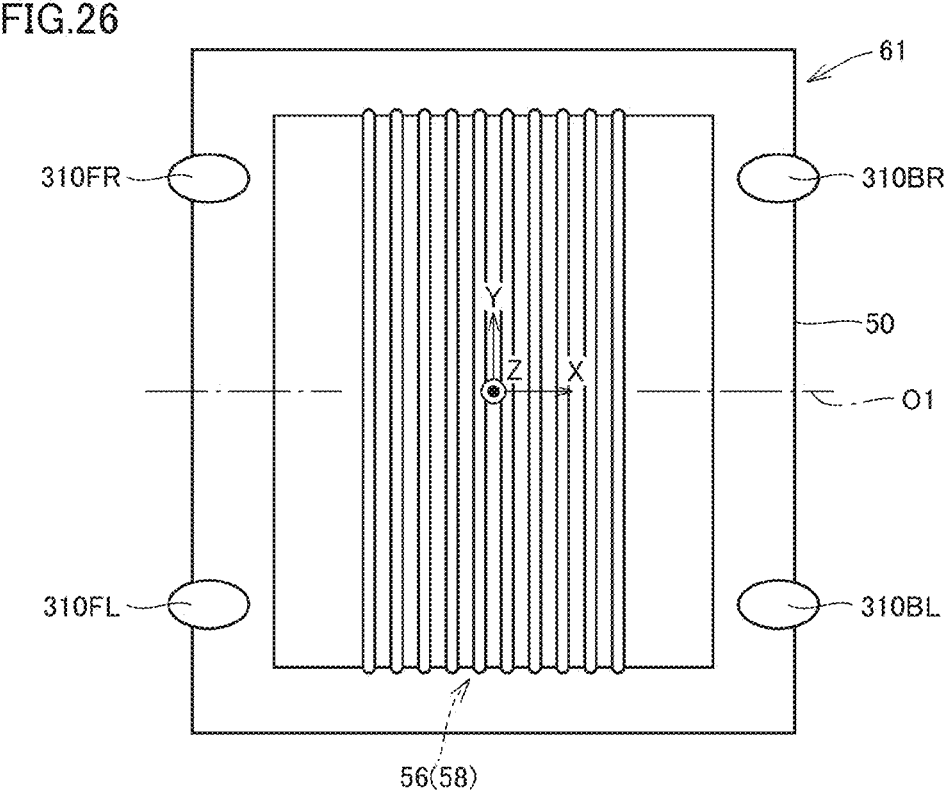
FIG. 26 is a schematic plan view of power transmitting device 50 shown in FIG. 25.

FIG. 26 is a schematic plan view of power transmitting device 50 shown in FIG. 25. FIG. 25 shows a plane RR. Plane RR extends in the x and y directions (or in the xy plane), and is located distant from a surface of the casing of power transmitting device 50 in the z direction by a distance HA (of 200 mm). FIG. 25 and FIG. 26 show the x, y and z directions correspondingly. Power transmitting device 50 shown in FIG. 25 and FIG. 26 forms a magnetic field with power transmitting coil 58 fed with an electric power of 7 W for the sake of illustration.

Figure 27:
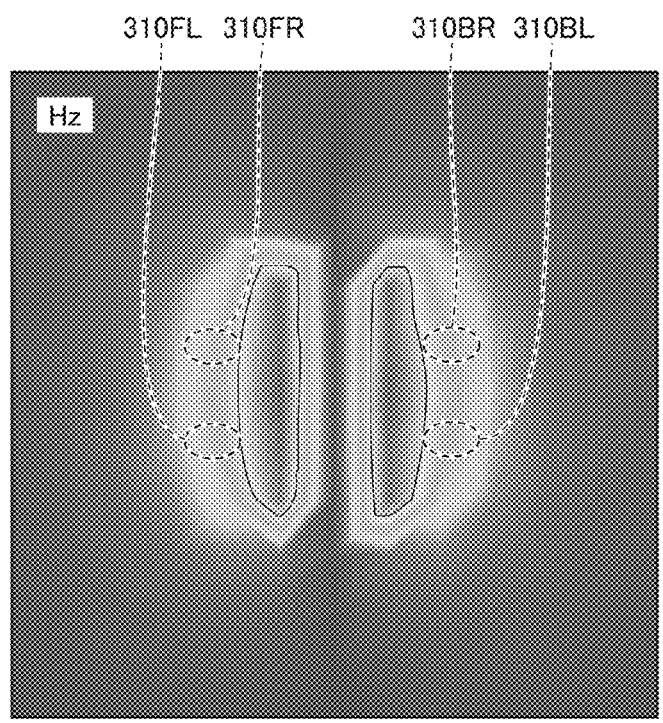
FIG. 27 shows how a magnetic field in a plane RR has an intensity component in a z direction, or an intensity component Hz, distributed in plane RR.
Figure 28:
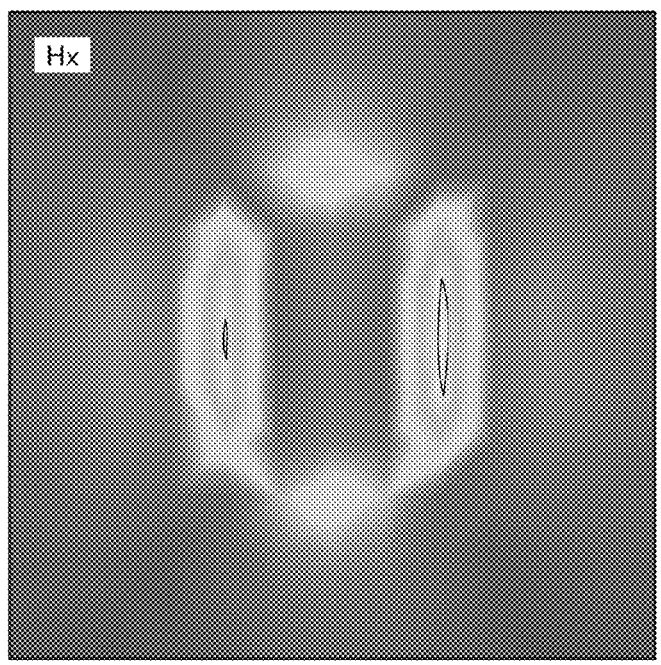
FIG. 28 shows how the magnetic field in plane RR has an intensity component in an x direction, or an intensity component Hx, distributed in plane RR.
Figure 29:
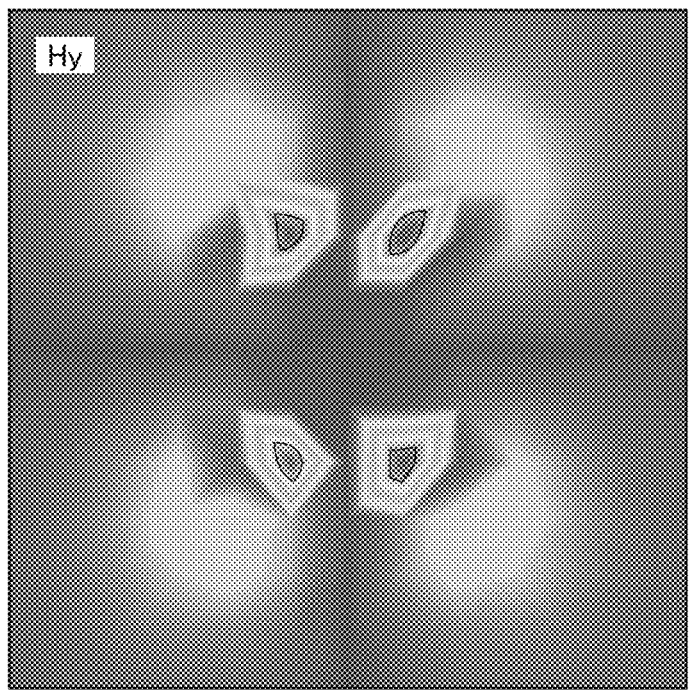
FIG. 29 shows how the magnetic field in plane RR has an intensity component in a y direction, or an intensity component Hy, distributed in plane RR.

Plane RR shown in FIG. 25 is exposed to the magnetic field. FIG. 27 shows how the magnetic field in plane RR has an intensity component in the z direction, or an intensity component Hz, distributed in plane RR. FIG. 28 shows how the magnetic field in plane RR has an intensity component in the x direction, or an intensity component Hx, distributed in plane RR. FIG. 29 shows how the magnetic field in plane RR has an intensity component in the y direction, or an intensity component Hy, distributed in plane RR.

FIGS. 27-29 each represent a magnetic field intensity by a solid line on two annuli, and the magnetic field intensities indicate substantially equal values. When the z direction is the vertical direction, electrically powered vehicle 10 may have sensing unit 310 configured to sense intensity component Hz in the z direction (i.e., an intensity component of the test magnetic field in the vertical direction). When intensity component Hz in the z direction has a maximum value Hzmax, intensity component Hy in the y direction has a maximum value Hymax, and intensity component Hx in the x direction has a maximum value Hxmax, then, a relationship of Hzmax>Hxmax>Hymax is established. Intensity component Hz in the z direction is distributed such that, as shown in FIG. 27, it presents a magnetic field intensity value larger and stronger than that in the y direction (see FIG. 29) and a magnetic field distribution stronger and wider than that in the x direction (see FIG. 28). As shown in FIG. 26 and FIG. 27, sensing unit 310 sensing intensity component Hz in the z direction allows electrically powered vehicle 10 to be aligned with power transmitting device 50 with high precision.

When it is assumed that movement mechanism 30 operates to cause power receiving unit 200 to descend in the x direction, power receiving unit 200 will move in a direction orthogonal to the y direction. Accordingly, electrically powered vehicle 10 may have sensing unit 310 configured to sense intensity component Hy in the y direction (i.e., an intensity component of the test magnetic field in a direction orthogonal to the vertical direction). Intensity component Hy in the y direction has a distribution spread wider than in the x direction. When sensing unit 310 is disposed for example to be symmetrical with respect to the power receiving coil 22 winding axis O2 (or the power transmitting coil 58 winding axis O1), it helps to reflect what is sensed by sensing unit 310 in a position of power receiving unit 200 disposed in second position S2, and allows electrically powered vehicle 10 to be aligned with power transmitting device 50 with high precision.

Principle of Power Transfer

After camera 120 and sensing unit 310 are used to provide alignment, power receiving unit 200 and power transmitting unit 56 perform power transfer therebetween. Reference will now be made to FIGS. 30-33 to describe what principle is followed to provide power transfer in the present embodiment.

The present embodiment provides a power transfer system including power transmitting unit 56 and power receiving unit 200 having natural frequencies, respectively, with a difference smaller than or equal to 10% of the natural frequency of power receiving unit 200 or power transmitting unit 56. Power transmitting unit 56 and power receiving unit 200 each having a natural frequency set in such a range allow more efficient power transfer. Power transmitting unit 56 and power receiving unit 200 having natural frequencies, respectively, with a difference larger than 10% of the natural frequency of power receiving unit 200 or power transmitting unit 56 result in power transfer efficiency smaller than 10% and hence a detriment such as a longer period of time required to charge battery 150.

Herein, the natural frequency of power transmitting unit 56 when capacitor 59 is not provided means an oscillation frequency at which an electrical circuit formed of the inductance of power transmitting coil 58 and the capacitance of power transmitting coil 58 freely oscillates. When capacitor 59 is provided, the natural frequency of power transmitting unit 56 means an oscillation frequency at which an electrical circuit formed of the capacitance of power transmitting coil 58 and capacitor 59 and the inductance of power transmitting coil 58 freely oscillates. In the above electrical circuit when braking force and electric resistance are zeroed or substantially zeroed the obtained natural frequency is also referred to as a resonance frequency of power transmitting unit 56.

Similarly, the natural frequency of power receiving unit 200 when capacitor 23 is not provided means an oscillation frequency at which an electrical circuit formed of the inductance of power receiving coil 22 and the capacitance of power receiving coil 22 freely oscillates. When capacitor 23 is provided, the natural frequency of power receiving unit 200 means an oscillation frequency at which an electrical circuit formed of the capacitance of power receiving coil 22 and capacitor 23 and the inductance of power receiving coil 22 freely oscillates. In the above electrical circuit when braking force and electric resistance are zeroed or substantially zeroed the obtained natural frequency is also referred to as a resonance frequency of power receiving unit 200.

Figure 30:
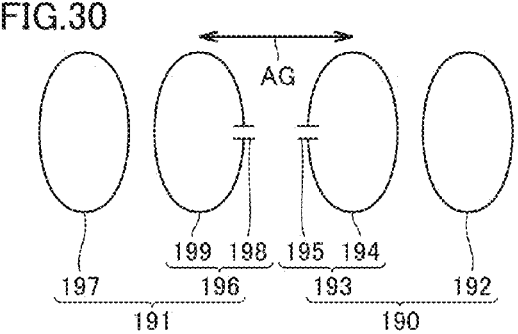
FIG. 30 shows a simulation model of the power transfer system.
Figure 31:
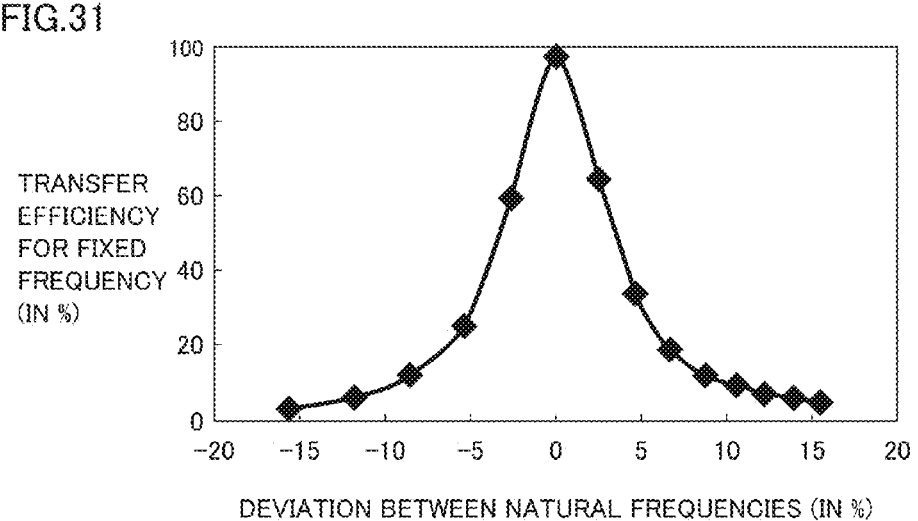
FIG. 31 is a graph showing a relationship between a deviation in natural frequency between power transmitting and receiving units and power transfer efficiency.

Reference will now be made to FIGS. 30 and 31 to describe a result of a simulation that analyzes a relationship between a difference in natural frequency and power transfer efficiency. FIG. 30 shows a simulation model of a power transfer system. The power transfer system includes a power transmitting device 190 and a power receiving device 191. Power transmitting device 190 includes a coil 192 (an electromagnetic induction coil) and a power transmitting unit 193. Power transmitting unit 193 has a coil 194 (a primary coil) and a capacitor 195 provided in coil 194. Power receiving device 191 includes a power receiving unit 196 and a coil 197 (an electromagnetic induction coil). Power receiving unit 196 includes a coil 199 (a secondary coil) and a capacitor 198 connected to coil 199.

Coil 194 has an inductance Lt and capacitor 195 has a capacitance C1. Coil 199 has an inductance Lr and capacitor 198 has a capacitance C2. When each parameter is thus set, power transmitting unit 193 and power receiving unit 196 have natural frequencies f1 and f2 expressed by the following expressions (1) and (2), respectively:

$$f1 = 1/\{2\pi(Lt \times C1)^{1/2}\} \quad (1), \text{ and}$$

$$f2 = 1/\{2\pi(Lr \times C2)^{1/2}\} \quad (2).$$

When inductance Lr and capacitances C1 and C2 are fixed and inductance Lt is alone varied, power transmitting unit 193 and power receiving unit 196 have natural frequencies with a deviation, which has a relationship with power transfer efficiency, as shown in FIG. 31. Note that in this simulation, coil 194 and coil 199 have a fixed relative, positional relationship, and furthermore, power transmitting unit 193 is supplied with a current fixed in frequency for the sake of illustration.

The FIG. 31 graph has an axis of abscissa representing a deviation between the natural frequencies (in %) and an axis of ordinate representing transfer efficiency (in %) for a fixed frequency. Deviation in natural frequency (in %) is represented by the following expression (3):

$$(\text{Deviation in natural frequency}) = \{(f1 - f2)/f2\} \times 100 \ (\%) \quad (3).$$

As is also apparent from FIG. 31, when the natural frequencies have a deviation of ±0%, a power transfer efficiency close to 100% is provided. When the natural frequencies have a deviation of ±5%, a power transfer efficiency of 40% is provided. When the natural frequencies have a deviation of ±10%, a power transfer efficiency of 10% is provided. When the natural frequencies have a deviation of ±15%, a power transfer efficiency of 5% is provided.

In other words, it can be seen that the power transmitting and receiving units having their respective natural frequencies set with a deviation (in %) having an absolute value (or a difference) falling within a range of 10% or smaller of the natural frequency of power receiving unit 196, allow efficient power transfer. Furthermore, it can be seen that the power transmitting and receiving units having their respective natural frequencies set with a deviation (in %) in absolute value equal to or smaller than 5% of the natural frequency of power receiving unit 196, allow more efficient power transfer. The simulation has been done with an electromagnetic field analysis software (JMAG® produced by JSOL Corporation).

Hereinafter will be described how the power transfer system according to the present embodiment operates. As has been discussed above, power transmitting coil 58 (see FIG. 1 and the like) is supplied with ac power from high frequency power supply device 64. Power transmitting coil 58 is supplied with the electric power to have an alternating current of a specific frequency passing therethrough. As power transmitting coil 58 has the current of the specific frequency passing therethrough, power transmitting coil 58 forms an electromagnetic field surrounding power transmitting coil 58 and oscillating at a specific frequency.

Power receiving coil 22 is disposed within a prescribed range as measured from power transmitting coil 58, and power receiving coil 22 receives electric power through the electromagnetic field surrounding power transmitting coil 58. In the present embodiment, power receiving coil 22 and power transmitting coil 58 are so-called helical coils. Accordingly, power transmitting coil 58 forms magnetic and electric fields surrounding power transmitting coil 58 and oscillating at a specific frequency, and power receiving coil 22 mainly receives electric power from the magnetic field.

Power transmitting coil 58 forms the magnetic field surrounding power transmitting coil 58 and having the specific frequency, as will more specifically be described hereinafter. "The magnetic field having the specific frequency" typically has an association with power transfer efficiency and a frequency of a current supplied to power transmitting coil 58. Accordingly, what relationship exists between power transfer efficiency and the frequency of the current supplied to power transmitting coil 58 will first be described. When electric power is transferred from power transmitting coil 58 to power receiving coil 22, it is transferred at an efficiency varying with a variety of factors such as a distance between power transmitting coil 58 and power receiving coil 22. For example, power transmitting unit 56 and power receiving unit 200 have a natural frequency (or resonant frequency) f0, power transmitting coil 58 receives a current having a frequency f3, and power receiving coil 22 and power transmitting coil 58 have an air gap AG therebetween, for the sake of illustration.

Figure 32:
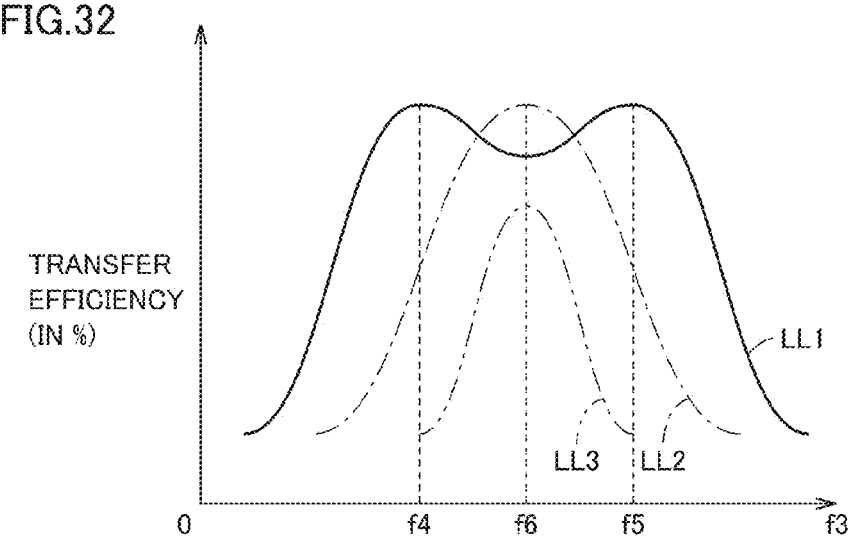
FIG. 32 is a graph representing a relationship between power transfer efficiency with an air gap AG varied and a frequency f3 of a current supplied to a primary coil, with a natural frequency f0 fixed.

FIG. 32 is a graph representing a relationship between power transfer efficiency with air gap AG varied and frequency f3 of the current supplied to power transmitting coil 58, with natural frequency f0 fixed. In FIG. 32, the axis of abscissa represents frequency f3 of the current supplied to power transmitting coil 58, and the axis of ordinate represents power transfer efficiency (in %).

An efficiency curve LL1 represents a relationship between a power transfer efficiency provided when air gap AG is small and frequency f3 of the current supplied to power transmitting coil 58. As indicated by efficiency curve LL1, when air gap AG is small, power transfer efficiency peaks at frequencies f4 and f5, wherein f4<f5. As air gap AG becomes larger, and as power transfer efficiency increases, it has the two peaks approaching each other.

Then, as indicated by an efficiency curve LL2, when air gap AG is larger than a prescribed distance, power transfer efficiency has a single peak, and when power transmitting coil 58 receives a current having a frequency f6, power transfer efficiency peaks. When air gap AG is still larger than that corresponding to efficiency curve LL2, then, as indicated by an efficiency curve LL3, power transfer efficiency peaks lower.

For example, more efficient power transfer may be achieved by a first methodology, as follows: Power transmitting coil 58 may be supplied with a current fixed in frequency and capacitors 59, 23 and the like may be varied in capacitance in accordance with air gap AG to change a characteristic of power transfer efficiency between power transmitting unit 56 and power receiving unit 200. More specifically, while power transmitting coil 58 is supplied with a current fixed in frequency, capacitors 59 and 23 are adjusted in capacitance to allow power transfer efficiency to peak. In this methodology, power transmitting coil 58 and power receiving coil 22 pass a current fixed in frequency, regardless of the size of air gap AG. The characteristic of power transfer efficiency may alternatively be changed by utilizing a matching device provided between power transmitting device 50 and high-frequency power supply device 64 or by utilizing DC/DC converter 142, or the like.

A second methodology is based on the size of air gap AG to adjust in frequency a current supplied to power transmitting coil 58. For example, in FIG. 32, for a power transfer characteristic corresponding to efficiency curve LL1, power transmitting coil 58 is supplied with a current of frequency f4 or f5. For frequency characteristics corresponding to efficiency curves LL2 and LL3, power transmitting coil 58 is supplied with a current of frequency f6. Thus a current that passes through power transmitting coil 58 and power receiving coil 22 will be varied in frequency in accordance with the size of air gap AG.

In the first methodology, power transmitting coil 58 will have a current passing therethrough fixed in frequency, whereas in the second methodology, power transmitting coil 58 will have a current passing therethrough varying in frequency, as appropriate, with air gap AG. The first or second methodology or the like is thus employed to supply power transmitting coil 58 with a current of a specific frequency set to provide efficient power transfer. As power transmitting coil 58 has the current of the specific frequency passing therethrough, power transmitting coil 58 forms a magnetic field (an electromagnetic field) surrounding power transmitting coil 58 and oscillating at a specific frequency.

Power receiving unit 200 receives electric power from power transmitting unit 56 through at least one of a magnetic field formed between power receiving unit 200 and power transmitting unit 56 and oscillating at a specific frequency and an electric field formed between power receiving unit 200 and power transmitting unit 56 and oscillating at a specific frequency. Accordingly, "a magnetic field oscillating at a specific frequency" is not limited to a magnetic field of a fixed frequency, and "an electric field oscillating at a specific frequency" is also not limited to an electric field of a fixed frequency.

Note that while in the above example air gap AG is focused on and a current that is supplied to power transmitting coil 58 is accordingly set in frequency, power transfer efficiency also varies with other factors such as horizontal misalignment of power transmitting and receiving coils 58 and 22, and such other factors may be considered in adjusting in frequency the current supplied to power transmitting coil 58.

An example has been described with a resonant coil implemented as a helical coil. If the resonant coil is an antenna such as a meander line antenna, power transmitting coil 58, having a current of a specific frequency passing therethrough, forms an electric field surrounding power transmitting coil 58 and having a specific frequency. Through this electric field, power transmitting unit 56 and power receiving unit 200 transfer electric power therebetween.

Figure 33:
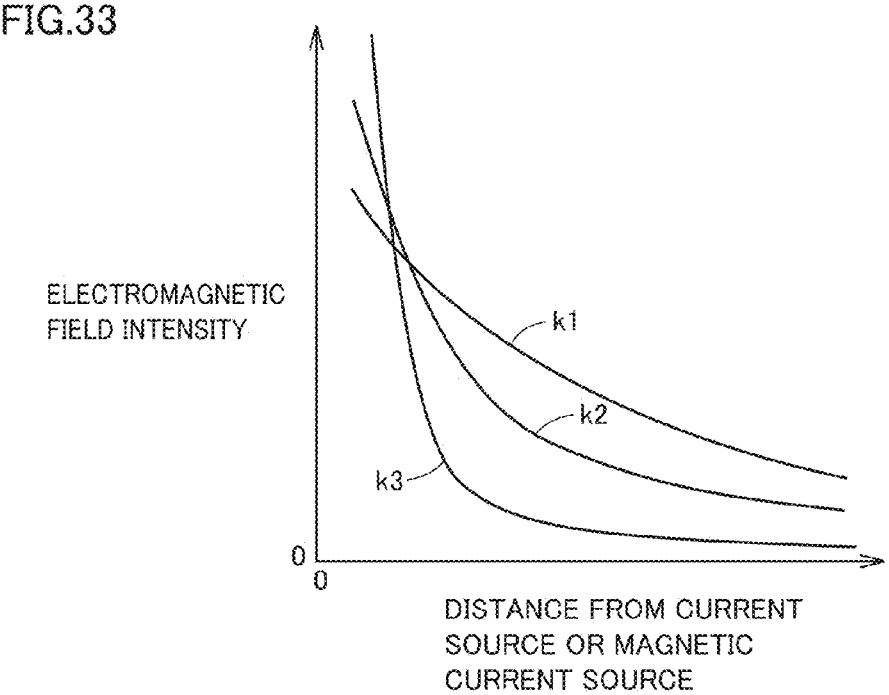
FIG. 33 is a diagram showing a relationship between a distance from a current source or a magnetic current source and an electromagnetic field in intensity.

The power transfer system of the present embodiment allows a near field where an electromagnetic field has a "static electromagnetic field" dominantly (or an evanescent field) to be utilized to transmit and receive electric power more efficiently. FIG. 33 is a diagram showing a relationship between a distance from a current source or a magnetic current source and an electromagnetic field in intensity. Referring to FIG. 33, the electromagnetic field includes three components. A curve k1 represents a component in inverse proportion to a distance from a wave source, referred to as a "radiated electromagnetic field." A curve k2 represents a component in inverse proportion to the square of the distance from the wave source, referred to as an "induced electromagnetic field." A curve k3 represents a component in inverse proportion to the cube of the distance from the wave source, referred to as a "static electromagnetic field." When the electromagnetic field has a wavelength k, a distance allowing the "radiated electromagnetic field," the "induced electromagnetic field," and the "static electromagnetic field" to be substantially equal in intensity can be represented as $\lambda/2\pi$.

A "static electromagnetic field" is a region where an electromagnetic wave rapidly decreases in intensity as the distance from the wave source increases, and in the power transfer system of the present embodiment, a near field where the "static electromagnetic field" is dominant (or an evanescent field) is utilized to transfer energy (or electric power). In other words, in the near field where the "static electromagnetic field" is dominant, power transmitting unit 56 and power receiving unit 200 having close natural frequencies (e.g., a pair of LC resonant coils) are caused to resonate with each other to thereby transfer energy (or electric power) from power transmitting unit 56 to power receiving unit 200.

The static electromagnetic field does not propagate energy over a long distance. Accordingly, as compared with an electromagnetic wave transmitting energy (or electric power) by a radiated electromagnetic field propagating energy over a long distance, the resonance method allows power transmission with less energy loss. Thus the present power transfer system causes a power transmitting unit and a power receiving unit to resonate via an electromagnetic field to allow the power transmitting unit and the power receiving unit to transfer electric power therebetween contactlessly.

Such an electromagnetic field as formed between a power receiving unit and a power transmitting unit may be referred to as a near field resonant coupling field, for example. The power transmitting unit and the power receiving unit have a coupling coefficient κ therebetween for example of approximately 0.3 or smaller, preferably 0.1 or smaller. Coupling coefficient κ in a range of approximately 0.1-0.3 may also be applied. Coupling coefficient κ is not limited to such a value and may assume any value allowing satisfactory power transfer.

Coupling of power transmitting unit 56 and power receiving unit 200 in power transfer in the present embodiment is referred to for example as "magnetic resonant coupling," "magnetic field resonant coupling," "magnetic field resonant coupling," "near field resonant coupling," "electromagnetic field resonant coupling," or "electric field resonant coupling". "Electromagnetic field resonant coupling" means coupling including all of "magnetic resonant coupling," "magnetic field resonant coupling" and "electric field resonant coupling."

Power transmitting coil 58 of power transmitting unit 56 and power receiving coil 22 of power receiving unit 200 as described in the present specification are coil antennas, and accordingly, power transmitting unit 56 and power receiving unit 200 are coupled mainly by a magnetic field and power transmitting unit 56 and power receiving unit 200 are coupled by "magnetic resonant coupling" or "magnetic field resonant coupling."

Note that power transmitting and receiving coils 58, 22 may for example be meander line antennas, and in that case, power transmitting unit 56 and power receiving unit 200 are coupled mainly via an electric field. In that case, power transmitting unit 56 and power receiving unit 200 are "coupled by electric field resonant coupling." Thus in the present embodiment power receiving unit 200 and power transmitting unit 56 transfer electric power therebetween contactlessly. In thus transferring electric power contactlessly, power receiving unit 200 and power transmitting unit 56 mainly have a magnetic field formed therebetween. Accordingly, while the above embodiments are described with "magnetic field intensity" focused on, a similar function and effect is also obtained with "electric field intensity" or "electromagnetic field intensity" focused on.

Another Example of Parking Assistance

Figure 34:
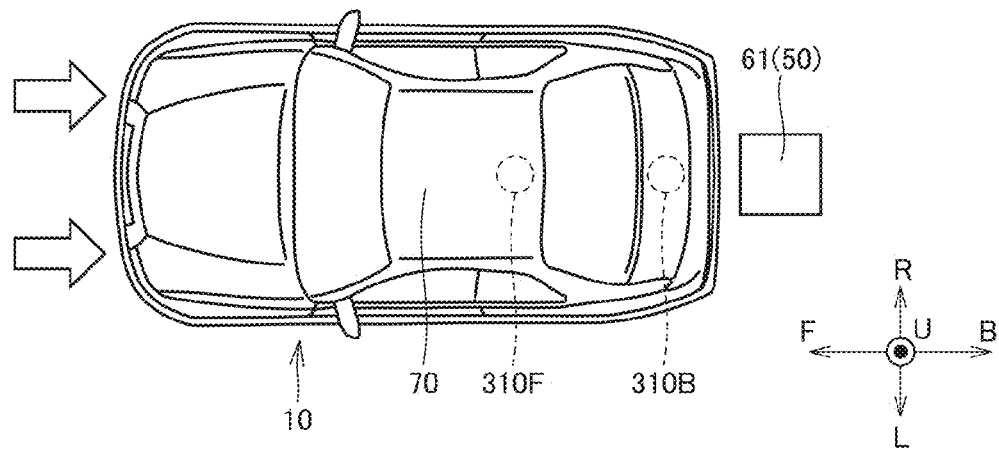
FIG. 34 is a plan view showing how electrically powered vehicle 10 is assisted when it is parked in another (first) example.

With reference to FIG. 34, electrically powered vehicle 10 may include a sensing unit 310F and a sensing unit 310B.

Sensing unit 310F and sensing unit 310B are mutually spaced in a direction transverse to the vertical direction. In the FIG. 34 example, sensing unit 310F is closer to the vehicle's front side in vehicular frontward direction F than sensing unit 310B is. This configuration also applies in FIGS. 35-38.

FIG. 34 shows electrically powered vehicle 10 moving backward as it is being parked, and electrically powered vehicle 10 is moving in vehicular rearward direction B toward the location of power transmitting device 50. A test magnetic field is formed in a vicinity of power transmitting device 50. Sensing units 310F and 310B also operate while electrically powered vehicle 10 is moving backward as it is being parked. In the FIG. 34 example, sensing unit 310B functions as a first sensing unit, and sensing unit 310F functions as a second sensing unit. Sensing unit 310B is disposed on vehicular body 70 at a location rearwardly of sensing unit 310F.

When electrically powered vehicle 10 is moving and sensing unit 310B senses a test magnetic field having an intensity equal to or greater than a threshold value (i.e., satisfying a first condition) and sensing unit 310F senses a test magnetic field having an intensity less than a threshold value (i.e., failing to satisfy a second condition), HV ECU 470 (see FIG. 8) controls MG ECU 430 to move electrically powered vehicle 10 in a direction in which sensing unit 310B is located as seen from sensing unit 310F. This allows electrically powered vehicle 10 to continue to move backward.

The first condition may not only be based on whether sensing unit 310B senses a test magnetic field having an intensity equal to or greater than a threshold value, but may alternatively be based on that sensing unit 310B has sensed a test magnetic field (or is in the ON state) or does not sense it (or is in the OFF state). The second condition may also not only be based on whether sensing unit 310F senses a test magnetic field having an intensity equal to or greater than a threshold value, but may alternatively be based on that sensing unit 310F has sensed a test magnetic field (or is in the ON state) or does not sense it (or is in the OFF state). Whether the first and second conditions are satisfied may be determined with reference to threshold values, respectively, having equal values or different values. Whether the first condition represented by the ON and OFF states and the second condition represented by the ON and OFF states are satisfied may also be determined with reference to magnetic field intensity values (or threshold values), respectively, having equal values or different values.

Figure 35:
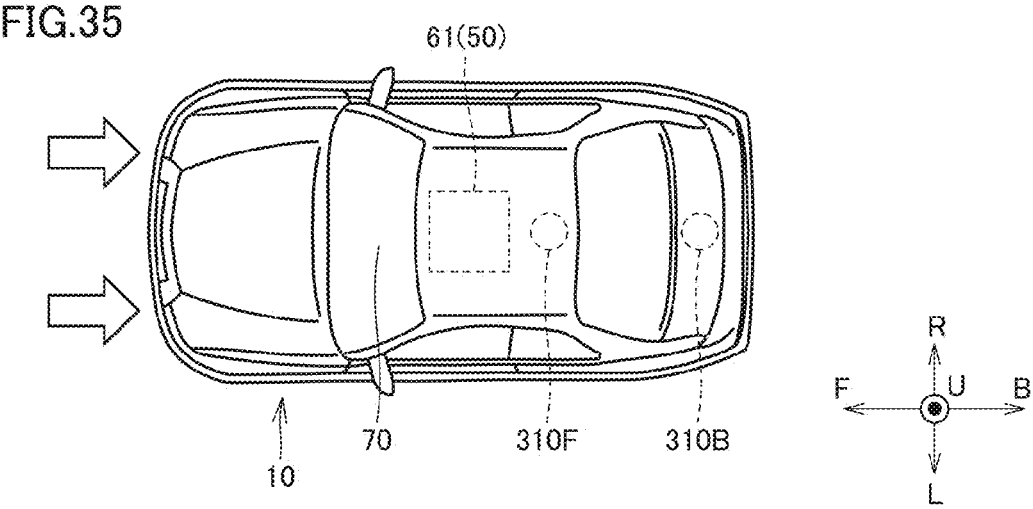
FIG. 35 is a plan view showing how electrically powered vehicle 10 is assisted when it is parked in another (second) example.

FIG. 35 shows electrically powered vehicle 10 moving backward as it is being parked, and electrically powered vehicle 10 is moving in vehicular rearward direction B past power transmitting device 50. A test magnetic field is formed in a vicinity of power transmitting device 50. Sensing units 310F and 310B also operate while electrically powered vehicle 10 is moving backward as it is being parked. In the FIG. 35 example, sensing unit 310F functions as a first sensing unit, and sensing unit 310B functions as a second sensing unit. Sensing unit 310F is disposed on vehicular body 70 at a location frontwardly of sensing unit 310B.

When electrically powered vehicle 10 is moving and sensing unit 310F senses a test magnetic field having an intensity equal to or greater than a threshold value (i.e., satisfying the first condition) and sensing unit 310B senses a test magnetic field having an intensity less than a threshold value (i.e., failing to satisfy the second condition), HV ECU 470 (see FIG. 8) controls MG ECU 430 to move electrically powered vehicle 10 in a direction in which sensing unit 310F is located as seen from sensing unit 310B. This allows electrically powered vehicle 10 to move forward.

The first condition may not only be based on whether sensing unit 310F senses a test magnetic field having an intensity equal to or greater than a threshold value, but may alternatively be based on that sensing unit 310F has sensed a test magnetic field (or is in the ON state) or does not sense it (or is in the OFF state). The second condition may also not only be based on whether sensing unit 310B senses a test magnetic field having an intensity equal to or greater than a threshold value, but may alternatively be based on that sensing unit 310B has sensed a test magnetic field (or is in the ON state) or does not sense it (or is in the OFF state). Whether the first and second conditions are satisfied may be determined with reference to threshold values, respectively, having equal values or different values. Whether the first condition represented by the ON and OFF states and the second condition represented by the ON and OFF states are satisfied may also be determined with reference to magnetic field intensity values (or threshold values), respectively, having equal values or different values.

Figure 36:
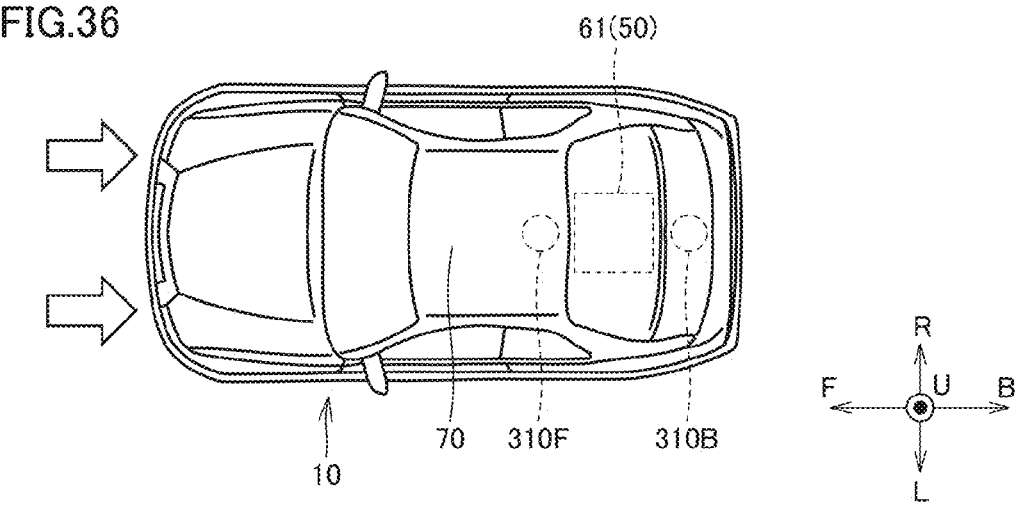
FIG. 36 is a plan view showing how electrically powered vehicle 10 is assisted when it is parked in another (third) example.

FIG. 36 shows electrically powered vehicle 10 moving backward as it is being parked, and electrically powered vehicle 10 is moving in vehicular rearward direction B. Power transmitting device 50 is located between sensing unit 310F and sensing unit 310B. A test magnetic field is formed in a vicinity of power transmitting device 50. Sensing units 310F and 310B also operate while electrically powered vehicle 10 is moving backward as it is being parked. In the FIG. 35 example, sensing unit 310F functions as a first sensing unit, and sensing unit 310B functions as a second sensing unit. Sensing unit 310F is disposed on vehicular body 70 at a location frontwardly of sensing unit 310B.

When electrically powered vehicle 10 is moving and sensing unit 310F senses a test magnetic field having an intensity equal to or greater than a threshold value (i.e., satisfying the first condition) and sensing unit 310B senses a test magnetic field having an intensity equal to or greater than a threshold value (i.e., satisfying the second condition), HV ECU 470 (see FIG. 8) controls MG ECU 430 to move electrically powered vehicle 10 so that the test magnetic field sensed by sensing unit 310F and that sensed by sensing unit 310B approach a single value in intensity. This allows electrically powered vehicle 10 to move forward or backward to allow power transmitting device 50 to be located in vehicular frontward direction F and vehicular rearward direction B exactly in the middle between sensing unit 310F and sensing unit 310B. This similarly applies when sensing unit 310F functions as a second sensing unit and sensing unit 310B functions as a first sensing unit. Electrically powered vehicle 10 moving in vehicular frontward direction F is also similarly discussed.

Figure 37:
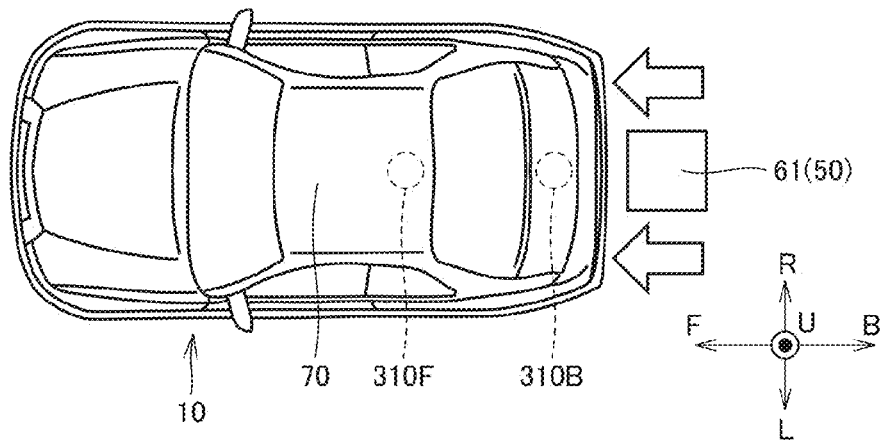
FIG. 37 is a plan view showing how electrically powered vehicle 10 is assisted when it is parked in another (fourth) example.

FIG. 37 shows electrically powered vehicle 10 moving forward as it is being parked, and electrically powered vehicle 10 is moving in vehicular forward direction F past power transmitting device 50. A test magnetic field is formed in a vicinity of power transmitting device 50. Sensing units 310F and 310B also operate while electrically powered vehicle 10 is moving forward as it is being parked. In the FIG. 37 example, sensing unit 310F functions as a second sensing unit, and sensing unit 310B functions as a first sensing unit. Sensing unit 310B is disposed on vehicular body 70 at a location rearwardly of sensing unit 310F.

When electrically powered vehicle 10 is moving and sensing unit 310B senses a test magnetic field having an intensity equal to or greater than a threshold value (i.e., satisfying the first condition) and sensing unit 310F senses a test magnetic field having an intensity less than a threshold value (i.e., failing to satisfy the second condition), HV ECU 470 (see FIG. 8) controls MG ECU 430 to move electrically powered vehicle 10 in a direction in which sensing unit 310B is located as seen from sensing unit 310F. This allows electrically powered vehicle 10 to move backward.

The first condition may not only be based on whether sensing unit 310B senses a test magnetic field having an intensity equal to or greater than a threshold value, but may alternatively be based on that sensing unit 310B has sensed a test magnetic field (or is in the ON state) or does not sense it (or is in the OFF state). The second condition may also not only be based on whether sensing unit 310F senses a test magnetic field having an intensity equal to or greater than a threshold value, but may alternatively be based on that sensing unit 310F has sensed a test magnetic field (or is in the ON state) or does not sense it (or is in the OFF state). Whether the first and second conditions are satisfied may be determined with reference to threshold values, respectively, having equal values or different values. Whether the first condition represented by the ON and OFF states and the second condition represented by the ON and OFF states are satisfied may also be determined with reference to magnetic field intensity values (or threshold values), respectively, having equal values or different values.

Figure 38:
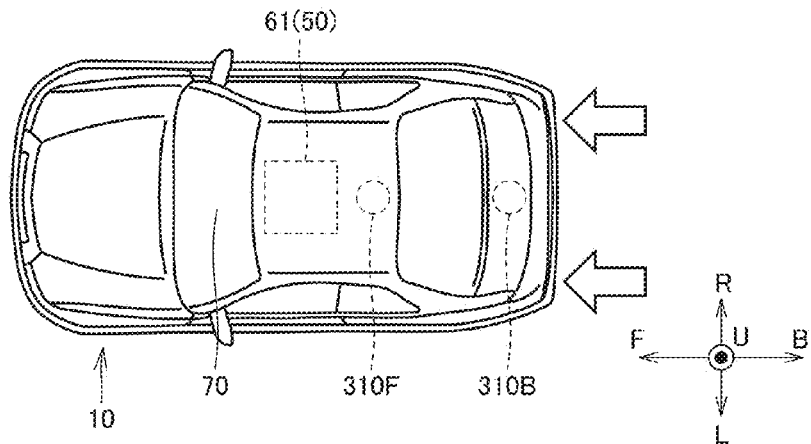
FIG. 38 is a plan view showing how electrically powered vehicle 10 is assisted when it is parked in another (fifth) example.

FIG. 38 shows electrically powered vehicle 10 moving forward as it is being parked, and electrically powered vehicle 10 is moving in vehicular forward direction F toward power transmitting device 50. A test magnetic field is formed in a vicinity of power transmitting device 50. Sensing units 310F and 310B also operate while electrically powered vehicle 10 is moving forward as it is being parked. In the FIG. 38 example, sensing unit 310F functions as a first sensing unit, and sensing unit 310B functions as a second sensing unit. Sensing unit 310F is disposed on vehicular body 70 at a location frontwardly of sensing unit 310B.

When electrically powered vehicle 10 is moving and sensing unit 310F senses a test magnetic field having an intensity equal to or greater than a threshold value (i.e., satisfying the first condition) and sensing unit 310B senses a test magnetic field having an intensity less than a threshold value (i.e., failing to satisfy the second condition), HV ECU 470 (see FIG. 8) controls MG ECU 430 to move electrically powered vehicle 10 in a direction in which sensing unit 310F is located as seen from sensing unit 310B. This allows electrically powered vehicle 10 to continue to move forward.

The first condition may not only be based on whether sensing unit 310F senses a test magnetic field having an intensity equal to or greater than a threshold value, but may alternatively be based on that sensing unit 310F has sensed a test magnetic field (or is in the ON state) or does not sense it (or is in the OFF state). The second condition may also not only be based on whether sensing unit 310B senses a test magnetic field having an intensity equal to or greater than a threshold value, but may alternatively be based on that sensing unit 310B has sensed a test magnetic field (or is in the ON state) or does not sense it (or is in the OFF state). Whether the first and second conditions are satisfied may be determined with reference to threshold values, respectively, having equal values or different values. Whether the first condition represented by the ON and OFF states and the second condition represented by the ON and OFF states are satisfied may also be determined with reference to magnetic field intensity values (or threshold values), respectively, having equal values or different values.

In the FIG. 34-38 examples, when sensing units 310F and 310B satisfy the first and second conditions (e.g., when they both attain the ON state), HV ECU 470 (see FIG. 8) may end controlling MG ECU 430 and thus stop electrically powered vehicle 10 from moving.

Where Sensing Unit 310 is Disposed in First Exemplary Variation

Figure 39:
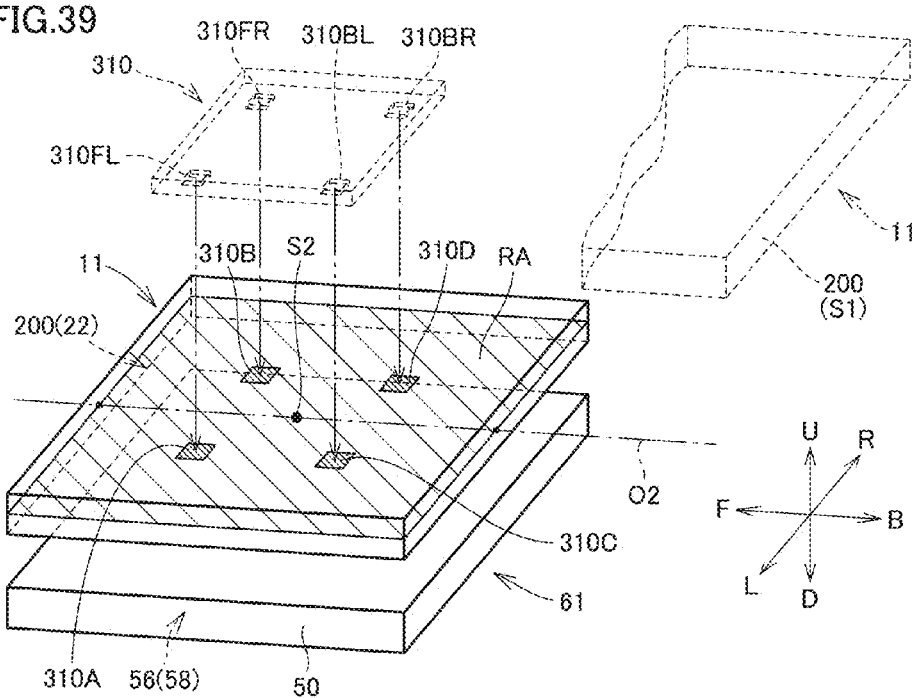
FIG. 39 is a perspective view showing where sensing unit 310 is disposed in a first exemplary variation.

FIG. 39 is a perspective view showing where sensing unit 310 is disposed in a first exemplary variation. Sensing unit 310 includes four sensing units 310FL, 310FR, 310BL, and 310BR. Power receiving coil 22 has winding axis O2. In this exemplary variation, winding axis O2 extends in a direction orthogonal to a direction in which power transmitting unit 56 and power receiving unit 200 disposed in second position S2 face each other.

When power receiving unit 200 is disposed in second position S2, an imaginary plane RA is drawn to include winding axis O2 and be also orthogonal to the vertical direction for the sake of illustration. When four sensing units 310FL, 310FR, 310BL, and 310BR are projected vertically toward imaginary plane RA, then four sensing unit 310FL, 310FR, 310BL, and 310BR form projected images 310A, 310B, 310C, and 310D, respectively, in imaginary plane RA. In this exemplary variation, the locations of projected images 310A, 310C and those of projected images 310B, 310D have a relationship of line symmetry with respect to winding axis O2. As has been described above with reference to FIG. 26 and FIG. 27, sensing unit 310 sensing intensity component Hz in the z direction allows electrically powered vehicle 10 to be aligned with power transmitting device 50 easily with high precision.

Where Sensing Unit 310 is Disposed in Second Exemplary Variation

Figure 40:
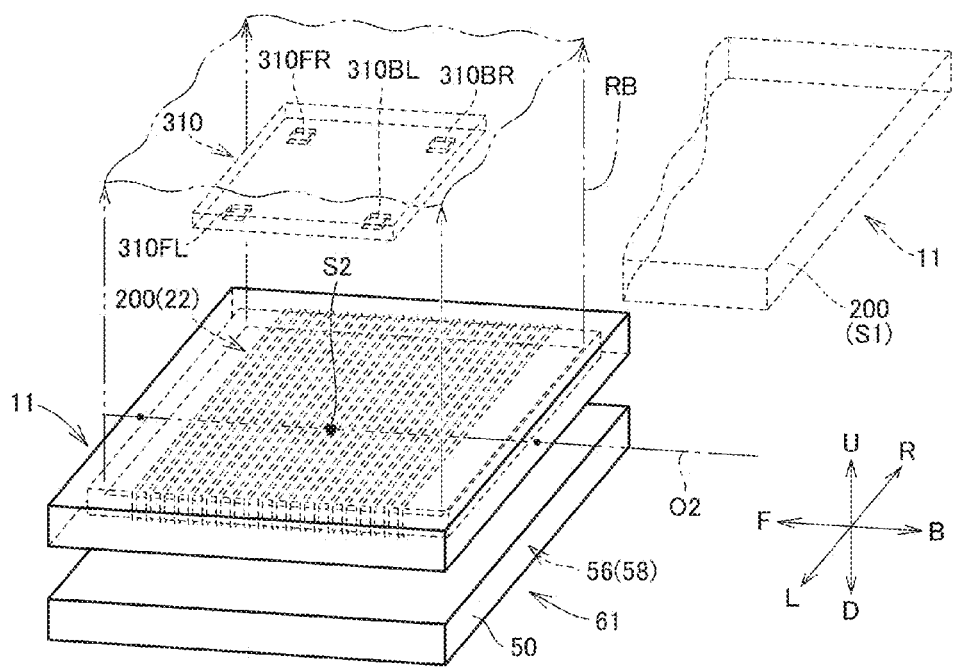
FIG. 40 is a perspective view showing where sensing unit 310 is disposed in a second exemplary variation.

FIG. 40 is a perspective view showing where sensing unit 310 is disposed in a second exemplary variation. When power receiving unit 200 is disposed in second position S2, and power receiving unit 200 is virtually projected vertically upward, a projected space RB is formed. Virtually projecting power receiving unit 200 vertically upward includes at least one of: virtually projecting power receiving coil 22 vertically upward; virtually projecting ferrite core 21 (see FIG. 4) held inside power receiving coil 22 at fixed member 68 (see FIG. 4) vertically upward; and virtually projecting fixed member 68 (see FIG. 4) having power receiving coil 22 wound thereon vertically upward.

In this exemplary variation, sensing unit 310 is all included in projected space RB. Four sensing units 310FL, 310FR, 310BL, 310BR may have any one or a plurality thereof included in projected space RB. Sensing unit 310 located in projected space RB easily senses where power transmitting device 50 is located, with a position in which power receiving unit 200 is disposed considered as second position S2 assumed in power transfer.

Movement Mechanism 30A

Figure 41:
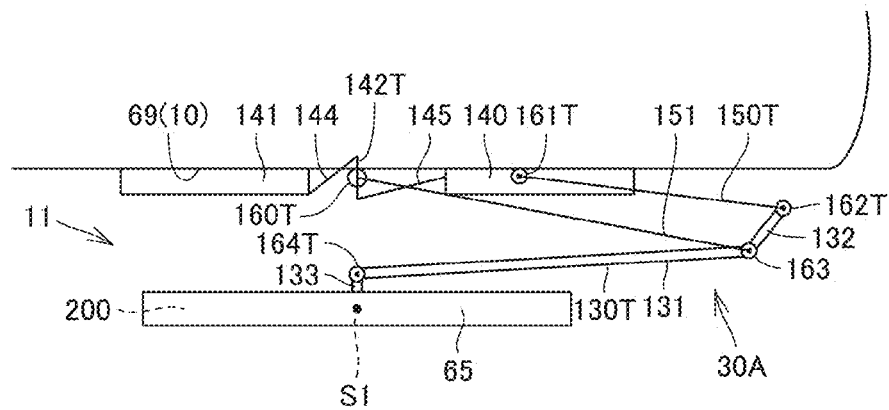
FIG. 41 is a side view of power receiving device 11 including a movement mechanism 30A as an exemplary variation.

FIG. 41 is a side view of power receiving device 11 including a movement mechanism 30A as an exemplary variation. FIG. 41 shows power receiving device 11 (power receiving unit 200, casing 65, and movement mechanism 30A) as seen when electrically powered vehicle 10 stops at a prescribed position. Power receiving device 11 includes power receiving unit 200, and movement mechanism 30A supporting power receiving unit 200. Casing 65 is supported by movement mechanism 30A, adjacent to floor panel 69. Casing 65 is secured to the accommodation position and power receiving unit 200 is positioned to include first position S1.

Movement mechanism 30A includes an arm 130T, a spring mechanism 140, a drive unit 141, and support members 150T and 151. Arm 130T includes a longer rod 131, a shorter rod 132 connected to longer rod 131 at one end, and a connection rod 133 connected to longer rod 131 at the other end. Shorter rod 132 is connected to longer rod 131 integrally such that the former bends relative to the latter. Connection rod 133 is connected to casing 65 at an upper surface. Arm 130T and longer rod 131 are connected by a hinge 164T.

Support member 151 has one end connected to arm 130T by a hinge 163. Support member 151 has one end connected to a connection of longer rod 131 and shorter rod 132. Support member 151 has the other end with a fixed plate 142T secured thereto. Fixed plate 142T is provided on floor panel 69 to be rotatable by a hinge 160T.

Support member 150T has one end connected to shorter rod 132 at an end by a hinge 162T. Support member 150T has the other end supported on floor panel 69 by a hinge 161T rotatably. Drive unit 141 is fixed to floor panel 69 on a bottom surface. Drive unit 141 is a pneumatic cylinder for example. Drive unit 141 is provided with a piston 144, and piston 144 has a tip connected to fixed plate 142T.

Spring mechanism 140 is provided on floor panel 69 and has a spring housed therein. Spring mechanism 140 has an end provided with a connection piece 145 connected to the internally housed spring and fixed plate 142T. Spring mechanism 140 applies a biasing force to fixed plate 142T to pull fixed plate 142T. Where connection piece 145 is connected on fixed plate 142T and where piston 144 is connected on fixed plate 142T are opposite to each other with hinge 160T posed therebetween.

Hereinafter reference will be made to FIGS. 41-43 to describe how each member operates in moving power receiving unit 200 toward power transmitting unit 56. When power receiving unit 200 is moved downward from the FIG. 41 state, drive unit 141 pushes out piston 144 and piston 144 presses fixed plate 142T. When fixed plate 142T is pressed by piston 144, fixed plate 142T rotates about hinge 160T. At the time, the spring in spring mechanism 140 is extended.

Figure 42:
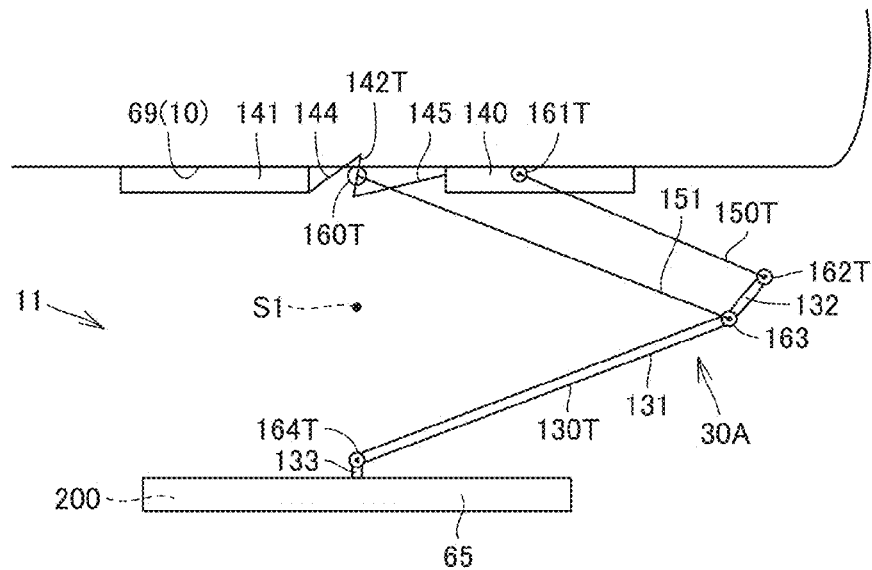
FIG. 42 is a side view showing power receiving unit 200 of power receiving device 11 including movement mechanism 30A moving downward.

As shown in FIG. 42, in causing power receiving unit 200 to descend, drive unit 141 rotates fixed plate 142T against the tension of spring mechanism 140. Fixed plate 142T and support member 151 are connected integrally, and accordingly, when fixed plate 142T rotates, support member 151 also rotates about hinge 160T. As support member 151 rotates, arm 130T also moves. At the time, support member 150T rotates about hinge 161T while supporting an end of arm 130T. Connection rod 133 moves vertically downward, and so does power receiving unit 200.

Figure 43:
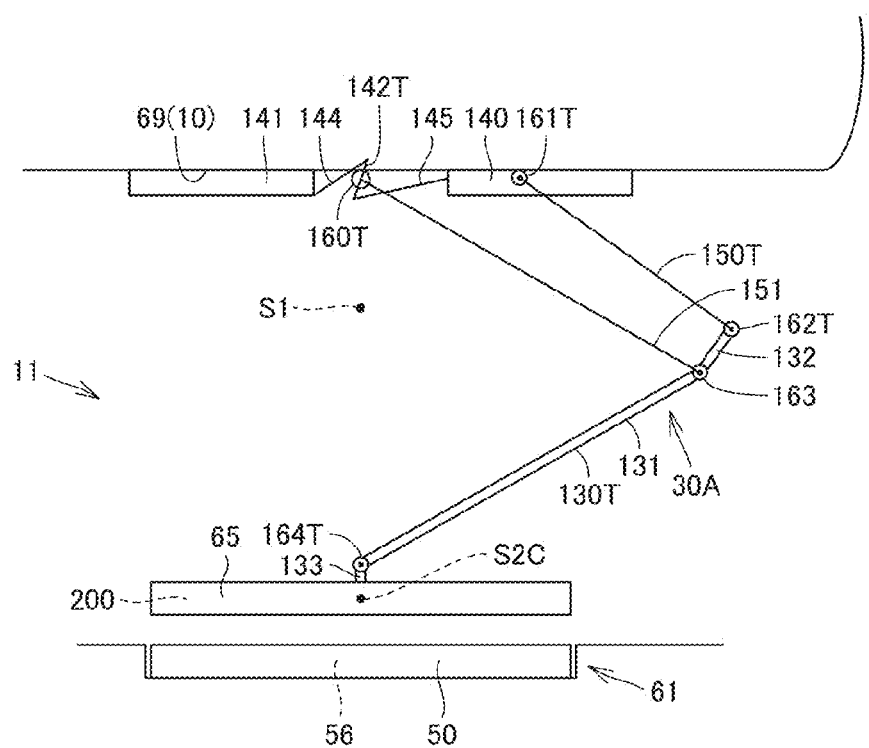
FIG. 43 is a side view showing power receiving unit 200 of power receiving device 11 including movement mechanism 30A disposed in a second position S2C (or a power receiving position).

When power receiving unit 200 descends from first position S1 (or the accommodated state) by a prescribed distance, power receiving unit 200 assumes second position S2C (or the power receiving position), as shown in FIG. 43. In the present exemplary variation, second position S2C is vertically below (or exactly under) first position S1. Once power receiving unit 200 has reached second position S2C (or the power receiving position), drive unit 141 stops fixed plate 142T from rotating. Note that fixed plate 142T may have a rotary shaft provided with a ratchet (a switching mechanism) or the like to stop drive unit 141 from rotating. In that case, while the ratchet prevents fixed plate 142T from rotating in a direction allowing power receiving unit 200 to descend, the ratchet permits fixed plate 142T to rotate in a direction allowing power receiving unit 200 to be displaced upward.

Once power receiving unit 200 has reached second position S2C (or the power receiving position), the ratchet restrains fixed plate 142T from rotating in the direction allowing power receiving unit 200 to descend, while drive unit 141 is continuously driven. Drive unit 141 provides a motive force larger than the tension applied by spring mechanism 140 and thus restrains power receiving unit 200 from displacing via the ratchet upward and descending via the ratchet. Once power receiving unit 200 has stopped at second position S2C (or the power receiving position), power receiving unit 200 and power transmitting unit 56 start transferring electric power therebetween. When charging the battery is completed, driving drive unit 141 is stopped.

Drive unit 141 no longer applies force to press fixed plate 142T, and fixed plate 142T rotates as spring mechanism 140 applies tension thereto. As fixed plate 142T is rotated by the tension applied by spring mechanism 140, support member 151 rotates about hinge 160T. At the time, the ratchet permits fixed plate 142T to rotate to allow power receiving unit 200 to displace in a direction allowing power receiving unit 200 to displace upward. Power receiving unit 200 displaces upward. As shown in FIG. 41, once power receiving unit 200 has returned to first position S1 (or the accommodation position), power receiving unit 200 is secured by a holding device (not shown).

Power receiving device 11 includes an angle sensor provided at the rotary shaft of fixed plate 142T and sensing the rotary shaft's angle of rotation, and a restraint mechanism that restrains the fixed plate 142T rotary shaft from rotating. Power receiving unit 200 descends by its own weight against the tension of spring mechanism 140. Once the angle sensor has sensed that power receiving unit 200 has descended to second position S2C (or the power receiving position), the restraint mechanism restrains the fixed plate 142T rotary shaft from rotating. This stops power receiving unit 200 from descending.

When power receiving unit 200 ascends, drive unit 141 is driven to cause power receiving unit 200 to ascend. Once power receiving unit 200 has ascended to a charging position, the holding device secures power receiving unit 200, and driving drive unit 141 is also stopped. The present exemplary variation provides power receiving device 11 having power receiving unit 200 vertically displaced. Note that while drive unit 141 applies a driving force to move power receiving unit 200 downward and spring mechanism 140 applies tension to move power receiving unit 200 upward, power receiving device 11 may be adapted to have power receiving unit 200 lowered by its own weight.

Positional Relationship Between Sensing Unit 310 and Power Receiving Unit 200

Figure 44:
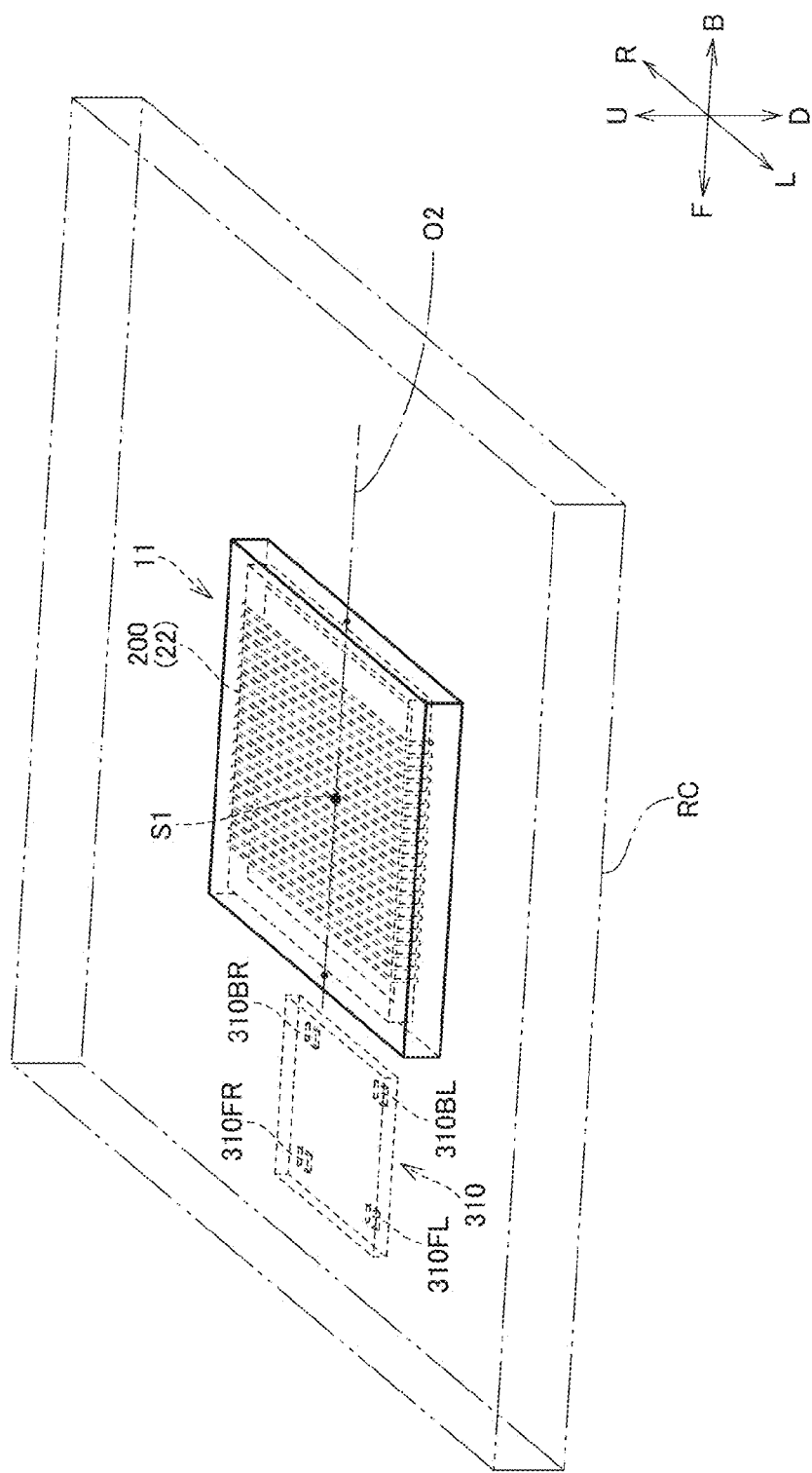
FIG. 44 is a perspective view for illustrating a positional relationship between power receiving unit 200 disposed in first position S1 and sensing unit 310.

FIG. 44 is a perspective view for illustrating a positional relationship between power receiving unit 200 disposed in first position S1 and sensing unit 310. When movement mechanism 30A vertically moving power receiving unit 200 is employed, sensing unit 310 may be included in a space RC virtually formed when power receiving unit 200 disposed in first position S1 is enlarged with reference to first position S1 to a similar figure of 3 times in size.

Enlarging power receiving unit 200 that is disposed in first position S1 with reference to first position S1 to the similar figure of 3 times in size includes at least one of: enlarging power receiving coil 22 with reference to first position S1 to a similar figure of 3 times in size; enlarging ferrite core 21 (see FIG. 4) held inside power receiving coil 22 at fixed member 68 (see FIG. 4) with reference to first position S1 to a similar figure of 3 times in size; and enlarging fixed member 68 (see FIG. 4) having power receiving coil 22 wound thereon with reference to first position S1 to a similar figure of 3 times in size.

Figure 45:
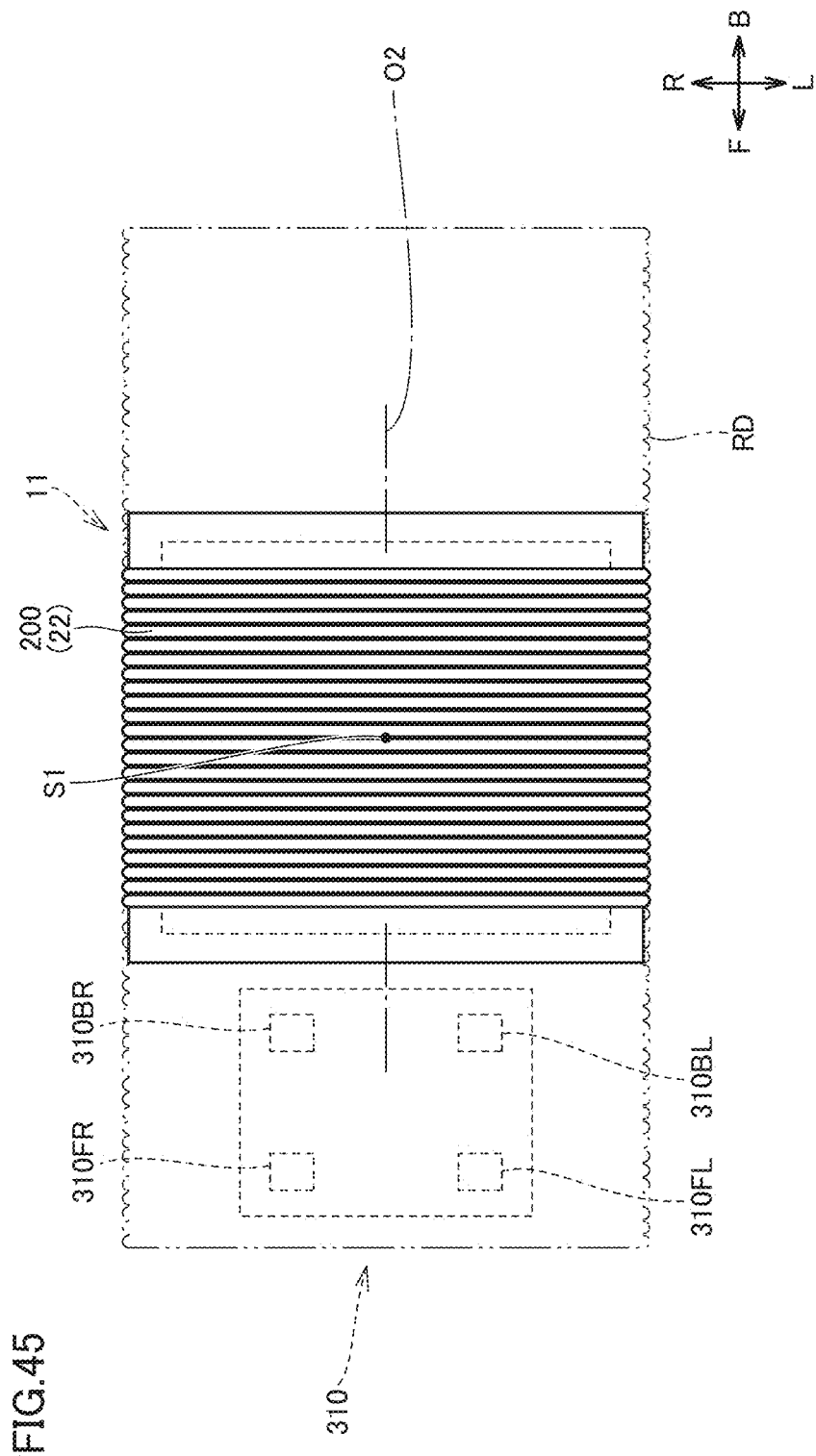
FIG. 45 is a plan view for illustrating the positional relationship between power receiving unit 200 disposed in first position S1 and sensing unit 310 in a suitable example.

With reference to FIG. 45, suitably, sensing unit 310 may be positioned in a space RD formed when power receiving unit 200 disposed in first position S1 has power receiving coil 22 virtually displaced by its size in vehicular frontward direction F and by its size in vehicular rearward direction B. In whichever of projected space RC (see FIG. 44) and projected space RD (see FIG. 45) sensing unit 310 may be located, it can sense a test magnetic field in intensity in a vicinity of first position S1 to understand where power transmitting device 50 is located.

Power Transmitting Device 50K

In the above described embodiments and exemplary variations, power receiving unit 200 is moved by movement mechanisms 30, 30A to ascend/descend and power transmitting device 50 has power transmitting unit 56 positionally fixed.

Figure 46:
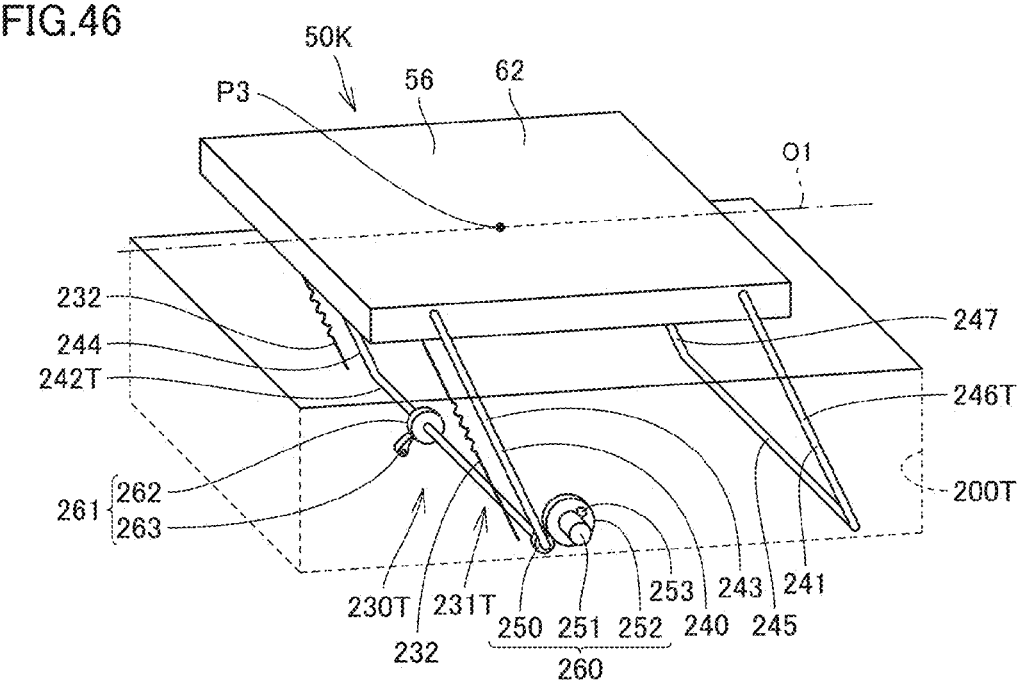
FIG. 46 is a perspective view of a power transmitting device 50K as an exemplary variation.

With reference to FIG. 46, a power transmitting device 50K as an exemplary variation includes power transmitting unit 56, a movement mechanism 230T supporting power transmitting unit 56 to be capable of ascending and descending, and a sensing unit 810 provided independently of power transmitting unit 56. Movement mechanism 230T can move power transmitting unit 56 toward and away from power receiving unit 200. Movement mechanism 230T can move power transmitting unit 56 to a first position Q1 (see FIG. 47) and a second position Q2 (see FIG. 47) described hereinafter. Second position Q2 is vertically, obliquely above first position Q1.

As will more specifically be described hereinafter, FIG. 47 at a lower left portion represents power transmitting unit 56 by a dotted line, which indicates a position that power transmitting unit 56 assumes when it is accommodated in parking space 52 or the like and thus disposed in first position Q1. When power transmitting unit 56 is disposed in first position Q1, a reference point in power transmitting unit 56 includes a spatial position (or an imaginary point), or first position Q1 (in other words, the reference point in power transmitting unit 56 overlaps first position Q1).

The reference point in the power transmitting unit 56 is for example a center P3 of power transmitting coil 58 (see FIG. 46). Center P3 is an imaginary point located on winding axis O1 of power transmitting coil 58 and is located at a center of power transmitting coil 58 as seen along winding axis O1. In other words, center P3 is located exactly in the middle between a portion of the coil wire of power transmitting coil 58 that is located at an extremity thereof in a direction along winding axis O1 (hereinafter referred to as a first direction) and a portion of the coil wire of power transmitting coil 58 that is located at an extremity thereof in a direction along winding axis O1 that is opposite to the first direction (hereinafter referred to as a second direction).

Figure 47:
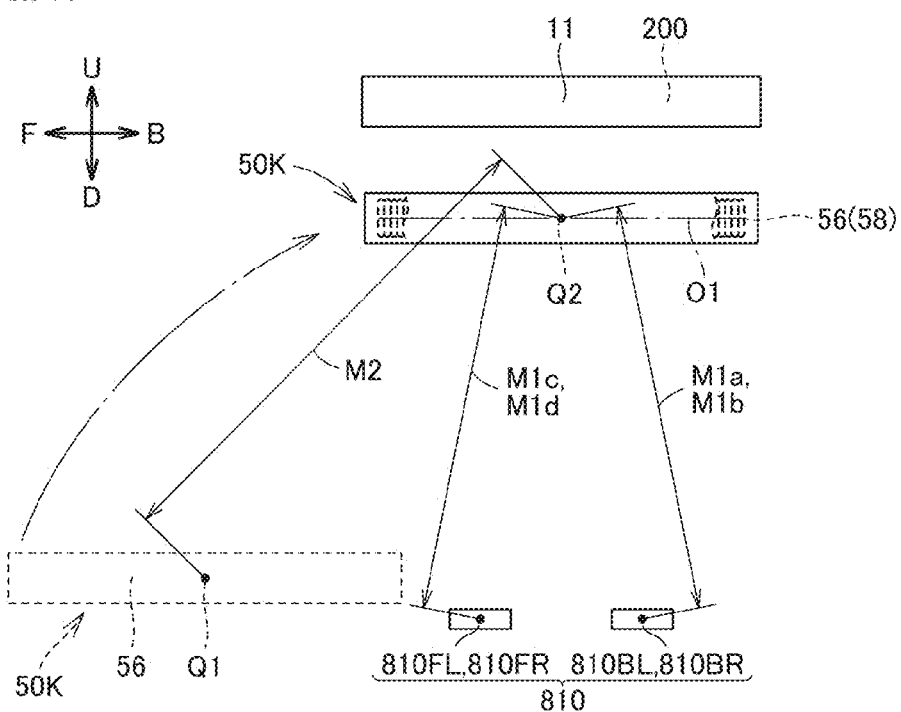
FIG. 47 is a side view for illustrating a positional relationship between power transmitting unit 56 disposed in a first position Q1, power transmitting unit 56 disposed in a second position Q2, and a sensing unit 810.

FIG. 47 at a top center portion represents power transmitting unit 56 by a solid line, which indicates a position that power transmitting unit 56 assumes when it is moved upward from parking space 52 and thus disposed in second position Q2. When power transmitting unit 56 is disposed in second position Q2, the reference point in power transmitting unit 56 includes a spatial position (or an imaginary point), or second position Q2 (in other words, the reference point in power transmitting unit 56 overlaps second position Q2).

First position Q1 and second position Q2 assumed by power transmitting unit 56 are mutually different positions and can each be any spatial position. For power transmitting device 50K, second position Q2 is remoter from a bottom surface of a housing space 200T than first position Q1 is. In the vertical direction, first position Q1 has a shorter distance to the bottom surface of housing space 200T than second position Q2 does. When power transmitting unit 56 in first position Q1 is compared with that in second position Q2, the latter is closer to power receiving unit 200 than the former is.

With reference to FIG. 46, movement mechanism 230T is housed in housing space 200T. Movement mechanism 230T includes a link mechanism 231T, a drive unit 260, and a switching unit 261. Link mechanism 231T includes a spring 232, a support member 240, a support member 241, and an encoder 253. Support member 240 and support member 241 together with casing 62 configure a so-called parallel link mechanism.

Spring 232 is provided to connect housing space 200T and casing 62 that houses power transmitting unit 56 therein at their respective bottom surfaces. Spring 232 is biased to allow casing 62 to be adjacent to the bottom surface of housing space 200T. Support member 240 includes a rotary shaft 242T closer to the bottom surface of housing space 200T and rotatably supported, a leg 243 connected to rotary shaft 242T at one end, and a leg 244 connected to rotary shaft 242T at the other end. Legs 243, 244 are connected to the bottom surface of casing 62.

Support member 241 includes a rotary shaft 245 closer to the bottom surface of housing space 200T and rotatably supported, a leg 246T connected to rotary shaft 245 at one end, and a leg 247 connected to rotary shaft 245 at the other end. Legs 246T, 247 are also connected to the bottom surface of casing 62.

Drive unit 260 includes a gear 250 provided at rotary shaft 242T, a gear 252 meshing with gear 250, and a motor 251 rotating gear 252. Encoder 253 detects the angle of rotation of a rotor provided in motor 251. Where power transmitting unit 56 is located is calculated from an angle of rotation as detected by encoder 253.

Switching unit 261 includes a gear 262 fixed to rotary shaft 242T, and a stopper 263 engaging with a toothing of gear 262. When switching unit 261 has stopper 263 engaged with gear 262, rotary shaft 242T is restrained from rotating in a direction allowing power transmitting unit 56 to ascend. While stopper 263 is engaged with gear 262, rotary shaft 242T is still permitted to rotate to allow power transmitting unit 56 to descend.

When power transmitting device 50 is thus configured, and electrically powered vehicle 10 is not stopped and power transmitting device 50 is in a standby state, power transmitting unit 56 is located in first position Q1 (i.e., closer to the bottom surface of housing space 200T) and hence in the accommodation position. Then, when electrically powered vehicle 10 is stopped in a prescribed position and power transmitting device 50 and power receiving device 11 are to transfer electric power contactlessly, movement mechanism 230T causes power transmitting unit 56 to ascend.

Specifically, switching unit 261 is liberated from a restraint state, and in that condition, drive unit 260 is driven to cause power transmitting unit 56 to ascend. Drive unit 260 resists the tension applied by spring 232 and moves power transmitting unit 56 upward. Once power transmitting unit 56 has reached second position Q2 allowing power transmitting unit 56 to transmit electric power to power receiving unit 200 (i.e., a power transmitting position), a control unit (not shown) controls switching unit 261 to restrain rotary shaft 242T from rotating. Drive unit 260 applies to power transmitting unit 56 a driving force larger than the tension that spring 232 applies to power transmitting unit 56, and accordingly, power transmitting unit 56 stops at second position Q2 (or the power transmitting position).

When transferring electric power to power receiving unit 200 ends, the control unit (not shown) stops driving drive unit 260. Power transmitting unit 56 is displaced downward as spring 232 applies tension. Power transmitting unit 56 returns to first position Q1 (i.e., the accommodation position). When power transmitting device 50K thus configured no longer has drive unit 260 operating satisfactorily, power transmitting unit 56 recedes downward as spring 232 applies tension. This can prevent power transmitting unit 56 from being held in a state moved upward.

FIG. 47 is a side view for illustrating a positional relationship between power transmitting unit 56 disposed in first position Q1, power transmitting unit 56 disposed in second position Q2, and sensing unit 810. FIG. 48 is a perspective view for illustrating the positional relationship between power transmitting unit 56 disposed in first position Q1, power transmitting unit 56 disposed in second position Q2, and sensing unit 810. Power transmitting device 50K further includes sensing unit 810. Sensing unit 810 of power transmitting device 50K includes sensing units 810FL, 810FR, 810BL, and 810BR. Sensing unit 810 is provided independently of power transmitting unit 56.

Sensing unit 810 provided independently of power transmitting unit 56 includes: sensing unit 810 provided outside casing 62 out of contact therewith; sensing unit 810 provided outside casing 62 in contact therewith; and sensing unit 810 provided inside casing 62 out of contact with power transmitting unit 56.

With reference to FIG. 47 and FIG. 48, sensing unit 810 is provided closer to the vehicle's rear side in vehicular rearward direction B than power transmitting unit 56 is. Sensing unit 810 has sensing units 810FL, 810FR, 810BL, and 810BR with distances M1$a$, M1$b$, M1$c$, M1$d$, respectively, to second position Q2. Distances M1$a$, M1$b$, M1$c$, M1$d$ are linear distances between sensing units 810FL, 810FR, 810BL, and 810BR at their respective sensor portions, respectively, and second position Q2.

When the sensing unit is implemented with a magneto-impedance element, the sensing unit can have as the sensor portion a center of an amorphous wire as seen longitudinally (or along its winding axis). When the sensing unit is implemented with a Hall device, the sensing unit can have as the sensor portion a center of a p- or n-type semiconductor sample configuring the Hall device. When the sensing unit is implemented with a magnetoresistive element, the sensing unit can have as the sensor portion a center of a multilayer thin film.

First position Q1 has a distance M2 to second position Q2. Distance M2 is a linear distance between first position Q1 and second position Q2. For power transmitting device 50K, distances M1$a$, M1$b$, M1$c$, M1$d$ all have a value smaller than distance M2. Distance M1$a$, M1$b$, M1$c$, M1$d$ may have any one thereof with a value smaller than distance M2.

Although not shown in the figure, for power transmitting device 50K, power receiving unit 200 forms a test magnetic field (or a test electric field). Power receiving unit 200 forms the test magnetic field to also reach the location of sensing unit 810. Distances M1$a$, M1$b$, M1$c$, M1$d$ all have a value smaller than distance M2.

When power transmitting unit 56 held in first position Q1 and sensing the test magnetic field (or the test electric field) in intensity in that position for the sake of illustration is compared with sensing unit 810, the latter tends to receive a stronger magnetic field intensity of the test magnetic field than the former does. The test magnetic field's intensity tends to be higher at the location of sensing unit 810 than at first position Q1, and accordingly, sensing unit 810 tends to provide a more precise sensed result than power transmitting unit 56 disposed in first position Q1 does.

Second position Q2 is vertically, obliquely above first position Q1. Between before power transmitting unit 56 ascends/descends and after it does so, power transmitting unit 56 positionally displaces in vehicular frontward and rearward directions F and B. If power transmitting unit 56 disposed in first position Q1 senses the magnetic field intensity of the test magnetic field (or the electric field intensity of the test electric field), and the sensed result is used to align vehicular body 70 with respect to power transmitting device 50K, power transmitting unit 56 moving from first position Q1 to second position Q2 may result in misalignment easily arising.

When sensing unit 810 is compared with first position Q1, the former is closer to second position Q2 serving as a power transmitting position that power transmitting unit 56 assumes than the latter is. Sensing unit 810 senses the intensity of the test magnetic field (or test electric field) formed by power receiving unit 200. Aligning sensing unit 810 with power receiving unit 200 while considering a movement in distance made between before power transmitting unit 56 ascends/descends and after it does so, allows electrically powered vehicle 10 and power transmitting device 50K to be mutually, appropriately positioned. Thus power transmitting device 50K and a power transfer system including power transmitting device 50K allow battery 150 mounted in vehicular body 70 to be contactlessly charged efficiently.

Distances M1a, M1b, M1c, M1d may all have a value larger than distance M2. The sensing unit that is provided independently of power transmitting unit 56 also allows electrically powered vehicle 10 and power transmitting device 50K to be mutually, appropriately positioned with an extent of precision.

A parking assisting device that assists parking electrically powered vehicle 10 receiving information from external power feeding apparatus 61 via communication unit 230 and moved as controlled based on that information includes power transmitting device 50K, and communication unit 230 transmitting to electrically powered vehicle 10 information of an intensity that is sensed by sensing unit 810 of a test magnetic field formed by power receiving unit 200 (see FIG. 6 and FIG. 7). This parking assisting device also allows battery 150 mounted in vehicular body 70 to be contactlessly charged efficiently.

In the above embodiments, the power receiving and transmitting devices employ power receiving and transmitting coils, respectively, both in the form of a so-called solenoid. Its core is surrounded by a magnetic flux generated in the form of a single annulus and passing through the tabular core at the center in its longitudinal direction.

In the above embodiments, the power receiving coil and/or the power transmitting coil may be round in geometry. In that case, the core is surrounded by a magnetic flux generated in the form of a doughnut and passing through the round core at the center in an opposite direction. The center as referred to herein is a portion that is located in a vicinity of the center of the outer circular contour of the core and that has no coil and is hollow inside the coil. Whether the power receiving coil and/or the power transmitting coil may be a solenoid coil or a round coil, the coils allow generally similar functions and effects.

It should be understood that the embodiments and exemplary variations based on the present invention disclosed herein have been described for the purpose of illustration only and in a non-restrictive manner in any respect. The scope of the present invention is defined by the terms of the claims, and is intended to encompass any modifications within the meaning and scope equivalent to the terms of the claims.

INDUSTRIAL APPLICABILITY

The present invention is applicable to a power receiving device, a power transmitting device, a power transfer system, and a parking assisting device.

REFERENCE SIGNS LIST

2: mode of operation; 9: adjuster; 10: electrically powered vehicle; 11, 191: power receiving device; 13: rectifier; 19B, 19BL, 19BR: rear wheel (vehicular wheel); 19F, 19FL, 19FR: front wheel (vehicular wheel); 21, 57: ferrite core; 22: power receiving coil; 23, 59, 195, 198: capacitor; 24, 60: coil unit; 30, 30A, 230T: movement mechanism; 31, 231T: link mechanism; 32, 110, 141, 260: drive unit; 33: biasing member; 33a, 33b: resilient member; 34: holding device; 34B: rear peripheral portion; 34F: front peripheral portion; 34L: left peripheral portion; 34R: right peripheral portion; 35, 93, 263: stopper; 36, 261: switching unit; 37, 38, 87,150T, 151, 240, 241: support member; 40, 45, 242T, 245: rotary shaft; 41, 42, 46, 47, 243, 244, 246T, 247: leg; 50, 50K, 190: power transmitting device; 50A, 50B, 50C: position; 52: parking space; 52T: line; 55: power transmitting ECU; 64: high frequency power supply device; 56, 193: power transmitting unit; 58: power transmitting coil; 61: external power feeding apparatus; 62, 65: casing; 62T, 67: lid; 63, 66: shield; 64E: ac power supply; 66B: rear side portion; 66L: left rear side portion; 66R: right rear side portion; 67S: side member; 68, 161: fixed member; 69: floor panel; 70: vehicular body; 70T: top; 71: left side surface; 71T: peripheral wall; 72, 73: end wall; 74, 75: side wall; 76: bottom surface; 80, 81, 92, 250, 252, 262: gear; 80T: driving compartment; 81T: cabin; 82, 251: motor; 82L: opening for getting in and out of the vehicle; 82T: luggage compartment; 83, 84, 85, 86: end; 83L: door; 84L: front fender; 85L: rear fender; 86T: front bumper; 87T: rear bumper; 88: body of holding device; 90, 91: stopper piece; 95: rotor; 96: stator; 97, 253: encoder; 98: axial shaft; 99: tooth; 111: torsion spring; 120: camera; 122: power feeding button; 130: communication unit; 130T: arm; 131: longer rod; 132: shorter rod; 133: connection rod; 140: spring mechanism; 142: converter; 142D, 242: display unit; 142T: fixed plate; 144: piston; 145: connection piece; 146: relay; 150: battery; 160, 230: communication unit; 160T, 161T, 162T, 163, 164T: hinge; 162: boost converter; 164, 166: inverter; 172, 174: motor generator; 176: engine; 177: power split device; 180: control device; 190T: voltage sensor; 192, 194, 197, 199: coil; 196, 200: power receiving unit; 200T: housing space; 231: light emitting unit; 232: spring; 246: fee reception unit; 310, 310B, 310BL, 310BR, 310F, 310FL, 310FR, 810, 810BR, 810BL, 810FR, 810FL: sensing unit; 310A, 310B, 310C, 310D: projected image; 390: measurement unit; 392: sensor portion; 460: sensing ECU; 462: ascent/descent ECU; 1000: power transfer system; AR1, DD1: arrow; B:

vehicular rearward direction; D: vertically downward direction; D1: opposite direction; Dr1, Dr2: direction of rotation; F: vehicular frontward direction; HH: magnetic flux; L: vehicular leftward direction; LL1, LL2, LL3: efficiency curve; MOD, SE2, SE3: control signal; NL, PL1, PL2: power line; O1, O2: winding axis; P1, P2, P3: center; Q1, S1: first position; S2, S2A, S2B, S2C, Q2: second position; R: vehicular rightward direction; RA: imaginary plane; RB, RC, RD: space; RR: plane; SMR1, SMR2: system main relay; TRG: start charging signal; U: vertically upward direction; k1, k2, k3: curve.

The invention claimed is:

1. A power receiving device comprising:
a power receiving unit including a power receiving coil, movable between a first position and a second position different from the first position, and contactlessly receiving electric power in the second position from a power transmitting unit external to a vehicle in which the power receiving unit is mounted;
a movement mechanism moving the power receiving unit between the first position and the second position; and
a sensing unit provided at a vehicular body of the vehicle independently of the power receiving unit and sensing an intensity of one of a magnetic field and an electric field formed by the power transmitting unit,
the second position being obliquely below the first position with respect to a vertical direction,
a first distance between the second position and the sensing unit being shorter than a second distance between the second position and the first position.

2. The power receiving device according to claim 1, wherein the sensing unit senses an impedance of the magnetic field formed by the power transmitting unit at a location of the sensing unit.

3. The power receiving device according to claim 2, wherein the sensing unit senses an intensity component in the vertical direction of the magnetic field formed by the power transmitting unit at the location of the sensing unit.

4. The power receiving device according to claim 2, wherein the sensing unit senses an intensity component in a direction orthogonal to the vertical direction of the magnetic field formed by the power transmitting unit at the location of the sensing unit.

5. The power receiving device according to claim 1, wherein:
the sensing unit includes a plurality of sensors provided at the vehicular body;
the power receiving coil has a winding axis extending in a direction orthogonal to a direction in which the power transmitting unit and the power receiving unit disposed in the second position face each other; and
when the power receiving unit is disposed in the second position, and in that condition an imaginary plane is drawn to include the winding axis of the power receiving coil of the power receiving unit and also be orthogonal to the vertical direction and the plurality of sensors are projected in the vertical direction toward the imaginary plane, then the plurality of sensors form projected images in the imaginary plane in positions having a relationship of line symmetry with respect to the winding axis.

6. The power receiving device according to claim 1, wherein the sensing unit is included in a projected space virtually formed when the power receiving unit in the second position has the power receiving coil or a core having the power receiving coil wound thereon projected upward in the vertical direction.

7. A parking assisting device comprising:
the power receiving device according to claim 1; and
a control unit controlling a vehicle driving unit driving the vehicle, based on an intensity of the magnetic field that the sensing unit senses, to move the vehicle.

8. The parking assisting device according to claim 7, wherein:
the sensing unit includes a first sensing unit and a second sensing unit mutually spaced in a direction transverse to the vertical direction; and
when the vehicle is moving and an intensity of the magnetic field that the first sensing unit senses satisfies a first condition and an intensity of the magnetic field that the second sensing unit senses fails to satisfy a second condition, the control unit controls the vehicle driving unit to move the vehicle in a direction in which the first sensing unit is located as seen from the second sensing unit.

9. The parking assisting device according to claim 8, wherein:
the first sensing unit is disposed closer to a rear side of the vehicle than is the second sensing unit; and
when the vehicle is moving backward and an intensity of the magnetic field that the first sensing unit senses satisfies the first condition and an intensity of the magnetic field that the second sensing unit senses fails to satisfy the second condition, the control unit controls the vehicle driving unit to allow the vehicle to continue to move backward.

10. The parking assisting device according to claim 8, wherein:
the first sensing unit is disposed closer to a front side of the vehicle than is the second sensing unit; and
when the vehicle is moving backward and an intensity of the magnetic field that the first sensing unit senses satisfies the first condition and an intensity of the magnetic field that the second sensing unit senses fails to satisfy the second condition, the control unit controls the vehicle driving unit to move the vehicle forward.

11. The parking assisting device according to claim 8, wherein:
the first sensing unit is disposed closer to a rear side of the vehicle than is the second sensing unit; and
when the vehicle is moving forward and an intensity of the magnetic field that the first sensing unit senses satisfies the first condition and an intensity of the magnetic field that the second sensing unit senses fails to satisfy the second condition, the control unit controls the vehicle driving unit to move the vehicle backward.

12. The parking assisting device according to claim 8, wherein:
the first sensing unit is disposed closer to a front side of the vehicle than is the second sensing unit; and
when the vehicle is moving forward and an intensity of the magnetic field that the first sensing unit senses satisfies the first condition and an intensity of the magnetic field that the second sensing unit senses fails to satisfy the second condition, the control unit controls the vehicle driving unit to allow the vehicle to continue to move forward.

13. The parking assisting device according to claim 7, wherein:
- the sensing unit includes a first sensing unit and a second sensing unit mutually spaced in a direction transverse to the vertical direction; and
- when the vehicle is moving and an intensity of the magnetic field that the first sensing unit senses satisfies a first condition and an intensity of the magnetic field that the second sensing unit senses satisfies a second condition, the control unit controls the vehicle driving unit to move the vehicle so that the magnetic field as sensed by the first sensing unit and the magnetic field as sensed by the second sensing unit approach a single value in intensity.

14. A power transfer system comprising:
- a power receiving device; and
- a power transmitting device having a power transmitting unit and contactlessly transmitting electric power to the power receiving device while facing the power receiving device,
- the power receiving device including
    - a power receiving unit movable between a first position and a second position different from the first position, and contactlessly receiving the electric power in the second position from the power transmitting unit, which is external to a vehicle in which the power receiving unit is mounted,
    - a movement mechanism moving the power receiving unit between the first position and the second position, and
    - a sensing unit provided at a vehicular body of the vehicle independently of the power receiving unit and sensing an intensity of one of a magnetic field and an electric field formed by the power transmitting unit,
- the magnetic field formed by the power transmitting unit having an intensity larger at a location of the sensing unit than at the first position.

15. A power transmitting device comprising:
- a power transmitting unit including a power transmitting coil, movable between a first position and a second position different from the first position, and contactlessly transmitting electric power in the second position to a power receiving unit provided to a vehicle;
- a movement mechanism moving the power transmitting unit between the first position and the second position; and
- a sensing unit provided independently of the power transmitting unit and sensing an intensity of one of a magnetic field and an electric field formed by the power receiving unit,
- the second position being obliquely above the first position with respect to a vertical direction,
- a first distance between the second position and the sensing unit being shorter than a second distance between the second position and the first position.

16. A parking assisting device that assists parking a vehicle receiving information from a communication unit and moved as controlled based on the information, the parking assist device comprising:
- the power transmitting device according to claim 15; and
- the communication unit that transmits to the vehicle information regarding an intensity of the magnetic field sensed by the sensing unit.

* * * * *